(12) United States Patent
Nakagawa et al.

(10) Patent No.: US 11,888,413 B2
(45) Date of Patent: Jan. 30, 2024

(54) ACTUATOR

(71) Applicant: TOYOTA JIDOSHA KABUSHIKI KAISHA, Toyota (JP)

(72) Inventors: Shuji Nakagawa, Toyota (JP); Tomoki Yudate, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 17/597,705

(22) PCT Filed: Jul. 21, 2020

(86) PCT No.: PCT/JP2020/028281
§ 371 (c)(1),
(2) Date: Jan. 19, 2022

(87) PCT Pub. No.: WO2021/015202
PCT Pub. Date: Jan. 28, 2021

(65) Prior Publication Data
US 2022/0294366 A1  Sep. 15, 2022

(30) Foreign Application Priority Data

Jul. 22, 2019  (JP) .................................. 2019-134838

(51) Int. Cl.
*H02N 1/00* (2006.01)
*H02N 1/06* (2006.01)

(52) U.S. Cl.
CPC .................................. *H02N 1/006* (2013.01)

(58) Field of Classification Search
CPC ................................ H02K 1/00; H02K 1/006
See application file for complete search history.

(56) References Cited

U.S. PATENT DOCUMENTS

| 4,205,242 | A | * | 5/1980 | Micheron | H01H 59/00 307/400 |
| 6,461,337 | B1 | * | 10/2002 | Minotti | A61M 25/00 310/40 MM |
| 7,449,811 | B2 | * | 11/2008 | Suzuki | H04R 19/016 524/544 |
| 7,545,430 | B2 | * | 6/2009 | Nakagawa | G02B 3/14 359/666 |

(Continued)

FOREIGN PATENT DOCUMENTS

| JP | 2001526520 A | 12/2001 |
| JP | 2005238347 A | 9/2005 |

(Continued)

*Primary Examiner* — Burton S Mullins
(74) *Attorney, Agent, or Firm* — Dickinson Wright, PLLC

(57) ABSTRACT

An actuator that utilizes a Coulomb force is provided. An actuator (10) includes a base electrode (2), a counter electrode (4) opposing the base electrode (2), a first terminal (31) connected to the base electrode (2), and a second terminal (32) connected to the counter electrode (4). At least a surface (2c) of the base electrode (2) that opposes the counter electrode (4) is covered with an insulating layer (6). The counter electrode (4) includes a flexible electrical conductor being deformable by a Coulomb force acting between the base electrode (2) and the counter electrode (4) when a voltage is applied between the first terminal (31) and the second terminal (32).

18 Claims, 38 Drawing Sheets

(56) References Cited

U.S. PATENT DOCUMENTS

| | | | |
|---|---|---|---|
| 8,890,543 B2* | 11/2014 | Steeneken | H01G 5/0136 |
| | | | 257/532 |
| 2006/0125746 A1* | 6/2006 | Sallese | H01H 1/0036 |
| | | | 345/85 |
| 2010/0066203 A1 | 3/2010 | Takeuchi et al. | |
| 2010/0309603 A1 | 12/2010 | Poh | |
| 2015/0171305 A1 | 6/2015 | Hashimoto | |
| 2019/0020288 A1* | 1/2019 | Mäkinen | G06F 3/016 |

FOREIGN PATENT DOCUMENTS

| | | | |
|---|---|---|---|
| JP | 200999674 A | 5/2009 | |
| JP | 2009124839 A | 6/2009 | |
| JP | 2010016969 A | 1/2010 | |
| JP | 201068667 A | 3/2010 | |
| JP | 2012523809 A | 10/2012 | |
| JP | 5714200 B2 | 3/2015 | |
| WO | 9930410 A1 | 6/1999 | |
| WO | 0106575 A1 | 1/2001 | |
| WO | 2010115549 A1 | 10/2010 | |
| WO | 2013122047 A1 | 8/2013 | |

\* cited by examiner

ACTUATOR

RELATED APPLICATIONS

This application is filed under 35 U.S.C. 371 of International Patent Application No. PCT/JP2020/028281, filed Jul. 21, 2020, which claims priority to Japanese Patent Application No. 2019-134838, filed on Jul. 22, 2019, including the specification, drawings and abstract, the entire disclosure of which is incorporated herein by reference.

TECHNICAL FIELD

The present disclosure relates to actuators.

BACKGROUND ART

Japanese Patent No. 5714200 B discloses a transducer for converting between mechanical energy and electrical energy that includes a polymer. A top electrode and a bottom electrode are attached to an upper surface and a lower surface of the polymer, respectively. The polymer deflects with a change in electric field provided by the top electrode and the bottom electrode. The deflection of the transducer in response to a change in electric field provided by the electrodes is also referred to as actuation. The publication describes that, as the polymer changes in size, the deflection may be used to produce mechanical work.

JP 2010-068667 A discloses a dielectric actuator in which a dielectric elastic body is sandwiched between a pair of opposed electrodes, and a voltage is applied between the pair of electrodes to compressively deform the dielectric elastic body. In the dielectric actuator disclosed in the publication, the dielectric elastic body includes an elastic high-dielectric material portion and an elastic insulating material portion. The elastic insulating material portion is interposed between the elastic high-dielectric material portion and the pair of electrodes.

CITATION LIST

Patent Literature

[Patent Literature 1] JP 5714200 B
[Patent Literature 2] JP 2010-068667 A

SUMMARY OF INVENTION

Technical Problem

The amount of work obtained by an actuator can be significantly attributed to the produced force and the deformation volume. To the knowledge of the present inventors, an actuator including a pair of electrodes and a dielectric elastic body interposed therebetween shows a contradicting relationship between the produced force and the deformation volume. The produced force F is represented as:

$F=QE=(CV) \times (V/d)$. In the equation, Q is accumulated charge, E is field intensity, C is capacitance of dielectric elastic body, d is interelectrode distance, and V is applied voltage. Accordingly, interelectrode distance d is determined by the thickness of the dielectric elastic body. To obtain a greater deformation volume, the thickness of the dielectric elastic body ($\approx$interelectrode distance d) needs to be made greater. However, when the thickness of the dielectric elastic body ($\approx$interelectrode distance d) is increased, the produced force F decreases. This means that the actuator in which a dielectric elastic body is merely sandwiched between a pair of electrodes is difficult to obtain a greater deformation volume. On the other hand, for dielectric elastomers, which can be used as the dielectric elastic body, there are few materials that show a high relative dielectric constant, which also makes it difficult to obtain sufficient performance.

Solution to Problem

An embodiment of the actuator according to the present disclosure includes at least one base electrode, at least one counter electrode opposing the at least one base electrode, a first terminal connected to the at least one base electrode, and a second terminal connected to the at least one counter electrode. The at least one base electrode includes an opposing surface opposing the at least one counter electrode, and at least the opposing surface is covered by an insulating layer. The counter electrode includes a flexible electrical conductor being deformable by a Coulomb force acting between the base electrode and the counter electrode when a voltage is applied between the first terminal and the second terminal.

In the actuator as just described, the counter electrode is deformed by the Coulomb force acting between the base electrode and the counter electrode when a voltage is applied to the first terminal and the second terminal, whereby the actuator is actuated.

An embodiment of the actuator may include a plurality of base electrodes arranged in sequence, and one or more counter electrodes, each disposed between adjacent ones of the plurality of base electrodes. The first terminal may be connected to the plurality of base electrodes. The second terminal may be connected to the one or more counter electrodes. The adjacent ones of the base electrodes may include opposing surfaces opposing each other across the one or more counter electrodes, the opposing surfaces having protrusion-and-recess shapes engageable with each other and each being covered by an insulating layer. In this case, the actuator may output a change of the distance between the base electrodes as the amount of displacement.

The at least one base electrode may include a first base electrode and a second base electrode disposed spaced apart from the first base electrode. The at least one counter electrode may be disposed between the first base electrode and the second base electrode. The first base electrode may include an opposing surface opposing the at least one counter electrode, the opposing surface having a first protrusion-and-recess shape and being covered by a first insulating layer. The second base electrode may include a second surface opposing the counter electrode, the second surface having a second protrusion-and-recess shape engageable into the first protrusion-and-recess shape and being covered by a second insulating layer.

The at least one base electrode may include a first base electrode, a second base electrode disposed spaced apart from the first base electrode, and an intermediate base electrode disposed between the first base electrode and the second base electrode. The at least one counter electrode may include a plurality of counter electrodes respectively disposed between the first base electrode and the intermediate base electrode and between the second base electrode and the intermediate base electrode. The first base electrode may include a first surface facing the intermediate base electrode, the first surface having a first protrusion-and-recess shape and being covered by a first insulating layer. The second base electrode may include a second surface facing the intermediate base electrode, the second surface having a second protrusion-and-recess shape and being covered by a second insulating layer. The intermediate base electrode may include a third surface facing toward the first base electrode, the third surface having a third protrusion-and-recess shape engageable with the first protrusion-and-recess shape and being covered by a third insulating layer. The intermediate base electrode may further include a fourth surface facing toward the second base electrode, the fourth surface having a fourth protrusion-and-recess shape engageable with the second protrusion-and-recess shape and being covered by a fourth insulating layer.

The at least one base electrode may include a first base electrode, a second base electrode disposed spaced apart from the first base electrode, and a plurality of intermediate base electrodes arranged in sequence between the first base electrode and the second base electrode. The at least one counter electrode may include a plurality of counter electrodes, the plurality of counter electrodes respectively disposed between the first base electrode and one of the intermediate base electrodes, between one of the intermediate base electrodes and another of the intermediate base electrodes, and between the second base electrode and one of the intermediate base electrodes. The first base electrode may include a first surface facing the intermediate base electrode, the first surface having a first protrusion-and-recess shape and being covered by a first insulating layer. The second base electrode may include a second surface facing the intermediate base electrode, the second surface having a second protrusion-and-recess shape and being covered by a second insulating layer. The intermediate base electrode may include a third surface facing toward the first base electrode, the third surface having a third protrusion-and-recess shape engageable with the first protrusion-and-recess shape and being covered by a third insulating layer. The intermediate base electrode may further include a fourth surface facing toward the second base electrode, the fourth surface having a fourth protrusion-and-recess shape engageable with the second protrusion-and-recess shape and being covered by a fourth insulating layer. Each one of the intermediate base electrodes that is disposed between adjacent ones of the intermediate base electrodes may include a fifth surface facing toward the first base electrode, the fifth surface having a fifth protrusion-and-recess shape and being covered by a fifth insulating layer. Each one of the intermediate base electrodes that is disposed between adjacent ones of the intermediate base electrodes may include a sixth surface facing toward the second base electrode, the sixth surface having a sixth protrusion-and-recess shape and being covered by a sixth insulating layer.

An embodiment of the actuator may further include a first wire connecting the plurality of base electrodes in parallel. An embodiment of the actuator may further include a second wire connecting a plurality of the counter electrodes in parallel.

The at least one counter electrode may include a flat spring.

In accordance with another embodiment, an actuator may include a plurality of base electrodes arranged in sequence so as to face each other, and one or more counter electrodes each disposed between adjacent ones of the plurality of base electrodes. The first terminal may be connected to the plurality of base electrodes. The second terminal may be connected to the one or more counter electrodes. Each of the one or more counter electrodes may be a flat spring that is deformable in a direction in which the adjacent ones of the base electrodes face each other. In this case, the actuator may output a change of the distance between the base electrodes as the amount of displacement.

Each of the one or more counter electrodes may be in a corrugated shape An embodiment of the actuator may further include a first wire connecting the plurality of base electrodes in parallel. An embodiment of the actuator may further include a second wire connecting a plurality of the counter electrodes in parallel. The insulating layer may include a ceramic. The insulating layer may include a perovskite structure. The at least one counter electrode may include an elastomer containing an electrically conductive agent.

The actuator may further include a power supply and a first switch. The power supply applies a voltage to the base electrode and the counter electrode. The first switch turns on and off the voltage applied by the power supply between the base electrode and the counter electrode. In addition, the actuator may further include a controller turning on and off the first switch.

In one embodiment, the actuator may include a connecting wire and a second switch. The connecting wire electrically connects the base electrode and the counter electrode to each other without interposing the power supply therebetween. The second switch is provided on the connecting wire, and the second switch switches between a state in which the base electrode and the counter electrode are electrically connected to each other by the connecting wire and a state in which the connecting wire is electrically disconnected.

The actuator may further include a controller configured to turn off the second switch when the first switch is turned on and to turn on the second switch when the first switch is turned off.

In another embodiment, the actuator may include a first ground wire, a second ground wire, a third switch, and a fourth switch.

The first ground wire is an electrical wire that connects the counter electrode to ground. The second ground wire is an electrical wire that connects the base electrode to ground. The third switch is provided on the first ground wire. The third switch selectively connects and disconnects the first ground wire to and from ground. The fourth switch is provided on the second ground wire. The fourth switch selectively connects and disconnects the second ground wire to and from ground.

The actuator may include a controller configured to turn off the third switch and the fourth switch when the first switch is turned on, and to turn on the third switch and the fourth switch when the first switch is turned off.

DESCRIPTION OF EMBODIMENTS

The following describes various embodiments of an actuator according to the disclosure. It should be noted, however, that the disclosed embodiments are, of course, not intended to limit the invention. The present invention is not limited to the embodiments described herein unless specifically stated otherwise. The features and components that exhibit the same effects are designated by the same reference symbols as appropriate, and the description thereof will not be repeated.

Actuator 10

Figure 1:
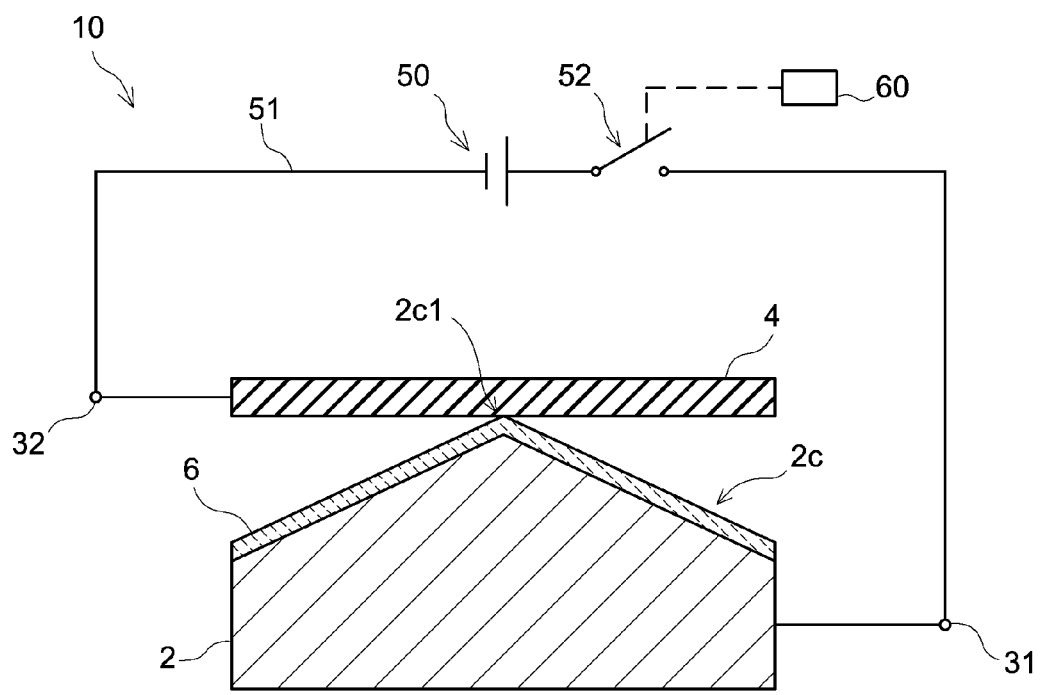
FIG. 1 is a cross-sectional view schematically illustrating an actuator 10.
Figure 2:
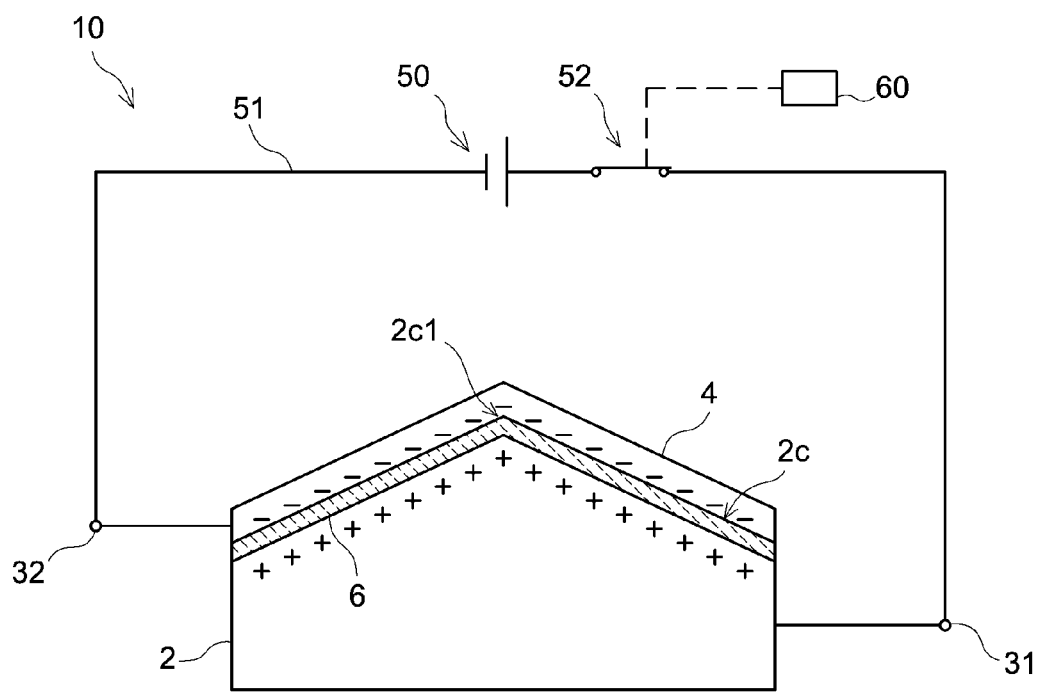
FIG. 2 is a cross-sectional view schematically illustrating the actuator 10.

FIGS. 1 and 2 show cross-sectional views schematically illustrating an actuator 10. As illustrated in FIG. 1, the actuator 10 includes a base electrode 2, a counter electrode 4 opposed to the base electrode 2, a first terminal 31 connected to the base electrode 2, and a second terminal 32 connected to the counter electrode 4. In this embodiment, each of the base electrode 2 and the counter electrode 4 is a plate-shaped electrode. At least a surface 2c of the base electrode 2 that opposes the counter electrode 4 is covered with an insulating layer 6. The counter electrode 4 is composed of a flexible electrical conductor. The counter electrode 4 may be deformable by the Coulomb force that acts between the base electrode 2 and the counter electrode 4 when a voltage is applied to the first terminal 31 and the second terminal 32.

The first terminal 31 and the second terminal 32 are connected to a power supply 50 via a wire 51. The wire 51 is supplied with a switch 52. For the switch 52, it is possible to use a switching element, for example. FIG. 1 shows a state in which the switch 52 is OFF. FIG. 2 shows a state in which the switch 52 is ON.

Here, when the switch 52 is in the OFF state, the counter electrode 4 is not entirety stuck to the opposing surface 2c of the base electrode 2, as illustrated in FIG. 1. As illustrated in FIG. 2, when the switch 52 is in an ON state, the counter electrode 4 is attracted to the base electrode 2 by the Coulomb force that acts between the base electrode 2 and the counter electrode 4, so that the counter electrode 4 deforms such as to fit the opposing surface 2c of the base electrode 2 and sticks to the base electrode 2. When the switch 52 is in an OFF state, the Coulomb force disappears, so that the counter electrode 4 returns to the original shape, causing the counter electrode 4 to be detached from the base electrode 2. Thus, in the actuator 10 shown in FIGS. 1 and 2, the counter electrode 4 deforms when the switch 52 is turned ON and when the switch 52 is turned OFF, and the actuator 10 is actuated accordingly. The switch 52 may be switched between ON and OFF states by a controller 60.

Base Electrode 2

The base electrode 2 as described above may employ an electrical conductor. Here, the base electrode 2 may employ a low-resistance electrical conductor, for example. For example, the base electrode 2 may employ a metal such as iron, copper, and aluminum. The base electrode 2 may be provided with an appropriate mechanical strength according to the use. Here, the base electrode 2 has been described as an example. However, the just-mentioned examples of the materials may also be used as appropriate for the base electrode in various other embodiments. In this embodiment, the base electrode 2 is a plate-shaped member. The base electrode 2 has protrusions and recesses in the surface $2c$ thereof that opposes the counter electrode 4. In the embodiment shown in FIG. 1, the surface $2c$ opposing the counter electrode 4 has a protruding part $2c1$ bulging toward the counter electrode 4.

Insulating Layer 6

The insulating layer 6 may be composed of an insulator. In order to generate an appropriate Coulomb force between the base electrode 2 and the counter electrode 4, the insulating layer 6 may have an appropriate relative dielectric constant. The relative dielectric constant of the insulating layer 6 may be set to 70 or greater by employing an insulating layer made of an inorganic filler, for example. Moreover, the insulating layer 6 may employ ceramics (for example, fine ceramics). When fine ceramics are employed, the relative dielectric constant of the insulating layer 6 may be set to 1000 or greater. The relative dielectric constant illustrated as an example herein may be measured using a ferroelectric tester Precision LC II available from Radiant Technologies Inc. (U.S.A.), for example. The relative dielectric constant of the insulating layer 6 tends to be dependent on such factors as temperature, the frequency of the current for measurement, and the crystal structure of the material that forms the insulating layer. The relative dielectric constant of the insulating layer 6 may be measured, for example, at room temperature, about 23° C., and at a predetermined frequency in the range of 100 Hz to 1000 Hz. The insulating layer 6 used herein may be one that exhibits a required relative dielectric constant according to a predetermined use environment for the actuator 10.

The thinner the insulating layer 6 is, the shorter the interelectrode distance between the base electrode 2 and the counter electrode 4. Accordingly, a greater Coulomb force is generated when a voltage is applied between the base electrode 2 and the counter electrode 4. In addition, the insulating layer 6 may be such that the amount of leakage of the electric charge stored in the base electrode 2 is smaller when a voltage is applied between the base electrode 2 and the counter electrode 4. From the viewpoint of obtaining a greater Coulomb force between the base electrode 2 and the counter electrode 4, the insulating layer 6 may have lower leakage current (in other words, less leakage of electric charge) and higher dielectric breakdown strength, and the insulating layer 6 may be thinner. From this viewpoint, the insulating layer 6 may be formed by sputtering, for example. It should be noted, however, that the method of forming the insulating layer 6 is not limited to sputtering. The insulating layer 6 may be formed by any appropriate thin-film forming technique such that it can obtain lower leakage current (in other words, less leakage of electric charge) and higher dielectric breakdown strength, depending on the material used for the insulating layer 6.

Electrical insulation between the base electrode 2 and the counter electrode 4 may be provided reliably by the insulating layer 6. The electric charge stored in the base electrode 2 may be retained reliably by the insulating layer 6. From such a viewpoint, it is possible to use a ferroelectric material made of ceramics for the insulating layer 6. The ferroelectric material made of ceramics may have a perovskite structure, for example.

Examples of the ferroelectric material having a perovskite structure include barium titanate ($BaTiO_3$), lead titanate ($PbTiO_3$), lead zirconate titanate ($Pb(Zr, Ti)O_3$), lead lanthanum zirconate titanate (($Pb, La)(Zr, Ti)O_3$), strontium titanate ($SrTiO_3$), barium strontium titanate (($Ba, Sr)TiO_3$), and sodium potassium niobate (($NaK)NbO_3$). It should be noted that the materials used for the insulating layer 6 is not limited to the examples described herein. It is possible to employ any appropriate material from the viewpoint of obtaining a greater Coulomb force between the base electrode 2 and the counter electrode 4. It is also possible to use a composite material containing appropriate addition agents. For example, it is possible that barium titanate may contain a substance such as $CaZrO_3$ or $BaSnO_3$ in solid solution.

Barium titanate shows a relative dielectric constant of about 1,000 to about 10,000, so it is a typical material for a ferroelectric material having a high relative dielectric constant. Lead zirconate titanate shows a relative dielectric constant of 500 to 5,000, and strontium titanate shows a relative dielectric constant of 200 to 500. It is possible to use such materials with a high relative dielectric constant for the insulating layer 6. Although examples of the relative dielectric constant values are shown, the relative dielectric constant of a material may vary depending on various factors, such as thickness, crystal structure, density of crystal structure, measurement conditions (such as temperature), and measurement device. The relative dielectric constant of the insulating layer 6 may be such a value that exhibits required performance according to a predetermined use environment for the actuator 10. Hereinabove, a ferroelectric material having a perovskite structure is described as an example of the material used for the insulating layer 6. However, the material used for the insulating layer 6 is not limited to ferroelectric material having a perovskite structure, unless specifically stated otherwise. In this embodiment, the insulating layer 6 is composed of barium titanate. Here, the insulating layer 6 has been described as an example. However, the just-mentioned examples of the materials may also be used as appropriate for the insulating layer in various other embodiments herein.

Counter Electrode 4

The counter electrode 4 is disposed on the base electrode 2 and composed of a flexible (bendable) electrical conductor. More specifically, in this embodiment, the counter electrode 4 opposes the base electrode 2 with the insulating layer 6 interposed therebetween, as illustrated in FIG. 1. As illustrated in FIG. 2, when a voltage is applied between the base electrode 2 and the counter electrode 4, the counter electrode 4 is deformed by the Coulomb force that acts between the base electrode 2 and the counter electrode 4, in such a manner as to stick to the base electrode 2. When no voltage is applied between the base electrode 2 and the counter electrode 4, no Coulomb force acts therebetween, as illustrated in FIG. 1. As a result, the counter electrode 4 returns to its original shape. The counter electrode 4 may have an appropriate elastic force such as to return to its original shape under the condition in which there is no Coulomb force.

From such viewpoints, the counter electrode 4 may be formed of, for example, an electrically conductive rubber or an electrically conductive gel. In this embodiment, the counter electrode 4 employs an electrically conductive rubber. The electrically conductive rubber employed for the counter electrode 4 may be an elastomer mixed with an electrically conductive agent. Examples of the usable conductive agent include: fine powder of such material as carbon black, acetylene black, or carbon nanotubes; fine powder of metal such as silver or copper; fine powder of an electrically conductive material with a core-shell structure, such as one in which an insulator such as silica or alumina is coated with a metal by sputtering. The electrically conductive gel may be a functional gel material composed of a three-dimensional polymer matrix retaining a solvent containing water, a moisturizing agent, or the like, an electrolyte, and addition agents. An example of such a gel material is ST-gel (registered trademark) manufactured by Sekisui Plastics Co., Ltd. The counter electrode 4 may be composed of a flat spring that can undergo elastic deformation such as to fit the base electrode 2. The counter electrode 4 may be a thin sheet-shaped flat spring, for example. In this case, the base electrode 2 may be composed of metal. Thus, the base electrode 2 may employ a member that has appropriate flexibility. The counter electrode 4 may be composed of a viscoelastic body or an elasto-plastic body. In this case, the counter electrode 4 may be used, for example, within the range in which it is considered as its elastic range. Here, the counter electrode 4 has been described as an example. However, the just-mentioned examples of the materials may also be used as appropriate for the counter electrode in various other embodiments.

Power Supply 50 and Switch 52

The first terminal 31 and the second terminal 32 are connected to the power supply 50 via the switch 52. When the switch 52 is turned ON, the first terminal 31 and the second terminal 32 are connected to the power supply 50 so that a required voltage can be applied to the first terminal 31 and the second terminal 32. In the embodiment shown in FIG. 1, the power supply 50 is a direct current power supply. In the embodiment shown in FIG. 1, the first terminal 31 is connected to the positive electrode of the power supply 50. The second terminal 32 is connected to the negative electrode of the power supply 50. Although the power supply 50 is described to be a direct current power supply, the power supply 50 may also be an alternating current power supply. The structure of the switch 52 is not limited to any particular structure. The switch 52 may be composed of what is called a semiconductor switch.

As illustrated in FIG. 2, when the switch 52 is turned ON, the base electrode 2, which is connected to the positive electrode, is charged with a positive charge. On the other hand, the counter electrode 4, which is connected to the negative electrode, is charged with a negative charge. This causes a Coulomb force to act between the base electrode 2 and the counter electrode 4. The Coulomb force serves to attract the base electrode 2 and the counter electrode 4 to each other. The surface 2c of the base electrode 2, which opposes the counter electrode 4, has the protruding part 2c1 bulging toward the counter electrode 4. The counter electrode 4 is composed of a flexible electrical conductor that is deformable by the Coulomb force acting between the base electrode 2 and the counter electrode 4. When the switch 52 is turned ON and the Coulomb force acts between the base electrode 2 and the counter electrode 4, the counter electrode 4 deforms such as to fit the protruding part 2c1 of the base electrode 2 and sticks to the surface 2c of the base electrode 2 that opposes the counter electrode 4.

In this actuator 10, the counter electrode 4 can displace correspondingly to the bulging height of the protruding part 2c1 of the base electrode 2. The actuator 10 is unlike the dielectric actuator of JP 2010-068667 A, in which the dielectric actuator undergoes compressive deformation. In the actuator 10, the counter electrode 4 undergoes deformation. Because the insulating layer 6, as the dielectric material, does not undergo deformation, it is possible to use inorganic materials such as fine ceramics. This means that the freedom in selecting the material to be used for the insulating layer 6 is high. Therefore, it is possible to select a material having a high relative dielectric constant, such as barium titanate, for the insulating layer 6 to enable a high Coulomb force to act between the base electrode 2 and the counter electrode 4.

Hereinabove, an embodiment shown in FIGS. 1 and 2 has been described. Various other embodiments of the actuator 10 will further be described hereinbelow.

Actuator 10A

Figure 3:
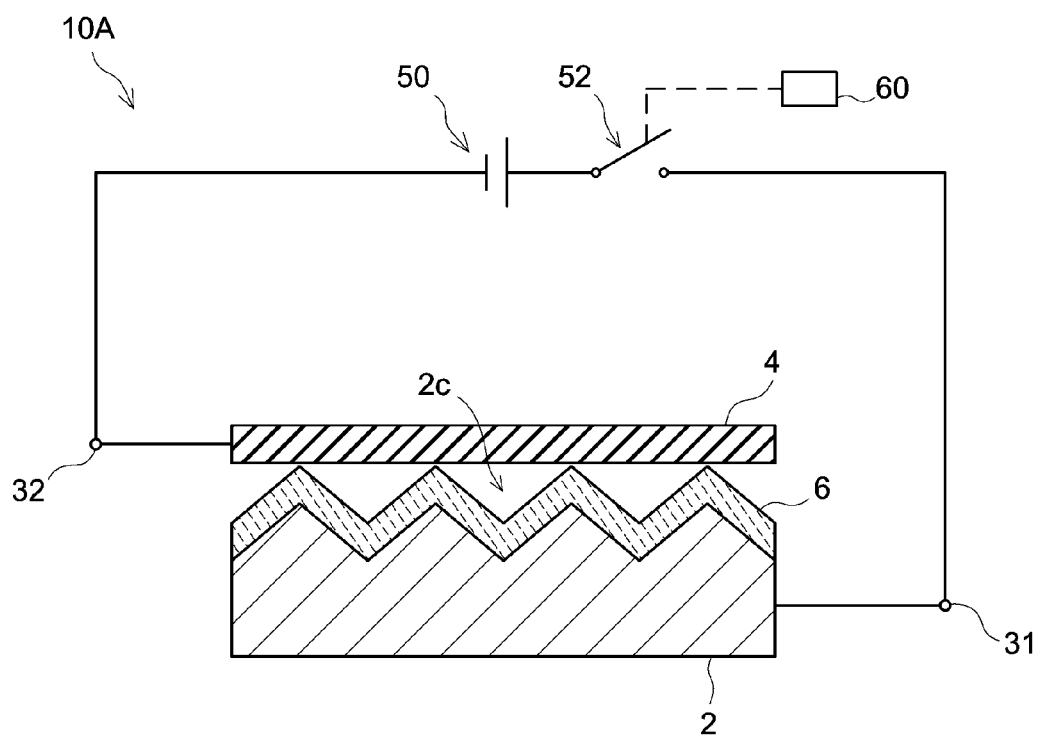
FIG. 3 is a cross-sectional view schematically illustrating an actuator 10A according to another embodiment of the disclosure.
Figure 4:
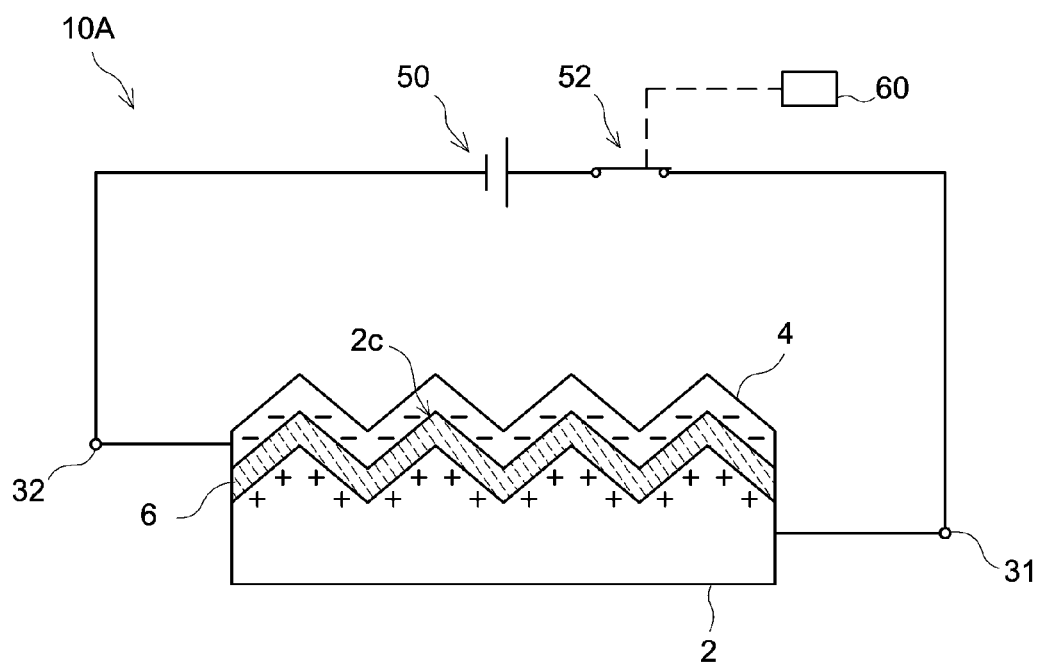
FIG. 4 is a cross-sectional view schematically illustrating the actuator 10A according to another embodiment of the disclosure.
Figure 5:
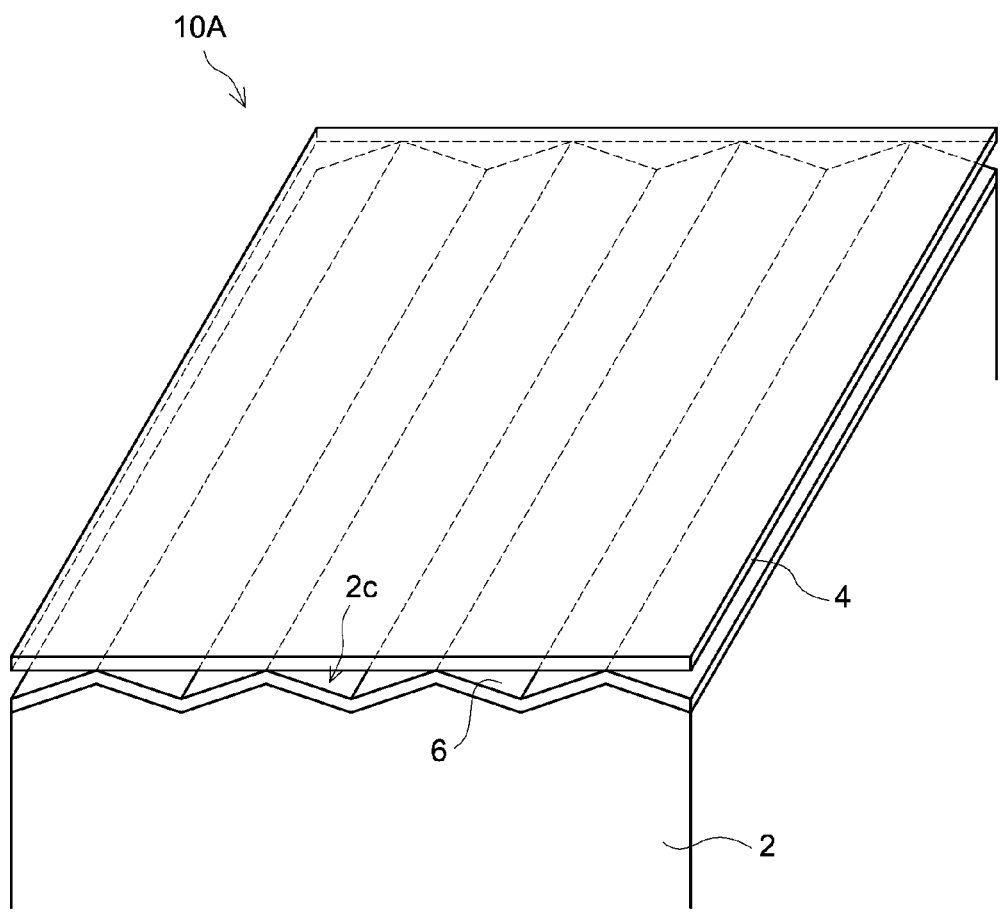
FIG. 5 is a perspective view schematically illustrating the actuator 10A.
Figure 6:
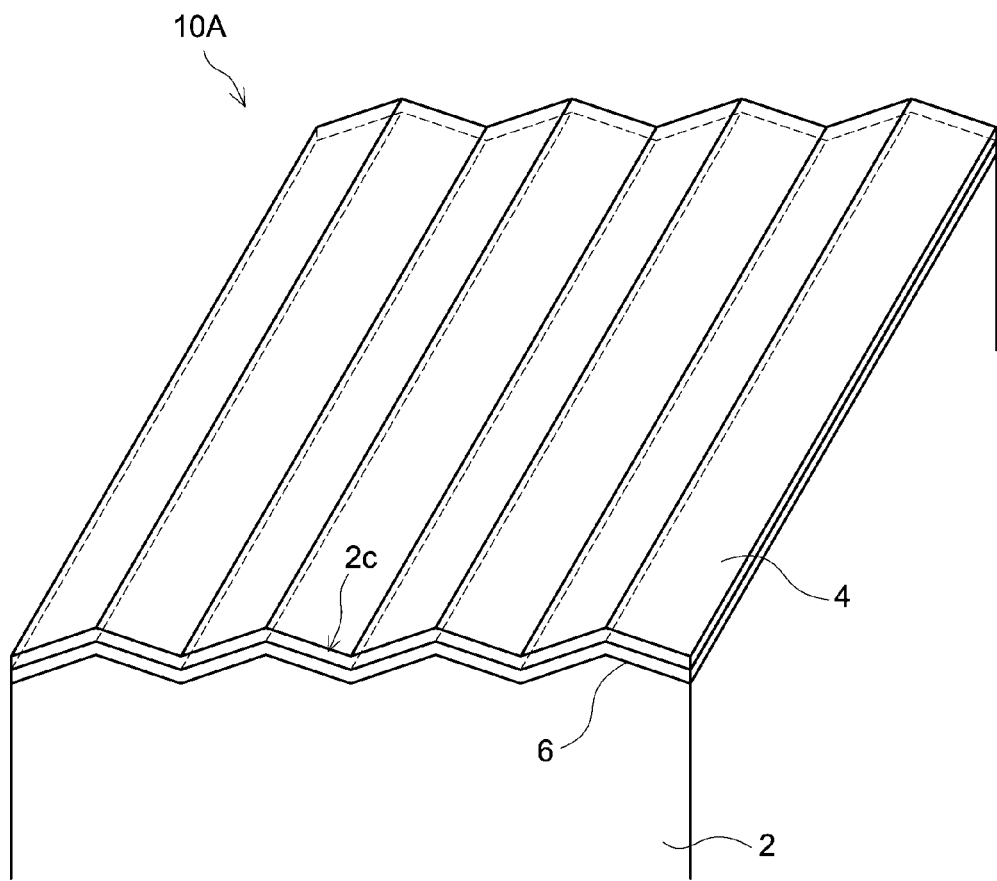
FIG. 6 is a perspective view schematically illustrating the actuator 10A.

FIGS. 3 and 4 are cross-sectional views schematically illustrating an actuator 10A according to another embodiment. FIGS. 5 and 6 are perspective views schematically illustrating the actuator 10A. FIGS. 3 and 5 each show a state in which the switch 52 is OFF. FIGS. 4 and 6 each show a state in which the switch 52 is ON. Note that the power supply 50, the switch 52, the controller 60, and so forth are not shown in each of FIGS. 5 and 6.

As illustrated in FIGS. 3 and 5, in the actuator 10A, the surface 2c of the base electrode 2 that opposes the counter electrode 4 has a corrugated shape. The corrugated shape is such that ridges and valleys that extend in substantially one direction appear repeatedly in a direction perpendicular to the direction in which the ridges and valleys extend. The counter electrode 4 opposes the opposing surface 2c of the base electrode 2. The counter electrode 4 is a sheet-shaped member that covers the opposing surface 2c of the base electrode 2. In this embodiment, the base electrode 4 is a flat sheet-shaped member. The counter electrode 4 has flexibility such as to be deformable by the Coulomb force acting between the base electrode 2 and the counter electrode 4.

In this actuator 10A, when the switch 52 is turned ON, the base electrode 2, which is connected to the positive electrode, is charged with a positive charge, as illustrated in FIGS. 4 and 6. On the other hand, the counter electrode 4, which is connected to the negative electrode, is charged with a negative charge. This causes a Coulomb force to act between the base electrode 2 and the counter electrode 4. This causes the counter electrode 4 to be attracted to the base electrode 2 by the Coulomb force, so that the counter electrode 4 deforms such as to fit the protrusions and recesses on the surface 2c of the base electrode 2 that opposes the counter electrode 4 and sticks to the surface 2c.

With such an actuator 10A, when the switch 52 is OFF, the counter electrode 4 does not entirely stick to the base electrode 2 or deform such as to fit the protrusions and recesses of the base electrode 2, as illustrated in FIGS. 3 and 5. In contrast, when the switch 52 is ON, the counter electrode 4 is deformed by the Coulomb force such as to fit the protrusions and recesses of the base electrode 2, as illustrated in FIGS. 4 and 6. Accordingly, when the switch 52 is ON, protrusions and recesses appear on the surface of the counter electrode 4 correspondingly to the protrusions and recesses on the surface 2c of the base electrode 2 that opposes the counter electrode 4. When the switch 52 is turned OFF, the Coulomb force disappears, so that the counter electrode 4 is detached from the base electrode 2. Thus, the actuator 10A is actuated such that the counter electrode 4 is attached to and detached from the base electrode 2.

Herein, the protrusions and recesses of the surface 2c of the base electrode 2 that opposes the counter electrode 4 are not limited to the corrugated shape as shown in FIGS. 3 and 5.

Actuator 10B

Figure 7:
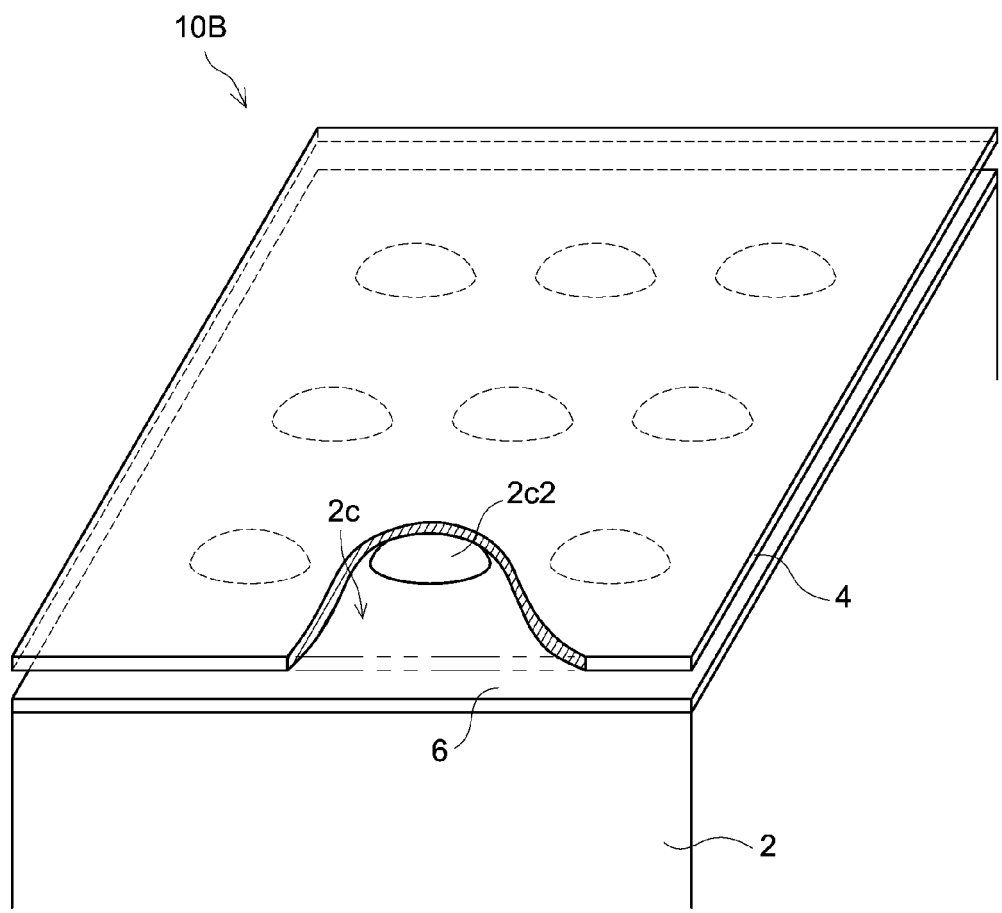
FIG. 7 is a perspective view of an actuator 10B.
Figure 8:
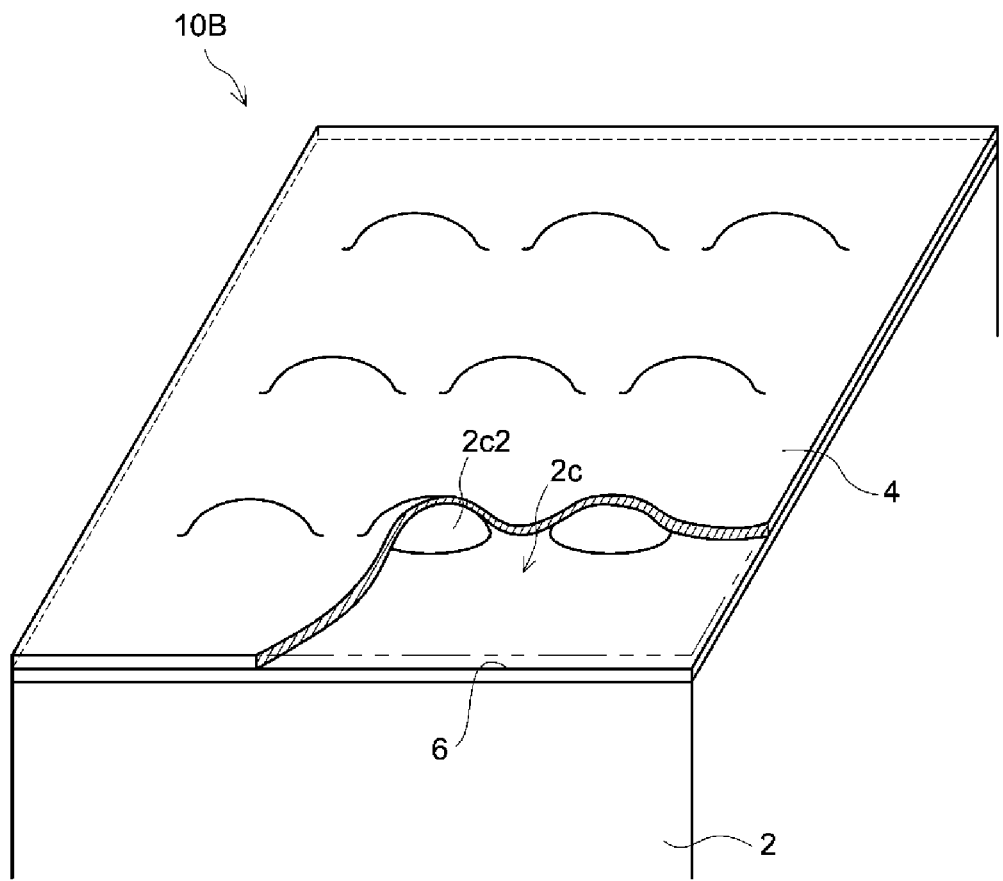
FIG. 8 is a perspective view of the actuator 10B.

FIGS. 7 and 8 each show a perspective view of an actuator 10B. FIG. 7 shows a state in which the switch is OFF. FIG. 8 shows a state in which the switch is ON. Note that the power supply, the switch, the controller, and so forth are not shown in each of FIGS. 7 and 8. As illustrated in FIG. 7, the surface 2c of the base electrode 2 that opposes the counter electrode 4 may have protuberances 2c2 at desired positions. Referring to FIG. 7, the base electrode 2 includes protuberances each smoothly bulging in a substantially hemispherical shape at desired positions on the surface 2c that opposes the counter electrode 4. When the switch 52 is turned ON, a Coulomb force acts between the base electrode 2 and the counter electrode 4, causing the counter electrode 4 to stick to the base electrode 2, as illustrated in FIG. 8. In this case, the counter electrode 4 deforms so as to fit the protrusion-and-recess shape of the opposing surface 2c of the base electrode 2. As a result, a shape corresponding to the protuberances 2c2 of the surface 2c of the base electrode 2 that opposes the counter electrode 4 appears on the surface of the counter electrode 4. As illustrated in FIGS. 7 and 8, it is possible that only the protuberances 2c2 may be provided within the surface 2c of the base electrode 2 that opposes the counter electrode 4. On the other hand, although not shown in the drawings, it is also possible that only recesses may be provided within the surface 2c of the base electrode 2 that opposes the counter electrode 4. The positions and shapes of the protuberances and recesses provided within the surface 2c of the base electrode 2 that opposes the counter electrode 4 are not limited to particular positions and shapes unless specifically stated otherwise.

Thus, as illustrated in FIGS. 7 and 8, when the switch 52 is turned OFF, no Coulomb force occurs in the actuator 10B, so that the counter electrode 4 is detached from the base electrode 2. When the switch 52 is turned ON, the Coulomb force occurs, causing the counter electrode 4 to stick to the base electrode 2. Thus, the actuator 10B is actuated such that the counter electrode 4 is attached to and detached from the base electrode 2. Accordingly, when the counter electrode 4 sticks to the base electrode 2, a shape corresponding to the protuberances 2c2 of the surface 2c of the base electrode 2 that opposes the counter electrode 4 appears on the surface of the counter electrode 4. Therefore, the actuator 10B may be used as an actuator for causing protrusions and recesses to appear or disappear within a surface of an article. The use of such an actuator 10B makes it possible to provide a novel interior material for a vehicle such that protrusions and recesses appear on the surface. In addition, the actuator 10B may also be used as an actuator for causing protrusions and recesses to appear or disappear on a surface of an exterior material of a vehicle. By causing protrusions and recesses to appear or disappear on the surface of the exterior material of the vehicle, it is possible, for example, to control the air flow while the vehicle is running, to thereby improve aerodynamics to achieve improvements in driving stability and fuel consumption. Moreover, by causing protrusions and recesses to appear or disappear on the surface of the exterior material of the vehicle, it is possible to change the appearance of the vehicle to thereby enhance the styling of the vehicle.

Actuator 10C

Figure 9:
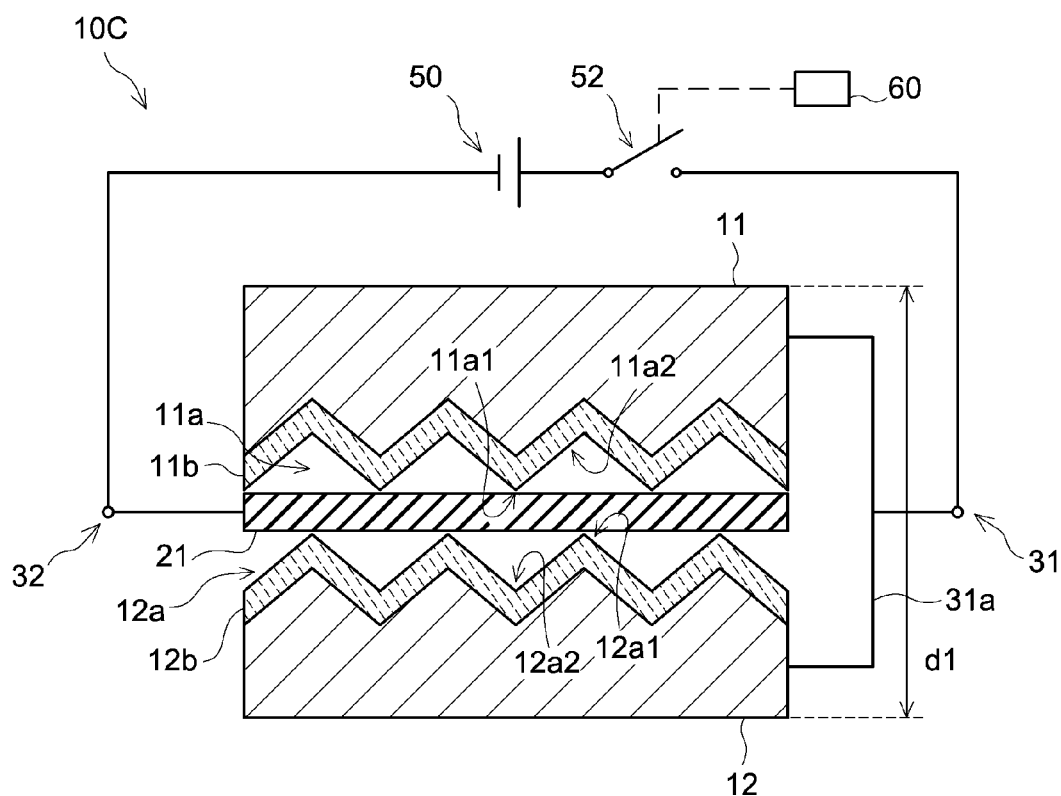
FIG. 9 is a cross-sectional view schematically illustrating an actuator 10C.
Figure 10:
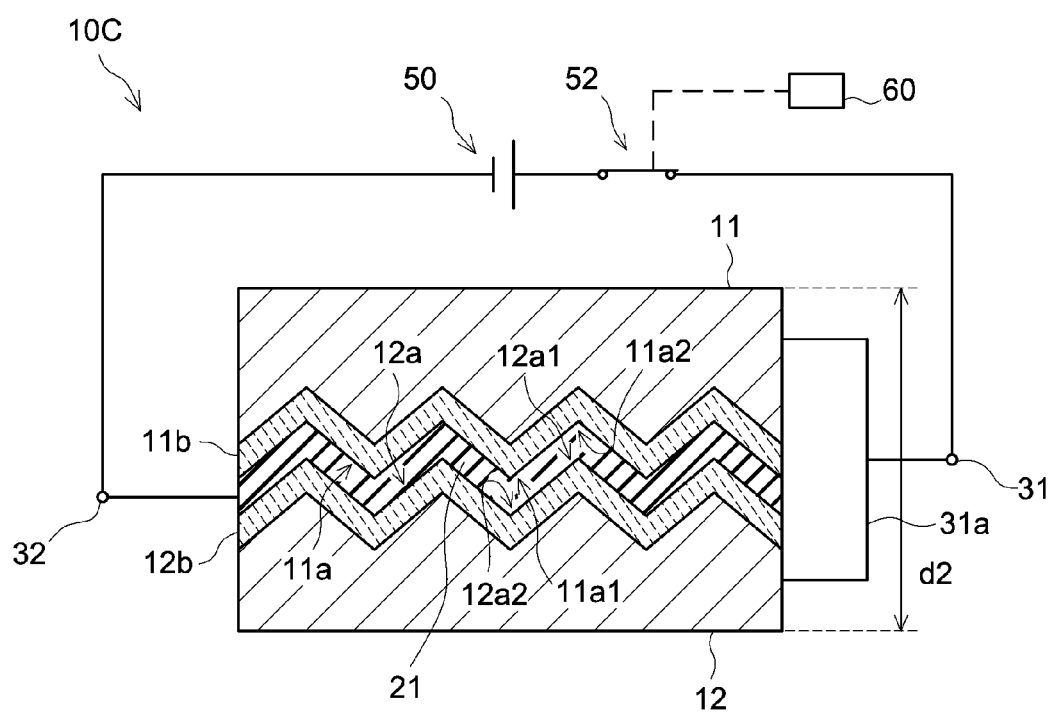
FIG. 10 is a cross-sectional view schematically illustrating the actuator 10C.

FIGS. 9 and 10 are cross-sectional views schematically illustrating an actuator 10C. The actuator 10C is an embodiment of the actuator disclosed herein. FIG. 9 shows the actuator 10C connected to the power supply 50, in which the switch 52 is in the OFF state. FIG. 10 shows the actuator 10C in which the switch 52 is in the ON state. As illustrated in FIG. 9, the actuator 10C includes two base electrodes 11 and 12, a counter electrode 21, a first terminal 31, and a second terminal 32.

Base Electrodes 11 and 12

The base electrodes 11 and 12 are arranged so as to oppose each other across the counter electrode 21. In other words, the counter electrode 21 is disposed between the base electrodes 11 and 12. Opposing surfaces 11a and 12a of the base electrodes 11 and 12, which oppose each other across the counter electrode 21, have protrusion-and-recess shapes that are engageable with each other. The opposing surfaces 11a and 12a opposing across the counter electrode 21 are covered by insulating layers 11b and 12b, respectively. Herein, in order to distinguish the base electrode 11 and the base electrode 12 from each other, the base electrode 11 is referred to as a "first base electrode", where appropriate. The base electrode 12 is referred to as a "second base electrode", where appropriate. Each of the respective opposing surfaces 11a and 12a of the base electrodes 11 and 12 has a protrusion-and-recess shape. The protrusion-and-recess shape of the surface 11a of the base electrode 11 is referred to as "first protrusion-and-recess shape", where appropriate. The protrusion-and-recess shape of the surface 12a of the base electrode 12 is referred to as "second protrusion-and-recess shape", where appropriate.

In this embodiment, each of the opposing surfaces 11a and 12a of the base electrode 11 and the base electrode 12 has a corrugated shape. Here, the surface 11a of the base electrode 11 includes ridges 11a1 and valleys 11a2 that are repeated in turn. Likewise, the surface 12a of the base electrode 12 includes ridges 12a1 and valleys 12a2 that are repeated in turn. The ridges 11a1 of the base electrode 11 are in a face-to-face relationship with the valleys 12a2 of the base electrode 12. The valleys 11a2 of the base electrode 11 are in a face-to-face relationship with the ridges 12a1 of the base electrode 12. In addition, the surface 11a of the base electrode 11 is entirely covered by the insulating layer 11b. The surface 12a of the base electrode 12 is entirely covered by the insulating layer 12b.

The base electrodes 11 and 12 are connected in parallel by a wire 31a. The first terminal 31 is provided on the wire 31a. The base electrodes 11 and 12 are connected to the power supply 50 via the first terminal 31. The counter electrode 21 is provided with a second terminal 32. The counter electrode 21 is connected to the power supply 50 via the second terminal 32. The power supply 50 is provided with a switch 52 that is switched ON and OFF. In the embodiment shown in FIGS. 9 and 10, the power supply 50 is a direct current power supply. The base electrodes 11 and 12 are connected to the positive electrode of the power supply 50. The counter electrode 4 is connected to the negative electrode of the power supply 50.

When the switch 52 is turned ON, the base electrodes 11 and 12, which are connected to the positive electrode of the power supply 50, are charged with a positive charge. The counter electrode 21, which is connected to the negative electrode of the power supply 50, is charged with a negative charge. Then, Coulomb forces occur between the base electrode 11 and the counter electrode 21 and between the base electrode 12 and the counter electrode 21. The base electrodes 11 and 12 and the counter electrode 21 are attracted to each other by the Coulomb forces. The counter electrode 21 has flexibility such as to be deformable by the Coulomb forces that act between the base electrodes 11, 12 and the counter electrode 21. As a result, when the Coulomb forces act between the base electrodes 11, 12 and the counter electrode 21, the counter electrode 21 is clamped and deformed between the base electrode 11 and the base electrode 12, as illustrated in FIG. 10. As the counter electrode 21 deforms, the base electrode 11 and the base electrode 12 approach each other. Then, the ridges 11a1 of the base electrode 11 intermesh with the valleys 12a2 of the base electrode 12. Likewise, the valleys 11a2 of the base electrode 11 intermesh with the ridges 12a1 of the base electrode 12.

When the switch 52 is turned from ON to OFF, the Coulomb forces disappear from the gap between the base electrode 11 and the counter electrode 21 and from the gap between the base electrode 12 and the counter electrode 21. When the Coulomb forces disappear, the counter electrode 21 attempts to return to its original shape. By such a restoring force of the counter electrode 21, the base electrode 11 and the base electrode 12 are detached from each other, as illustrated in FIG. 9. Thus, in the actuator 10C, when the switch 52 is turned ON, the counter electrode 21 is deformed by the Coulomb forces, and as a result, the base electrode 11 and the base electrode 12 are attracted to each other (see FIG. 10). When the switch 52 is turned OFF, the Coulomb forces disappear, and the counter electrode 21 is returned to the original shape. As a result, the base electrode 11 and the base electrode 12 are detached from each other (see FIG. 9). The counter electrode 21 may employ a member having a required elastic force such as to be able to detach the base electrode 11 and the base electrode 12 from each other when the switch 52 is turned from ON to OFF. It should be noted that the degree to which the counter electrode 21 returns to the original shape when the switch 52 is turned from ON to OFF depends on the elastic property of the counter electrode 21. For this reason, it is possible that the counter electrode 21 may not necessarily return to the original shape when the switch 52 is turned from ON to OFF.

As described above, in the actuator 10C, when no voltage is applied between the first terminal 31 and the second terminal 32, the base electrode 11 and the base electrode 12 are detached from each other (see FIG. 9). In a state in which a voltage is applied between the first terminal 31 and the second terminal 32, a Coulomb force occurs, so that the base electrode 11 and the base electrode 12 are brought close each other (see FIG. 10). The amount of displacement obtained by the actuator 10C is represented by a difference (d1−d2), where d1 is the distance between the base electrode 11 and the base electrode 12 when they are detached from each other (see FIG. 9) and d2 is the distance between the base electrode 11 and the base electrode 12 when they are brought close to each other (see FIG. 10).

The Coulomb forces that act between the base electrode 11 and the counter electrode 21 and between counter electrode 21 and the base electrode 12 cause the actuator 10C to actuate. Strictly speaking, the Coulomb forces act along the protrusion-and-recess shapes of the base electrodes 11 and 12. Therefore, the direction in which the Coulomb forces act is not necessarily in agreement with the direction in which the actuator 10C operates. The magnitude of the voltage to be applied by the power supply 50 may be a required magnitude of voltage that is necessary to obtain a required Coulomb force.

In the actuator 10C disclosed herein, the gap between the base electrodes 11 and 12 narrows as the counter electrode 21 deforms such as to fit the protrusion-and-recess shape of the base electrodes 11 and 12 when a voltage is applied between the first terminal 31 and the second terminal 32. On the other hand, the gap between the base electrodes 11 and 12 widens as the counter electrode 21 returns to the original shape when no voltage is applied between the first terminal 31 and the second terminal 32. In the actuator 10C, the counter electrode 21 undergoes deformation mainly, but the insulating layers 11b and 12b do not undergo deformation. The actuator 10C is able to obtain displacement due to the bending deformation of the counter electrode 21. The actuator 10C is easier to obtain a greater deformation volume than a piezoelectric element in which a dielectric elastic body is sandwiched between a pair of electrodes and the dielectric elastic body is compressively deformed by a Coulomb force acting between the pair of electrodes. Moreover, in the actuator 10C disclosed herein, the deformation volume of the insulating layers 11b and 12b is negligible in comparison with that of the counter electrode 21. For this reason, the insulating layers 11b and 12b may employ a material that is made of an inorganic material and has a high relative dielectric constant.

For example, it is possible that the first insulating layer 11b and the second insulating layer 12b may employ a material that has a high dielectric breakdown strength and is able to be thinly coated. The first insulating layer 11b and the second insulating layer 12b may employ an inorganic material having a high relative dielectric constant, such as barium titanate. When the first insulating layer 11b and the second insulating layer 12b employ an inorganic material having a high relative dielectric constant, it is possible to obtain a greater Coulomb force between the base electrode 11 and the counter electrode 21 and between the counter electrode 21 and the base electrode 12. When the Coulomb force is greater, it is easier to deform the counter electrode 21 when the switch 52 is ON. In addition, when the Coulomb force is greater, it is possible to employ a material with a greater rigidity for the counter electrode 21. Employing a material with a greater rigidity for the counter electrode 21 allows the counter electrode 21 to return to its original shape more easily when the switch 52 is turned OFF, and allows the base electrode 11 and the base electrode 12 to be detached from each other more easily. Thus, when employing a material with a higher relative dielectric constant, the actuator 10C is provided with improved functionality.

As described above, the adjacent ones of the base electrodes 11 and 12 of the actuator 10C have opposing surfaces 11a and 12a that oppose each other across the counter electrode 21, and the opposing surfaces 11a and 12a have protrusion-and-recess shapes intermeshable with each other and are covered by the insulating layers 11b and 12b, respectively. The actuator 10C is able to obtain a required displacement according to the deformation and the restoring force of the counter electrode 21. FIGS. 9 and 10 each illustrate an example in which the opposing surfaces 11a and 12a of the base electrodes 11 and 12 each have a corrugated shape, in which ridges 11a1 and 12a1 and valleys 11a2 and 12a2 are formed alternately. However, the opposing surfaces 11a and 12a of the base electrodes 11 and 12 are not limited to having such a shape.

Actuator 10D

Figure 11:
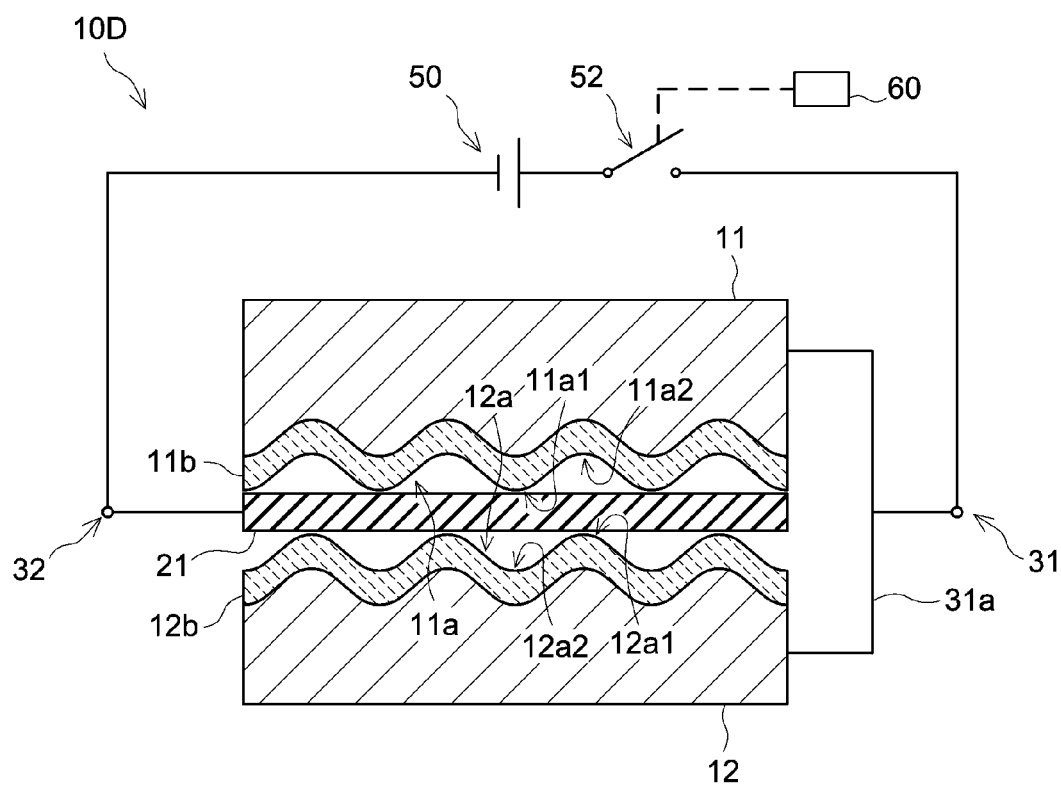
FIG. 11 is a cross-sectional view schematically illustrating an actuator 10D according to another embodiment of the disclosure.
Figure 12:
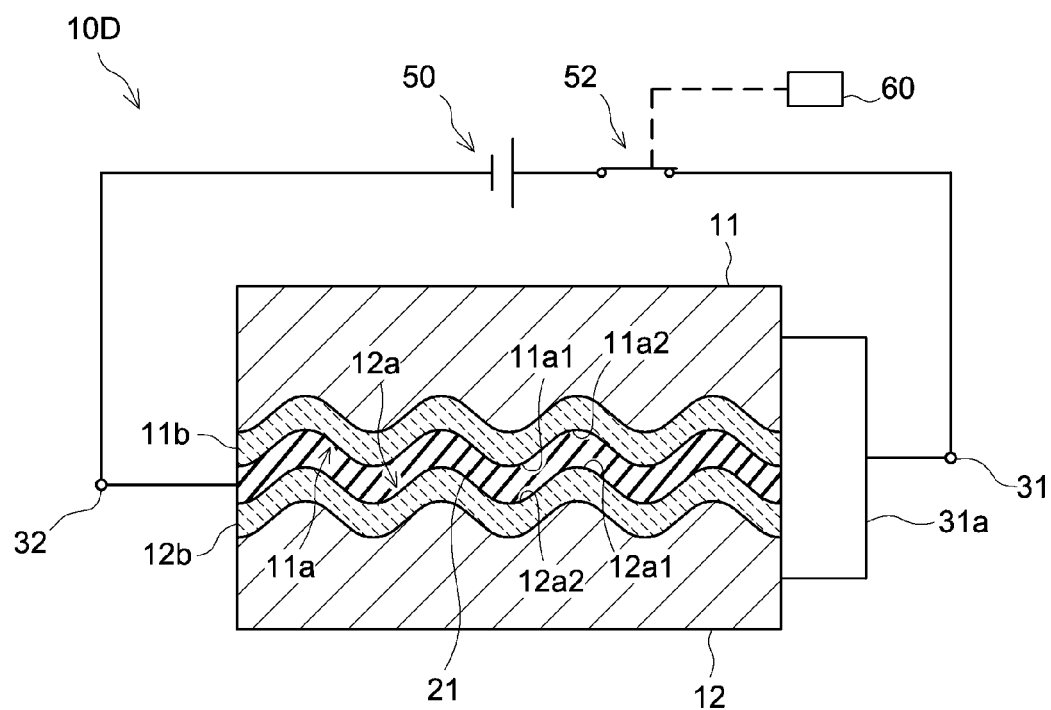
FIG. 12 is a cross-sectional view schematically illustrating the actuator 10D according to another embodiment of the disclosure.

FIGS. 11 and 12 each show a cross-sectional view schematically illustrating an actuator 10D according to another embodiment. Here, FIG. 11 shows the actuator 10D in which the switch 52 is in the OFF state. FIG. 12 shows the actuator 10D in which the switch 52 is in the ON state. In the actuator 10D, the opposing surfaces 11a and 12a of the base electrode 11 and the base electrode 12 each have a corrugated shape formed by a gently curved surface, as illustrated in FIG. 11. In other respects, the actuator 10D has the same configuration as the actuator 10C shown in FIGS. 9 and 10.

In the actuator 10D, Coulomb force act between the base electrodes 11, 12 and the counter electrode 21 when the switch 52 is turned ON. Then, as illustrated in FIG. 12, the Coulomb forces cause the base electrodes 11, 12 and the counter electrode 21 to stick to each other. In this case, the counter electrode 21 deforms so that the ridges 11a1 of the base electrode 11 intermesh with the valleys 12a2 of the base electrode 12. Likewise, the valleys 11a2 of the base electrode 11 intermesh with the ridges 12a1 of the base electrode 12. In the actuator 10D, the opposing surfaces 11a and 12a of the base electrode 11 and the base electrode 12 each have a corrugated shape formed by a gently curved surface. Therefore, the counter electrode 21 deforms such as to fit the gently curved surface. The actuator 10D is unlikely to cause a stress concentration in the counter electrode 21 in comparison with the actuator 10C.

Actuator 10E

Figure 13:
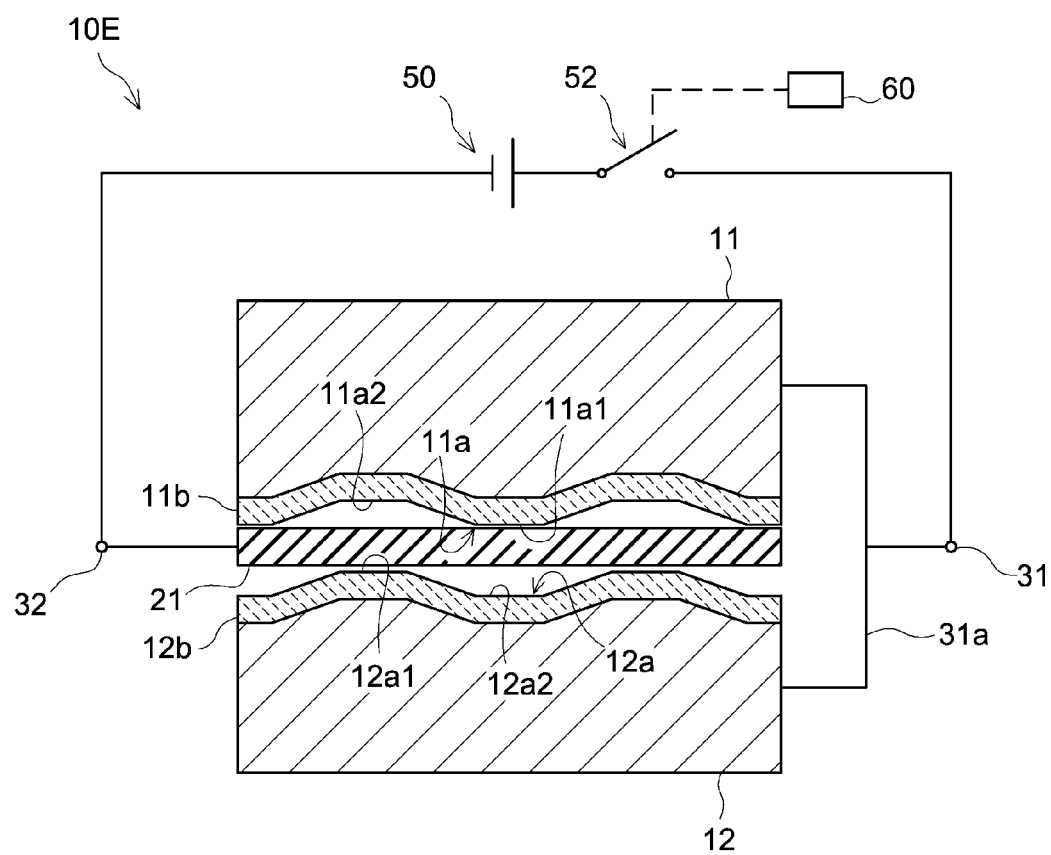
FIG. 13 is a cross-sectional view schematically illustrating an actuator 10E according to another embodiment of the disclosure.
Figure 14:
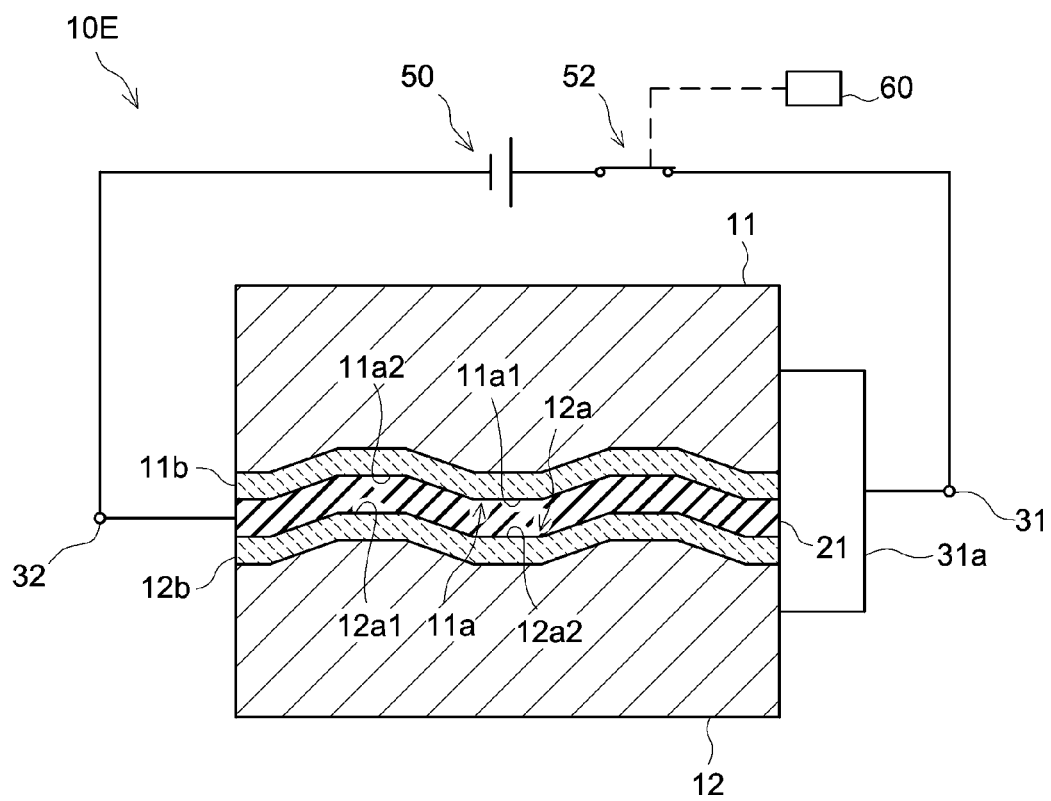
FIG. 14 is a cross-sectional view schematically illustrating the actuator 10E according to another embodiment of the disclosure.

FIGS. 13 and 14 each show a cross-sectional view schematically illustrating an actuator 10E according to another embodiment. Here, FIG. 13 shows the actuator 10E in which the switch 52 is in the OFF state. FIG. 14 shows the actuator 10E in which the switch 52 is in the ON state. In the actuator 10E, the opposing surfaces 11a and 12a of the base electrode 11 and the base electrode 12 each have a corrugated shape including ridges 11a1 and 12a1 and valleys 11a2 and 12a2, as illustrated in FIGS. 13 and 14. Each of the ridges 11a1, 12a1 is provided with a flat top portion, and an inclined surface is formed from the top portion. Each of the valleys 11a2, 12a2 is provided with a flat bottom portion, and an inclined surface is formed from the bottom portion. In other respects, the actuator 10E has the same configuration as the actuator 10C shown in FIGS. 9 and 10.

In this case, as illustrated in FIG. 13, the flat surfaces of the top portions of the ridges 11a1 and 12a1 abut against the counter electrode 21 when the switch 52 is OFF. When the switch 52 is turned ON, Coulomb forces are generated. At this time, the flat surfaces of the top portions of the ridges 11a1 and 12a1 and the counter electrode 21, which abut each other, stick to each other immediately. Then, as illustrated in FIG. 14, starting from the top portions of ridges 11a1 and 12a1, the counter electrode 21 is deformed to fit the inclined surfaces from the top portions of the ridges 11a1, 12a1 and is sandwiched between the ridges 11a1 and 12a1 and the valleys 11a2 and 12a2. In this process, because the flat surfaces of the top portions of the ridges 11a1 and 12a1 abut against the counter electrode 21 when the switch 52 is OFF, the counter electrode 21 can deform more easily and smoothly to fit the shape of the ridges 11a1 and 12a1 when the switch 52 is turned ON.

Actuator 10F

Figure 15:
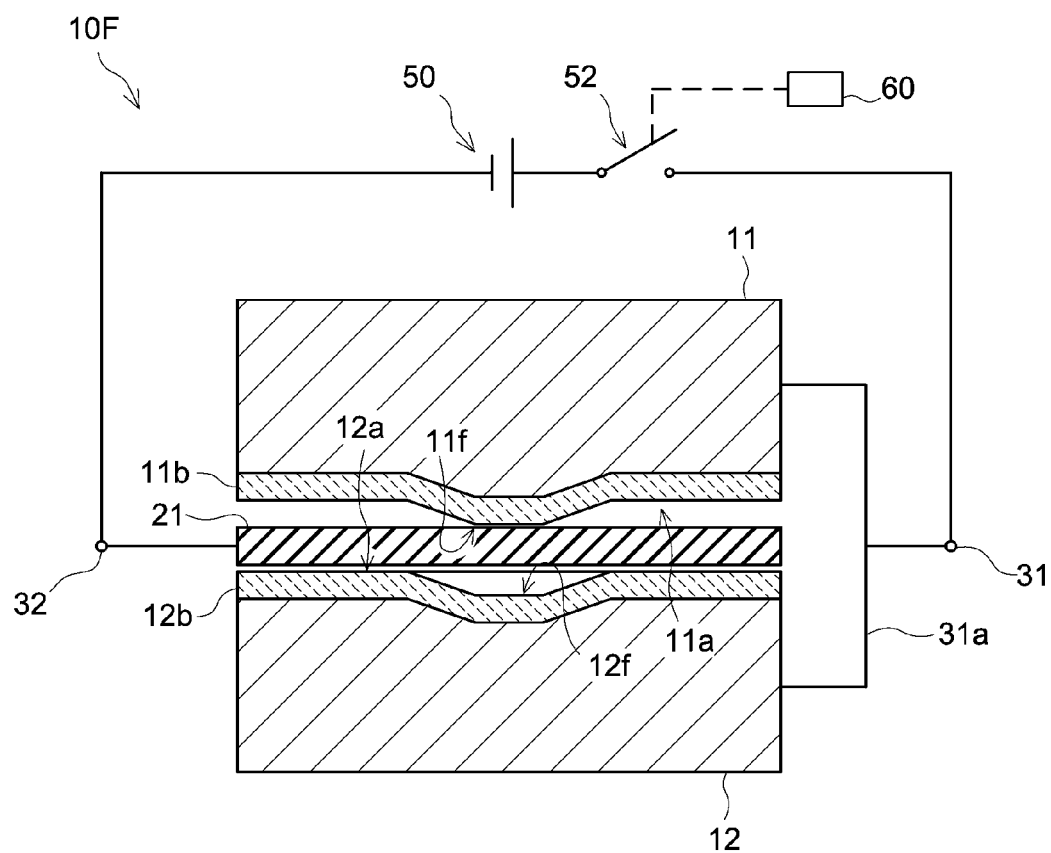
FIG. 15 is a cross-sectional view schematically illustrating an actuator 10F according to another embodiment of the disclosure.
Figure 16:
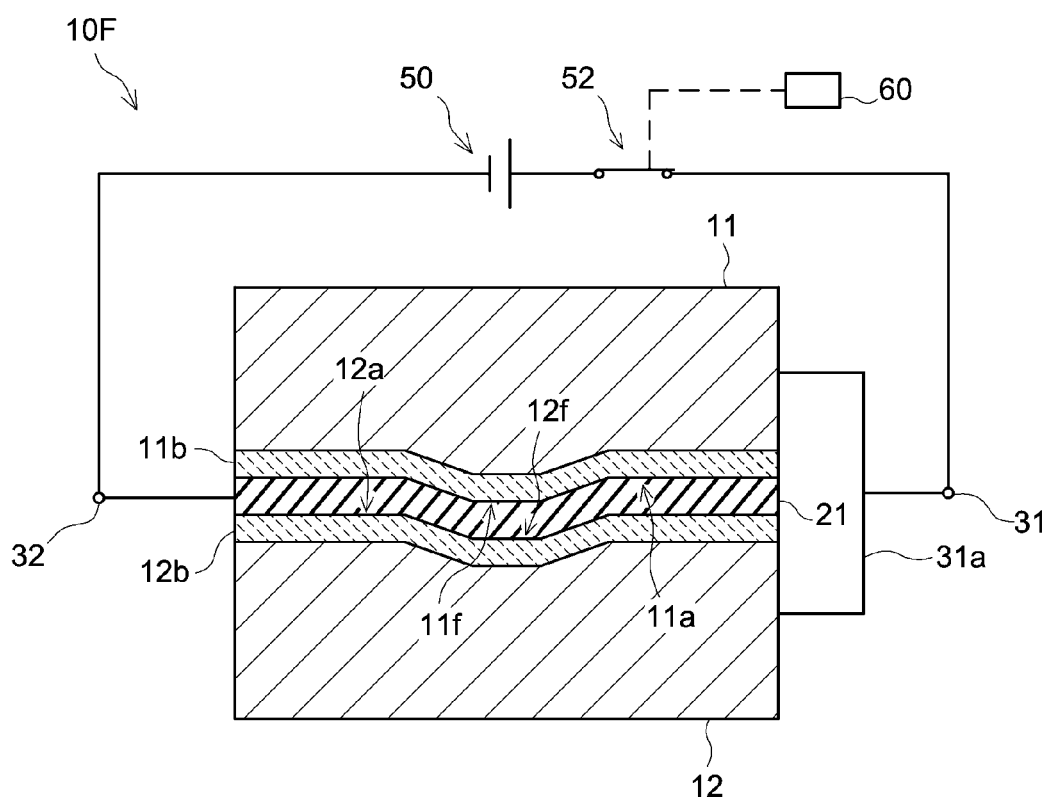
FIG. 16 is a cross-sectional view schematically illustrating the actuator 10F according to another embodiment of the disclosure.

FIGS. 15 and 16 each show a cross-sectional view schematically illustrating an actuator 10F according to another embodiment. Here, FIG. 15 shows the actuator 10F in which the switch 52 is in the OFF state. FIG. 16 shows the actuator 10F in which the switch 52 is in the ON state.

In the actuator 10F, the base electrode 11 and the base electrode 12 oppose each other across the counter electrode 21. In the example shown in FIG. 15, the base electrode 11 includes a protuberance 11f on a surface 11a that opposes the base electrode 12. The base electrode 12 includes a recess 12f in a surface 12a that opposes the base electrode 11. The protuberance 11f and the recess 12f are in a face-to-face relationship with each other. The protuberance 11f is a frustrum-shaped protuberance. The recess 12f is a frustrum-shaped recess in which the protuberance 11f can fit.

When the switch 52 is turned ON, Coulomb forces act between the base electrodes 11, 12 and the counter electrode 21, as illustrated in FIG. 16. Then, the Coulomb forces cause the base electrodes 11, 12 and the counter electrode 21 to stick to each other In this case, the counter electrode 21 deforms so that the protuberance 11f of the base electrode 11 intermeshes with the recess 12f of the base electrode 12. As described above, it is possible to employ an embodiment in which the base electrode 11 is provided with the protuberance 11f only and the base electrode 12 is provided with the recess 12f only. It is also possible that the protuberance 11f and the recess 12f may have a frustrum shape. However, the protuberance 11f and the recess 12f are not limited to having a frustrum shape. The protuberance and the recess may have a smooth curved surface, such as a hemispherical shape (such as shown in FIG. 7). As described above, the base electrodes 11 and 12 may have opposing surfaces 11a and 12a that oppose each other across the counter electrode 21, and the opposing surfaces 11a and 12a have protrusion-and-recess shapes that are intermeshable with each other. The protrusion-and-recess shape is not limited to a corrugated shape, but may be various shapes.

Although not shown in the drawings herein, the actuator 10 may include a guide that guides the movements of the first base electrode 11 and the second base electrode 12. The guide serves to stabilize the movements of the first base electrode 11 and the second base electrode 12 when they are brought close to each other and when they are detached from each other. The guide may be composed of an insulating material so as not to adversely affect the operation of the actuator 10.

It is also possible that a plurality of base electrodes may be arranged so as to face each other, and respective counter electrodes 21 may be disposed between adjacent ones of the base electrodes that face each other. Such an actuator makes it possible to obtain a greater amount of displacement.

Actuator 10G

Figure 17:
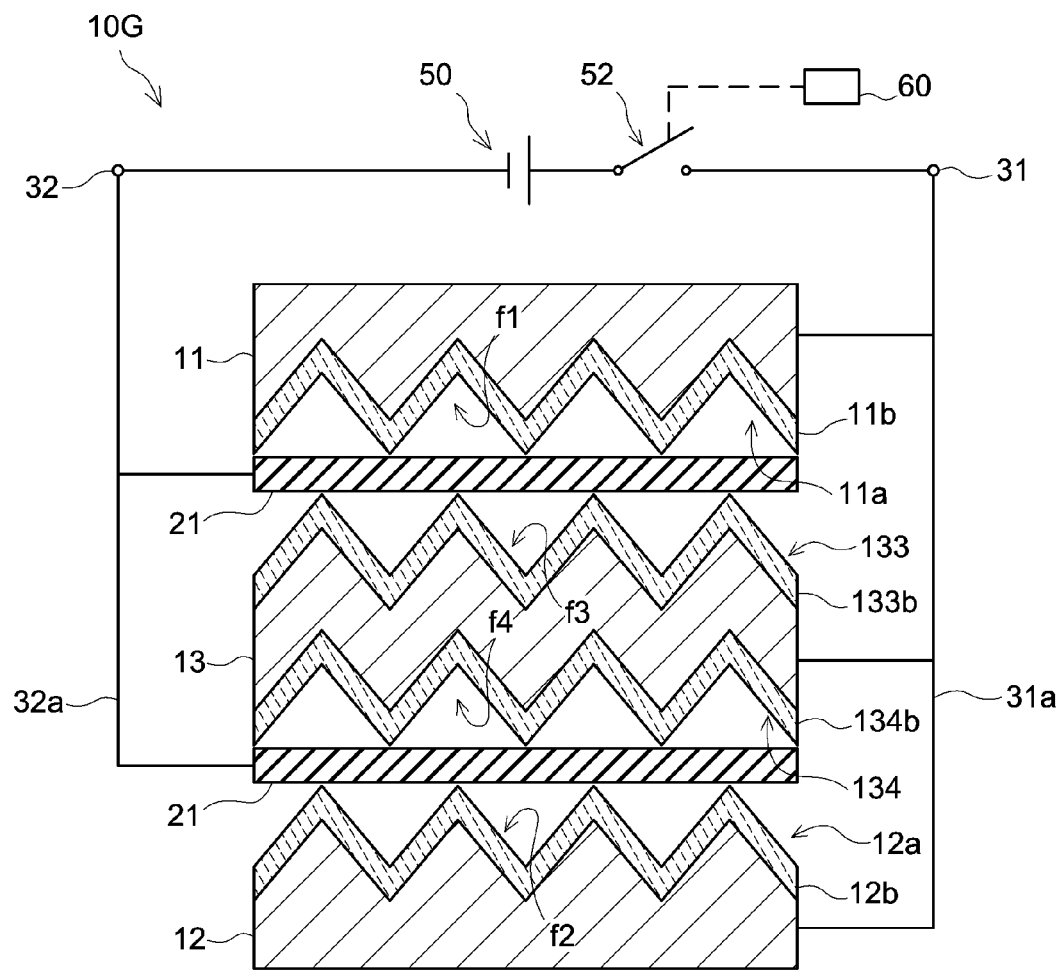
FIG. 17 is a cross-sectional view schematically illustrating an actuator 10G according to another embodiment of the disclosure.
Figure 18:
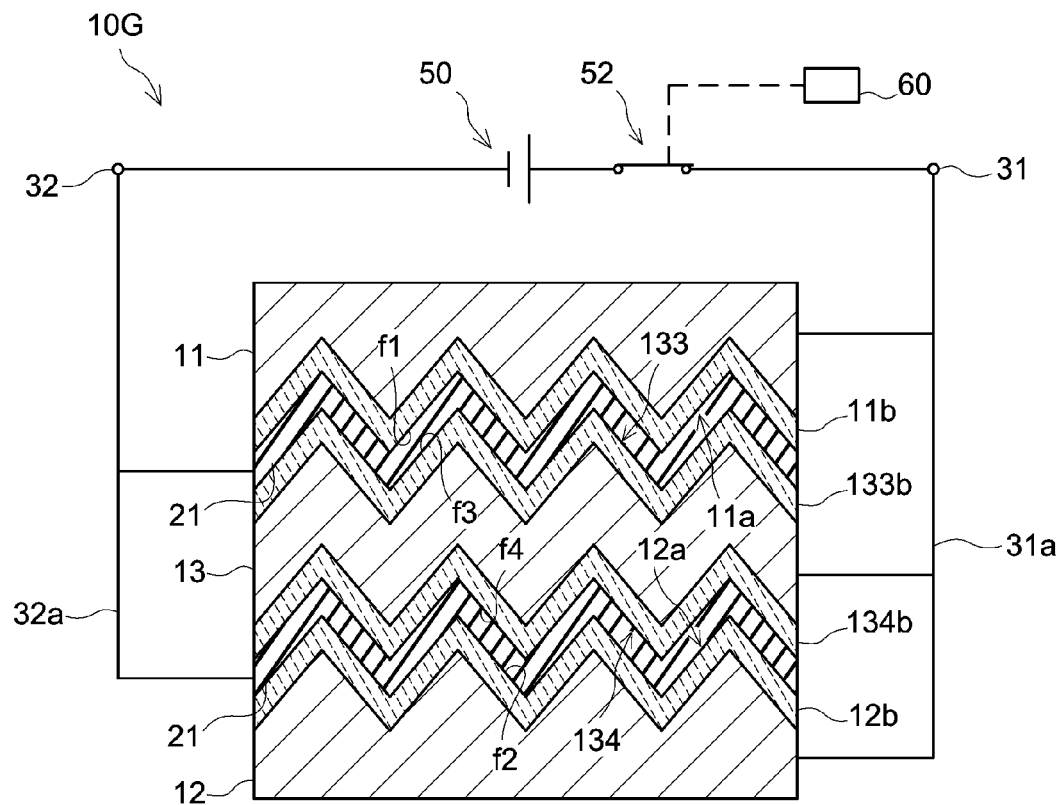
FIG. 18 is a cross-sectional view schematically illustrating the actuator 10G according to another embodiment of the disclosure.

FIGS. 17 and 18 each show a cross-sectional view schematically illustrating an actuator 10G according to another embodiment. Here, FIG. 17 shows the actuator 10G in which the switch 52 is in the OFF state. FIG. 18 shows the actuator 10G in which the switch 52 is in the ON state.

As illustrated in FIG. 17, the actuator 10G includes a first base electrode 11, a second base electrode 12, and an intermediate base electrode 13. The second base electrode 12 is disposed spaced apart from the first base electrode 11. The intermediate base electrode 13 is disposed between the first base electrode 11 and the second base electrode 12. Counter electrodes 21 are respectively disposed between the first base electrode 11 and the intermediate base electrode 13 and between the second base electrode 12 and the intermediate base electrode 13;

In the embodiment shown in FIG. 17, the intermediate base electrode 13 is a plate-shaped electrode. In the embodiment shown in FIG. 17, only one intermediate base electrode 13 is provided. As for the counter electrodes 21, one counter electrode 21 is disposed between the first base electrode 11 and the intermediate base electrode 13, and another counter electrode 21 is disposed between the intermediate base electrode 13 and the second base electrode 12. In other words, the first base electrode 11 and the intermediate base electrode 13 oppose each other across one of the counter electrodes 21, and the second base electrode 13 and the intermediate base electrode 13 oppose each other across the other one of the counter electrodes 21.

The first terminal 31 is connected to the plurality of base electrodes 11 to 13. This embodiment is provided with a first wire 31a that connects the plurality of base electrodes 11 to 13 in parallel. The first terminal 31 is provided on the just-mentioned first wire 31a. The first terminal 31 is connected to a power supply 50 via the first wire 31a. In this embodiment, the first terminal 31 is connected to the positive electrode of the power supply 50.

The second terminal 32 is connected to the plurality of counter electrodes 21. This embodiment is provided with a second wire 32a that connects the plurality of counter electrodes 21 in parallel. The second terminal 32 is provided on the just-mentioned second wire 32a. The second terminal 32 is connected to the power supply 50 via the second wire 32a. In this embodiment, the second terminal 32 is connected to the negative electrode of the power supply 50. The power supply 50 is provided with a switch 52. The switch 52 is switched between ON and OFF states by a controller 60.

The first base electrode 11 includes a first surface 11a facing the intermediate base electrode 13. The first surface 11a has a first protrusion-and-recess shape f1 and is covered by a first insulating layer 11b.

The second base electrode 12 includes a second surface 12a facing the intermediate base electrode 13. The second surface has a second protrusion-and-recess shape f2 and is covered by a second insulating layer 12b.

The intermediate base electrode 13 includes a third surface 133 facing toward the first base electrode 11 The third surface 133 has a third protrusion-and-recess shape f3 engageable with the first protrusion-and-recess shape f1 and is covered by a third insulating layer 133b.

The intermediate base electrode 13 further includes a fourth surface 134 facing toward the second base electrode 12. The fourth surface 134 has a fourth protrusion-and-recess shape f4 engageable with the second protrusion-and-recess shape f2 and is covered by a fourth insulating layer 134b.

In this embodiment, the first protrusion-and-recess shape f1, the second protrusion-and-recess shape f2, the third protrusion-and-recess shape f3, and the fourth protrusion-and-recess shape f4 each have a corrugated shape. Here, the first protrusion-and-recess shape f1 of the first base electrode 11 and the third protrusion-and-recess shape f3 of the intermediate base electrode 13 have shapes that are engageable with each other such that ridges and valleys oppose each other. The second protrusion-and-recess shape f2 of the second base electrode 12 and the fourth protrusion-and-recess shape f4 of the intermediate base electrode 13 have shapes that are engageable with each other such that ridges and valleys oppose each other.

In this case, when the switch 52 is OFF, the actuator 10G is as illustrated in FIG. 17, in which the counter electrodes 21 keep the first base electrode 11 and the intermediate base electrode 13 detached from each other and also keep the intermediate base electrode 13 and the second base electrode 12 detached from each other. Thus, the gap between the first base electrode 11 and the second base electrode 12 is kept wide.

As illustrated in FIG. 18, when the switch 52 is ON, Coulomb forces act between the first base electrode 11 and one of the counter electrodes 21 and the intermediate base electrode 13 as well as between the intermediate base electrode 13 and the other one of the counter electrodes 21 and the second base electrode 12. When the Coulomb forces occur, the first base electrode 11, the intermediate base electrode 13, and the second base electrode 12 stick to each other across the counter electrodes 21. Also, the counter electrodes 21 deform between the first base electrode 11 and the intermediate base electrode 13 and between the intermediate base electrode 13 and the second base electrode 12. Then, the first protrusion-and-recess shape f1 of the first base electrode 11 and the third protrusion-and-recess shape f3 of the intermediate base electrode 13 sandwich one of the counter electrodes 21 therebetween such that the ridges and valleys engage with each other. The second protrusion-and-recess shape f2 of the second base electrode 12 and the fourth protrusion-and-recess shape f4 of the intermediate base electrode 13 sandwich the other one of the counter electrodes 21 therebetween such that the ridges and valleys engage with each other. Thus, the gap between the first base electrode 11 and the second base electrode 12 narrows.

As described above, in the actuator 10G, the gap between the first base electrode 11 and the second base electrode 12 narrows when the switch 52 is turned ON. When the switch 52 is turned OFF, the gap between the first base electrode 11 and the second base electrode 12 widens. This actuator 10G is able to output the amount of displacement of the second base electrode 12 with respect to the first base electrode 11 as the motion amount of the actuator 10G.

The actuator 10G is provided with two counter electrodes 21 and one intermediate base electrode 13 between the first base electrode 11 and the second base electrode 12. In contrast, the actuator 10C as shown in FIGS. 9 and 11 is provided with only one counter electrode 21 between the first base electrode 11 and the second base electrode 12. Assuming that the protrusion-and-recess shapes of the opposing surfaces of the base electrodes 11, 12, and 13 and the configurations of the counter electrode 21 and the like are the same, the actuator 10G is able to output two times the motion amount of the actuator 10C shown in FIGS. 9 and 10.

Actuator 10H

Figure 19:
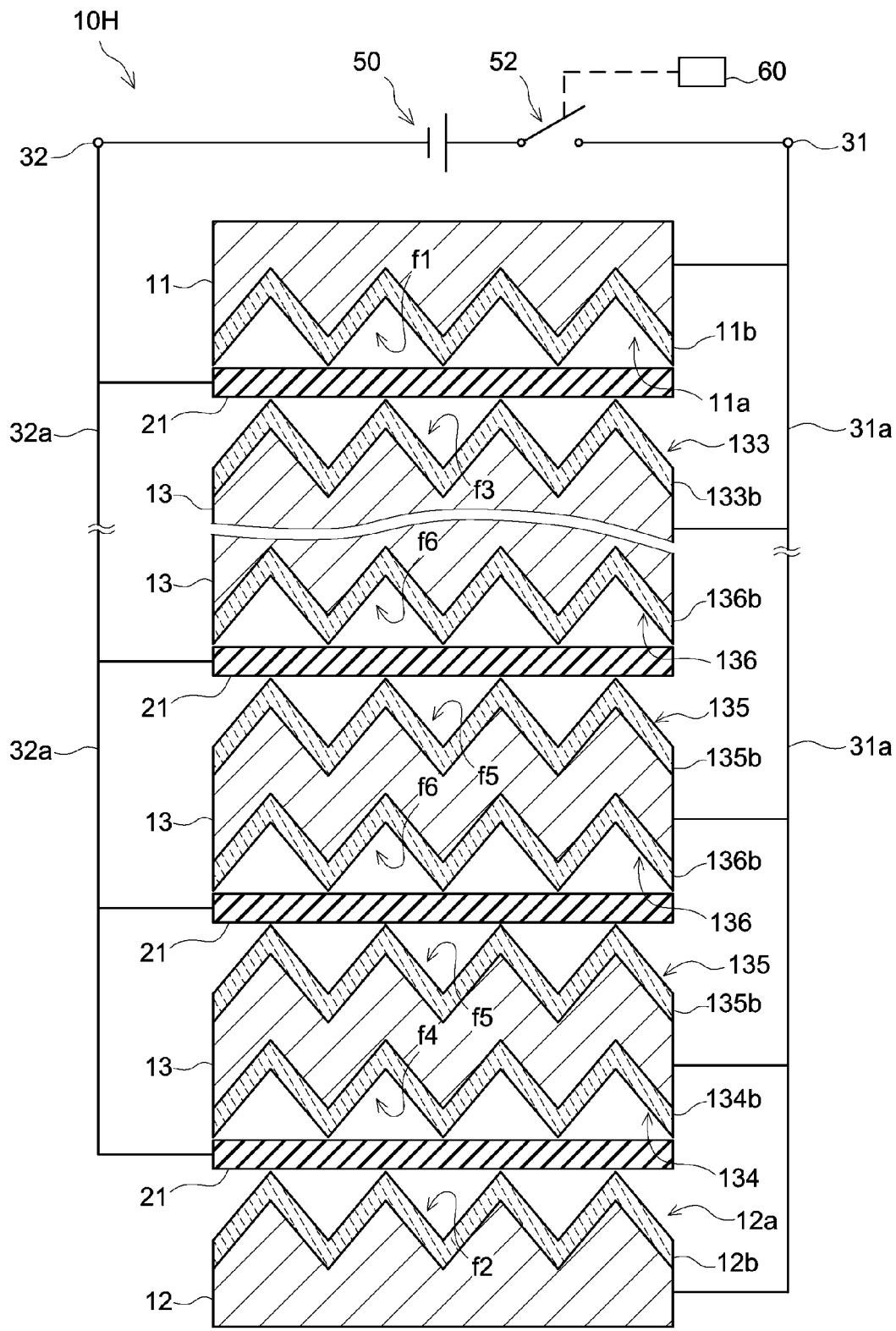
FIG. 19 is a cross-sectional view schematically illustrating an actuator 10H according to another embodiment of the disclosure.
Figure 20:
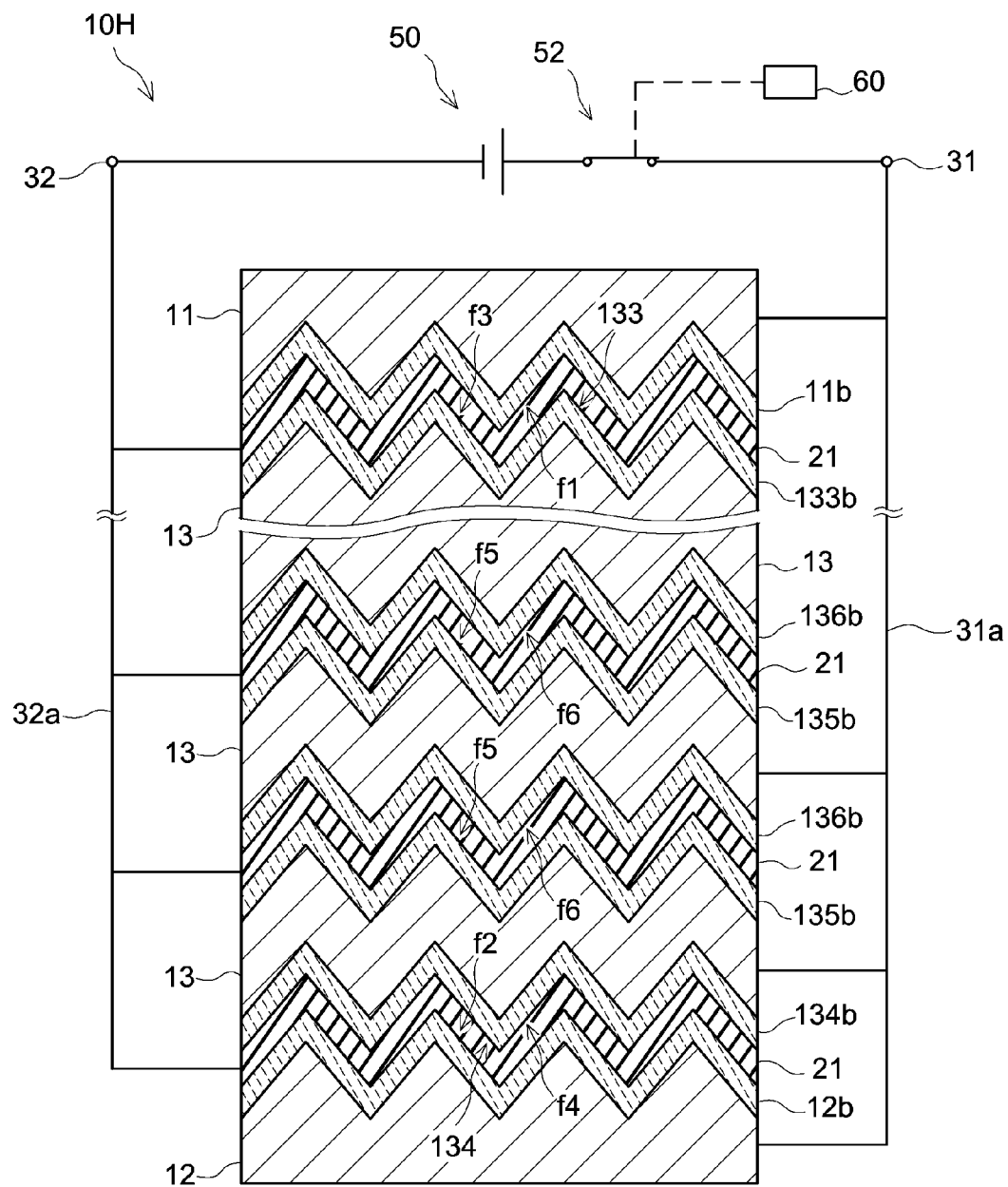
FIG. 20 is a cross-sectional view schematically illustrating the actuator 10H according to another embodiment of the disclosure.

FIGS. 19 and 20 each show a cross-sectional view schematically illustrating an actuator 10H according to another embodiment. Here, FIG. 19 shows the actuator 10H in which the switch 52 is in the OFF state. FIG. 20 shows the actuator 10H in which the switch 52 is in the ON state.

As illustrated in FIG. 19, the actuator 10H includes a plurality of intermediate base electrodes 13 each serving as a base electrode. The plurality of intermediate base electrodes 13 are arranged in sequence between the first base electrode 11 and the second base electrode 12. Respective counter electrodes 21 are disposed between the plurality of intermediate base electrodes 13. Each one of the intermediate base electrodes 13 that is disposed between adjacent ones of the intermediate base electrodes 13 includes a fifth surface 135 facing toward the first base electrode 11. The fifth surface 135 has a fifth protrusion-and-recess shape f5 and is covered by a fifth insulating layer 135b. Each one of the intermediate base electrodes 13 that is disposed between adjacent ones of the intermediate base electrodes 13 includes a sixth surface 136 facing toward the second base electrode 12. The sixth surface has a sixth protrusion-and-recess shape f6 and is covered by a sixth insulating layer 136b.

In the actuator 10H, the counter electrodes 21 are each disposed between the base electrodes 11, 12, and 13 of the first base electrode 11, the second base electrode 12, and the plurality of intermediate base electrodes 13. When the switch 52 is OFF, the actuator 10H is such that, as shown in FIG. 19, the counter electrodes 21 keep the first base electrode 11 and the intermediate base electrode 13 detached from each other, keep the plurality of intermediate base electrodes 13 detached from each other, and keep the intermediate base electrode 13 and the second base electrode 12 detached from each other. Thus, the gap between the first base electrode 11 and the second base electrode 12 is kept wide.

When the switch 52 is ON, as illustrated in FIG. 20, Coulomb forces act between the first base electrode 11 and one of the counter electrodes 21 and one of the intermediate base electrodes 13, between adjacent ones of the intermediate base electrodes 13 and the counter electrode 21 sandwiched by the adjacent ones of the intermediate base electrodes 13, and between another of the intermediate base electrodes 13 and another of the counter electrodes 21 and the second base electrode 12. When the Coulomb forces occur, the first base electrode 11, the plurality of intermediate base electrodes 13, and the second base electrode 12 stick to each other across the counter electrodes 21. Thus, the respective counter electrodes 21 deform between the first base electrode 11 and one of the intermediate base electrodes 13, between the plurality of intermediate base electrodes 13, and between one of the intermediate base electrodes 13 and the second base electrode 12. Then, the first protrusion-and-recess shape f1 of the first base electrode 11 and the third protrusion-and-recess shape f3 of the intermediate base electrode 13 sandwich one of the counter electrodes 21 therebetween such that the ridges and valleys engage with each other. The fifth protrusion-and-recess shape f5 and the sixth protrusion-and-recess shape f6 of the intermediate base electrodes 13 sandwich another one of the counter electrodes 21 therebetween such that the ridges and valleys engage with each other. The second protrusion-and-recess shape f2 of the second base electrode 12 and the fourth protrusion-and-recess shape f4 of the intermediate base electrode 13 sandwich the other one of the counter electrodes 21 therebetween such that the ridges and valleys engage with each other. Thus, the gap between the first base electrode 11 and the second base electrode 12 narrows.

As described above, the actuator 10H narrows the gap between the first base electrode 11 and the second base electrode 12 when the switch 52 is turned ON, and widens the gap between the first base electrode 11 and the second base electrode 12 when the switch 52 is turned OFF. This actuator 10H is able to output the amount of displacement of the second base electrode 12 with respect to the first base electrode 11 as the motion amount of the actuator 10H.

The actuator 10H is provided with a plurality of intermediate base electrodes 13 disposed between the first base electrode 11 and the second base electrode 12. The counter electrodes 21 are disposed in the gaps between adjacent ones of the intermediate base electrodes 13. In the actuator 10H, a larger number of the intermediate base electrodes 13 is provided, and the respective counter electrodes 21 are interposed between the intermediate base electrodes 13. The actuator 10H is able to obtain a greater motion amount than the actuator 10G shown in FIG. 17 corresponding to the increased number of the intermediate base electrodes 13. For example, the motion amount of the actuator 10H is further increased by increasing the numbers of the intermediate base electrodes 13 and the counter electrodes 21 that are disposed between the first base electrode 11 and the second base electrode 12.

In the actuator 10H as just described, Coulomb forces act between the counter electrodes 21 and the base electrodes 11, 12, and 13 when the first terminal 31 and the second terminal 32 are connected to the power supply 50 and a voltage is applied therebetween. As a result, the plurality of base electrodes 11, 12, and 13 and the plurality of counter electrodes 21 are attracted to each other. When the applied voltage is turned OFF, the plurality of base electrodes 11, 12, and 13 are detached by the restoring force of the counter electrodes 21. Thus, the actuator 10H can be actuated by switching the voltage between ON and OFF.

In this actuator 10H, the insulating layers may be composed of a material that does not require flexibility and shows a high relative dielectric constant. For this reason, it is easy to generate a greater Coulomb force between the counter electrodes 21 and the base electrodes 11, 12, and 13. Moreover, the opposing surfaces of the adjacent electrodes have the protrusion-and-recess shapes that are engageable with each other. The counter electrodes are composed of a flexible electrical conductor that is deformable by the Coulomb forces acting between the base electrodes and the counter electrodes. Therefore, when the Coulomb forces occur, the counter electrodes 21 are deformed to fit the engageable protrusions and recesses of the adjacent electrodes, and when the Coulomb forces disappear, the adjacent electrodes are detached by the restoring force of the counter electrodes 21. Based on such an operation, the actuator 10H is able to output the displacement that occurs between the first base electrode 11 and the second base electrode 12 as the motion amount.

In this embodiment, each of the intermediate base electrodes 13 is in a flat plate shape, and the actuator 10H is displaced in a direction in which the intermediate base electrodes 13 are stacked. The intermediate base electrode 13 is not limited to being in a flat plate shape. For example, the intermediate base electrode 13 may be in such a shape that one end there is thicker, such as a fan-like shape, so that the actuator as a whole can be displaced along a circular arc direction. Thus, by changing the shape of the intermediate base electrode 13 along the thickness direction, it is possible to set the motion direction of the actuator.

Actuator 10I

Figure 21:
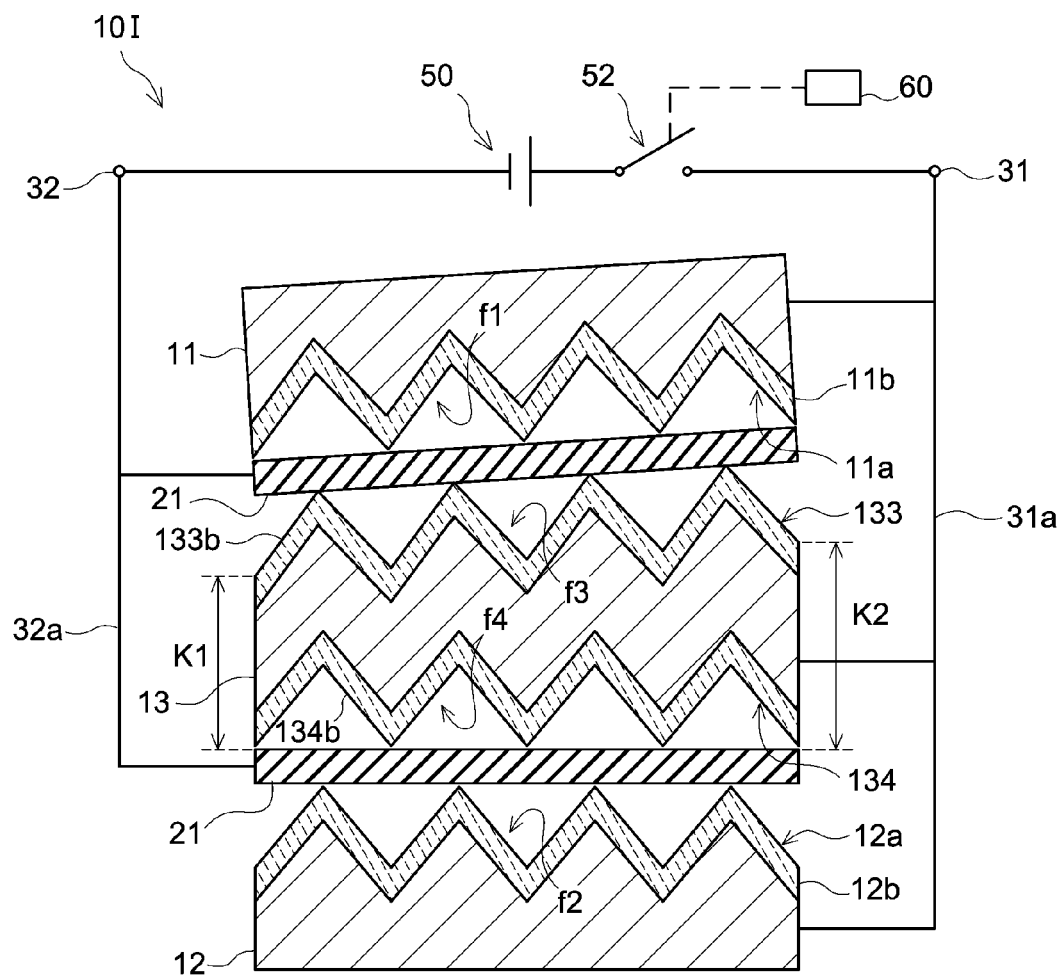
FIG. 21 is a cross-sectional view schematically illustrating an actuator 10I according to another embodiment of the disclosure.
Figure 22:
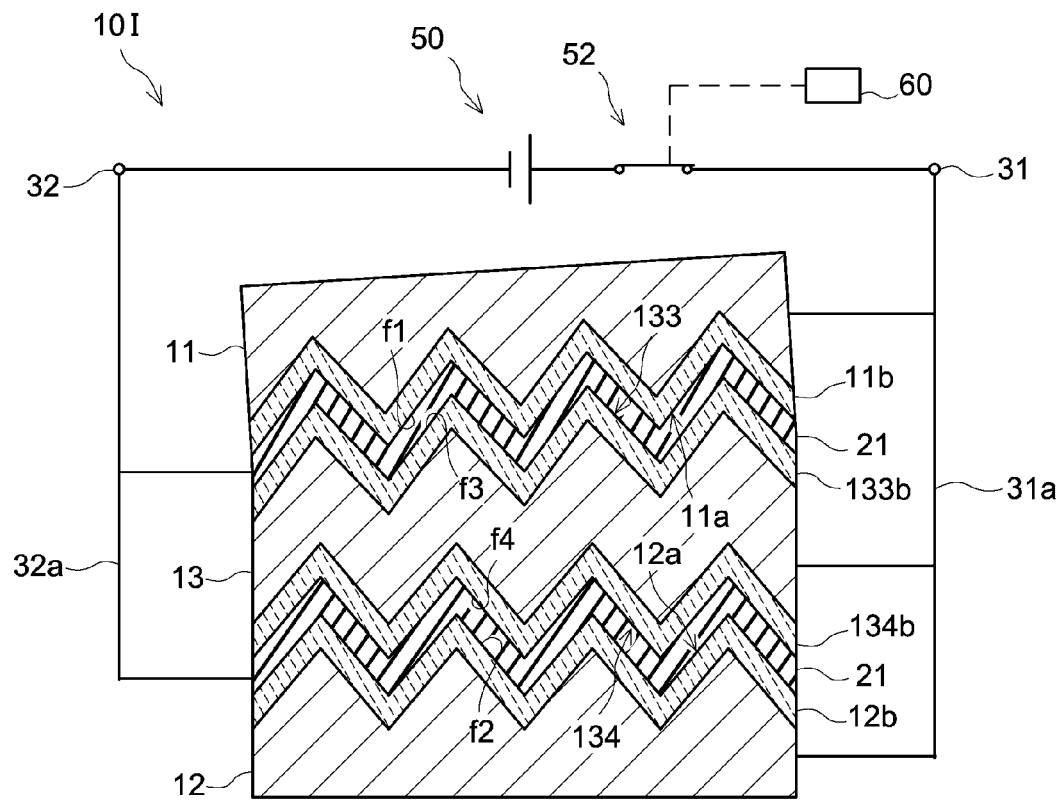
FIG. 22 is a cross-sectional view schematically illustrating the actuator 10I according to another embodiment of the disclosure.

FIGS. 21 and 22 each show a cross-sectional view schematically illustrating an actuator 10I according to another embodiment. Here, FIG. 21 shows the actuator 10I in which the switch 52 is in the OFF state. FIG. 22 shows the actuator 10I in which the switch 52 is in the ON state.

As illustrated in FIG. 21, the actuator 10I includes an intermediate base electrode 13 disposed between the first base electrode 11 and the second base electrode 12. The intermediate base electrode 13 is in a substantially flat plate shape, in which one side k1 along one end is thinner while the other side k2 is thicker. Therefore, the first base electrode 11 is inclined with respect to the second base electrode 12. In this actuator 10I, when the switch 52 is turned ON, Coulomb forces act between the base electrodes 11, 12, and 13 and the counter electrodes 21, as illustrated in FIG. 22. As a result, the plurality of base electrodes 11, 12, and 13 and the plurality of counter electrodes 21 are attracted to each other. When the applied voltage is turned OFF, the plurality of base electrodes 11, 12, and 13 are detached by the restoring force of the counter electrodes 21, as illustrated in FIG. 21. Thus, the actuator 10I can be actuated by switching the voltage between ON and OFF. In this case, the first base electrode 11 is inclined with respect to the second base electrode 12, and the first base electrode 11 moves in the inclined direction. It is also possible that a plurality of the intermediate base electrodes 13 may be disposed between the first base electrode 11 and the second base electrode 12. Thus, by changing the shape of the intermediate base electrode 13 along the thickness direction, it is possible to set the motion direction of the actuator.

As described above, some embodiments of the actuator disclosed herein includes a plurality of base electrodes 11, 12, and 13 arranged in sequence, and one or more counter electrodes 21 each disposed between adjacent ones of the base electrodes 11, 12, and 13, as illustrated in FIGS. 9 to 22. The first terminal 31 is connected to the plurality of base electrodes 11, 12, and 13. The second terminal 32 is connected to the one or more counter electrodes 21 each disposed between adjacent ones of the base electrodes. The adjacent ones of the base electrodes include opposing surfaces opposing each other across the one or more counter electrodes 21. The opposing surfaces have protrusion-and-recess shapes engageable with each other and each being covered by an insulating layer.

Actuator 200

Figure 23:
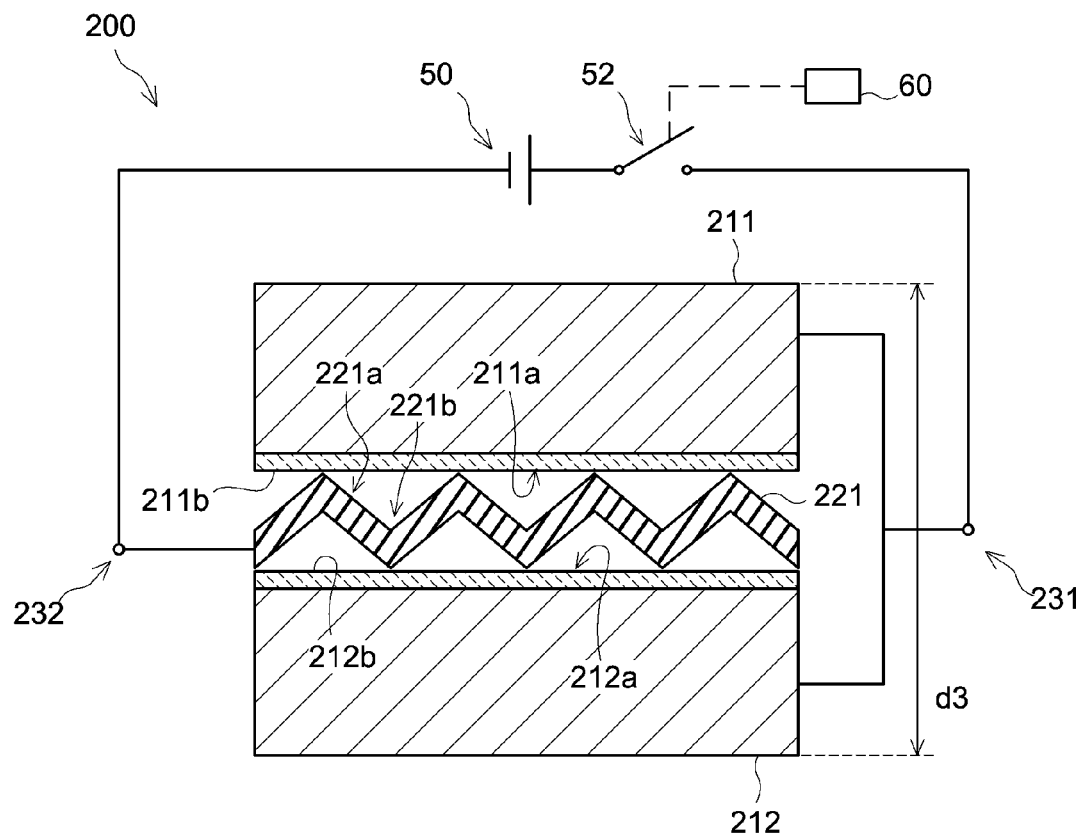
FIG. 23 is a cross-sectional view schematically illustrating an actuator 200 according to another embodiment of the disclosure.
Figure 24:
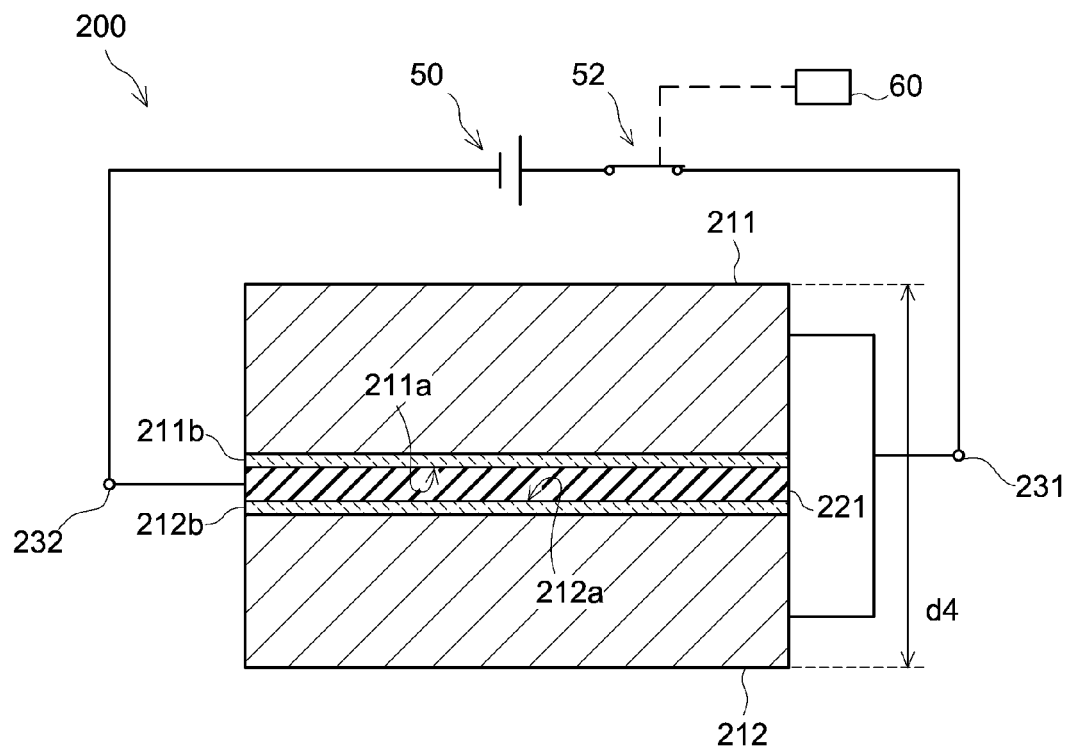
FIG. 24 is a cross-sectional view schematically illustrating the actuator 200 according to another embodiment of the disclosure.

FIGS. 23 and 24 each show a cross-sectional view schematically illustrating an actuator 200 according to another embodiment. Here, FIG. 23 shows the actuator 200 in which the switch 52 is in the OFF state. FIG. 24 shows the actuator 200 in which the switch 52 is in the ON state.

As illustrated in FIG. 23, the actuator 200 includes a first base electrode 211, a second base electrode 212, a counter electrode 221, a first terminal 231, and a second terminal 232. In this embodiment, each of the first base electrode 211, the second base electrode 212, and the counter electrode 221 is a plate-shaped member. The first base electrode 211 and the second base electrode 212 are disposed so as to be spaced apart from each other and to oppose each other. The counter electrode 221 is disposed between the first base electrode 211 and the second base electrode 212. The counter electrode 221 is a flat spring that is deformable in a direction in which the first base electrode 211 and the second base electrode 212 face each other.

In this embodiment, the first base electrode 211 and the second base electrode 212 respectively include a surface 211a and a surface 212a each opposing the counter electrode 221. Each of the surface 211a and the surface 212a is flat. The surface 211a is covered by an insulating layer 211b. The surface 212a is covered by an insulating layer 212b. The insulating layer 211b may be formed thinly so that a required Coulomb force can be produced between the first base electrode 211 and the counter electrode 221 that face each other. The insulating layer 212b may also be formed thinly so that a required Coulomb force can be produced between the second base electrode 212 and the counter electrode 221 that face each other. For the insulating layers 211b and 212b, it is possible to select an appropriate insulating material such that leakage current is reduced for the voltage applied to the base electrodes 211, 212 and the counter electrode 221. Examples of suitable materials for the insulating layers 211b and 212b have already been described in the description of the insulating layer 6 (see FIG. 1), and the description thereof will not be repeated herein.

Figure 25:
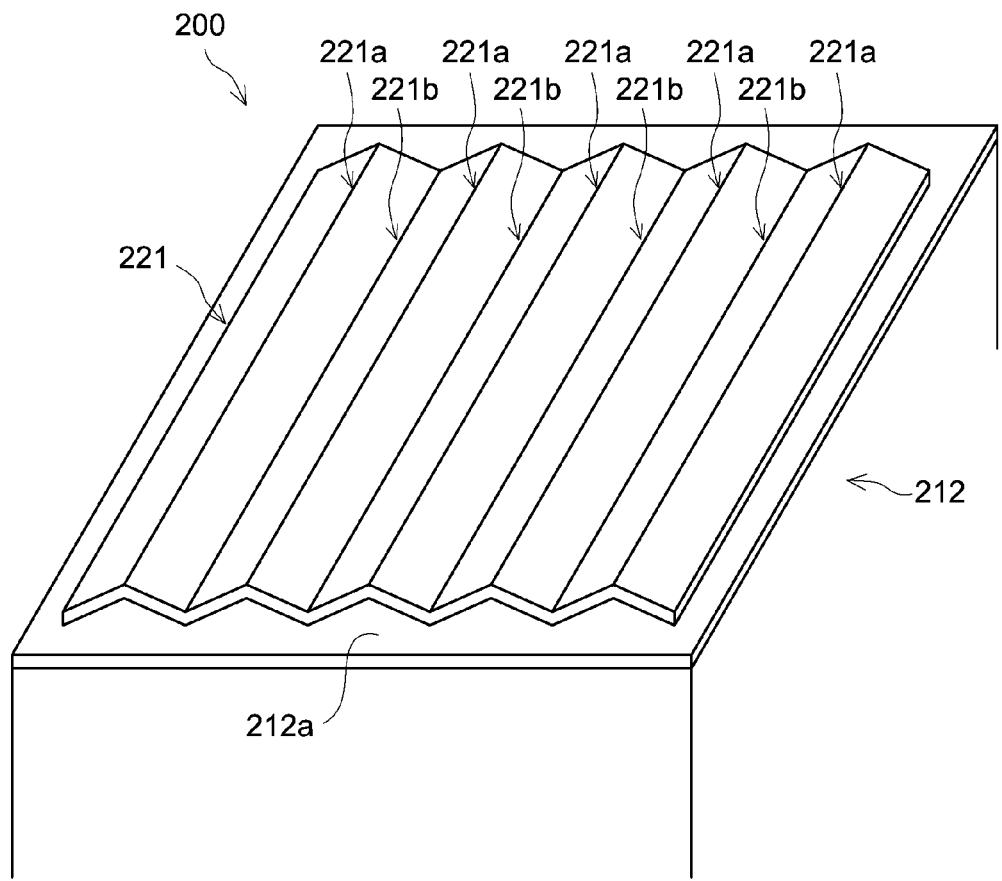
FIG. 25 is a perspective view schematically illustrating a counter electrode 221 disposed on a first base electrode 211.

FIG. 25 is a perspective view illustrating the counter electrode 221 disposed on the first base electrode 211. In this embodiment, the counter electrode 221 is in a corrugated shape, as illustrated in FIGS. 23 and 25. In the embodiment shown in FIG. 25, the counter electrode 221 is such that ridges 221a and valleys 221b, which extend in substantially one direction, appear repeatedly in a direction perpendicular to the direction in which the ridges 221a and the valleys 221b extend. In FIG. 23, the bulging portions are referred to as "ridges" and the recessed portions are referred to as "valleys", when viewed from the side on which the first base electrode 211 is provided. The counter electrode 221 is in a corrugated shape, and the valleys 221b are seen to bulge upward when viewed from the side on which the second base electrode 212 exists. The ridges 221a are seen to be recessed when viewed from the side on which the second base electrode 212 exists. The counter electrode 221 has flexibility such as to be deformable by the Coulomb force acting between the base electrode 211,212 and the counter electrode 221.

The first terminal 231 is connected to each of the first base electrode 211 and the second base electrode 212. The second terminal 232 is connected to the counter electrode 221. In this embodiment, the first base electrode 211 and the second base electrode 212 are connected in parallel by a wire 231a. The first terminal 231 is connected to the positive electrode of the power supply 50. The second terminal 232 is connected to the negative electrode of the power supply 50.

When the switch 52 is turned ON, the first base electrode 211 and the second base electrode 212 are connected to the positive electrode of the power supply 50 and charged with a positive charge. The counter electrode 221 is connected to the negative electrode of the power supply 50 and charged with a negative charge. Then, Coulomb forces occur between the first base electrode 211 and the counter electrode 221 and between the second base electrode 212 and the counter electrode 221. The first base electrode 211 and the counter electrode 221 as well as the second base electrode 212 and the counter electrode 221 are attracted to each other by the Coulomb forces. The counter electrode 221 has flexibility such as to be deformable by the Coulomb forces as described above.

As a result, when the Coulomb forces act between the first base electrode 211, the second base electrode 212, and the counter electrode 221, the counter electrode 221 sticks to the first base electrode 211 and the second base electrode 212, as illustrated in FIG. 24. As the counter electrode 221 deforms further, the area in which the counter electrode 221 sticks to the first base electrode 211 and the second base electrode 212 widens. Along with the deformation of the counter electrode 221, the first base electrode 211 and the second base electrode 212 approach each other. In this case, FIG. 24 depicts a state in which the counter electrode 221 has become flat by being deformed and sandwiched between the first base electrode 211 and the second base electrode 212. In actuality, the degree of deformation of the counter electrode 221 is dependent on the strength of the generated Coulomb forces and the elastic property of the counter electrode 221. For example, the counter electrode 221 may deform to such a degree that the ridges 221a and the valleys 221b of the counter electrode 221 are squashed so as to narrow the gap between the first base electrode 211 and the second base electrode 212. In other words, FIG. 24 is a mere illustration of a schematic example. The counter electrode 221 does not need to deform to be flat so as to fit the shape of the first base electrode 211 and the second base electrode 212 as shown in FIG. 24.

When the switch 52 is turned from ON to OFF, the Coulomb forces disappear from the gap between the first base electrode 211 and the counter electrode 221 and from the gap between the second base electrode 212 and the counter electrode 221. When the Coulomb forces disappear, the counter electrode 221 attempts to return to its original shape. By such a restoring force of the counter electrode 221, the first base electrode 211 and the second base electrode 212 are detached from each other, as illustrated in FIG. 23. The counter electrode 221 may employ a member having a required elastic force such as to be able to detach the base electrode 211 and the base electrode 212 from each other when the switch 52 is turned from ON to OFF.

In the actuator 200, when the switch 52 is ON, the first base electrode 211 and the second base electrode 212 approach each other (see FIG. 24). When the switch 52 is OFF, the first base electrode 211 and the second base electrode 212 are detached from each other (see FIG. 23). The amount of displacement obtained by the actuator 200 is represented by a difference (d3−d4), where d3 is the distance between the first base electrode 211 and the second base electrode 212 when they are detached from each other (see FIG. 23) and d4 is the distance between the first base electrode 211 and the second base electrode 212 when they are brought close to each other (see FIG. 24). The counter electrode 221 is deformed by the Coulomb force acting thereon, and is returned to the original shape when the Coulomb force acting thereon disappears. Thus, the counter electrode 221 may function like a flat spring. The actuator 200 is actuated by the Coulomb force produced when applying a voltage thereto and the elastic reaction force of the counter electrode 221.

It is ideal that when the switch 52 is turned from ON to OFF, the counter electrode 221 returns to the original shape. However, it is also possible that the counter electrode 221 may not necessarily return to the original shape completely. Even in such a case where the counter electrode 221 does not return to the original shape completely when the switch 52 is turned from ON to OFF, the actuator 200 is actuated because the first base electrode 211 and the second base electrode 212 are detached from each other.

In the actuator 10C shown in FIGS. 9 and 10, the opposing surfaces 11a and 12a of the base electrodes 11 and 12 include protrusions and recesses engageable with each other. In contrast, in the actuator 200 as shown in FIGS. 23 and 24, the opposing surfaces 211a and 212a of the first base electrode 211 and the second base electrode 212 may be processed to be flat. As a result, processing of the base electrodes 211 and 212 becomes easier. On the other hand, the counter electrode 221 does not need to match the shape with the opposing base electrodes 211 and 212. The counter electrode 221 may be composed of an elastomer mixed with an electrically conductive agent or a flat spring made of a sheet-shaped metal, for example. The counter electrode 221 may be formed into a predetermined shape. Because it is unnecessary to match the shape of the counter electrode 221 with the shape of the opposing base electrodes 211 and 212, there is more freedom in selecting the shape of the counter electrode 221.

Actuator 200A

Figure 26:
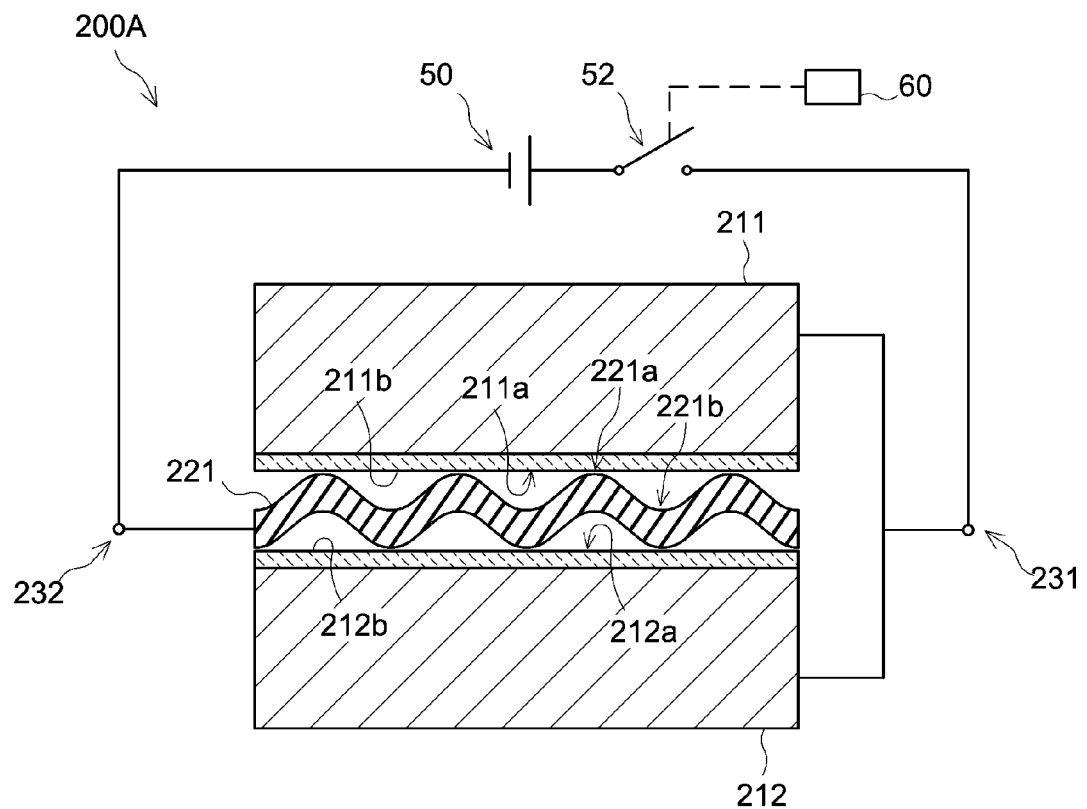
FIG. 26 is a cross-sectional view schematically illustrating an actuator 200A according to another embodiment of the disclosure.

FIG. 26 is a cross-sectional view illustrating an actuator 200A according to another embodiment. As illustrated in FIG. 26, the actuator 200A includes a counter electrode 221 including a corrugated shape in which ridges 221a and valleys 221b are formed by smoothly curved surfaces. The actuator 200A has the same configuration as the actuator 200 shown in FIGS. 23 and 24, except for the structure of the counter electrode 221. The actuator 200A shown in FIG. 26 is such that when the switch 52 is turned ON, Coulomb forces occurs, causing the counter electrode 221 to deform such as to stick to the first base electrode 211 and the second base electrode 212. Due to such deformation of the counter electrode 221, the gap between the first base electrode 211 and the second base electrode 212 narrows. When the switch 52 is turned OFF, the Coulomb force disappears, so that the counter electrode 221 returns to the original shape. As the counter electrode 221 returns to the original shape, the gap between the first base electrode 211 and the second base electrode 212 widens. When the counter electrode 221 is in a corrugated shape as described above, the shapes of the ridges 221a and the valleys 221b are not limited to any particular shape.

Actuator 200B

Figure 27:
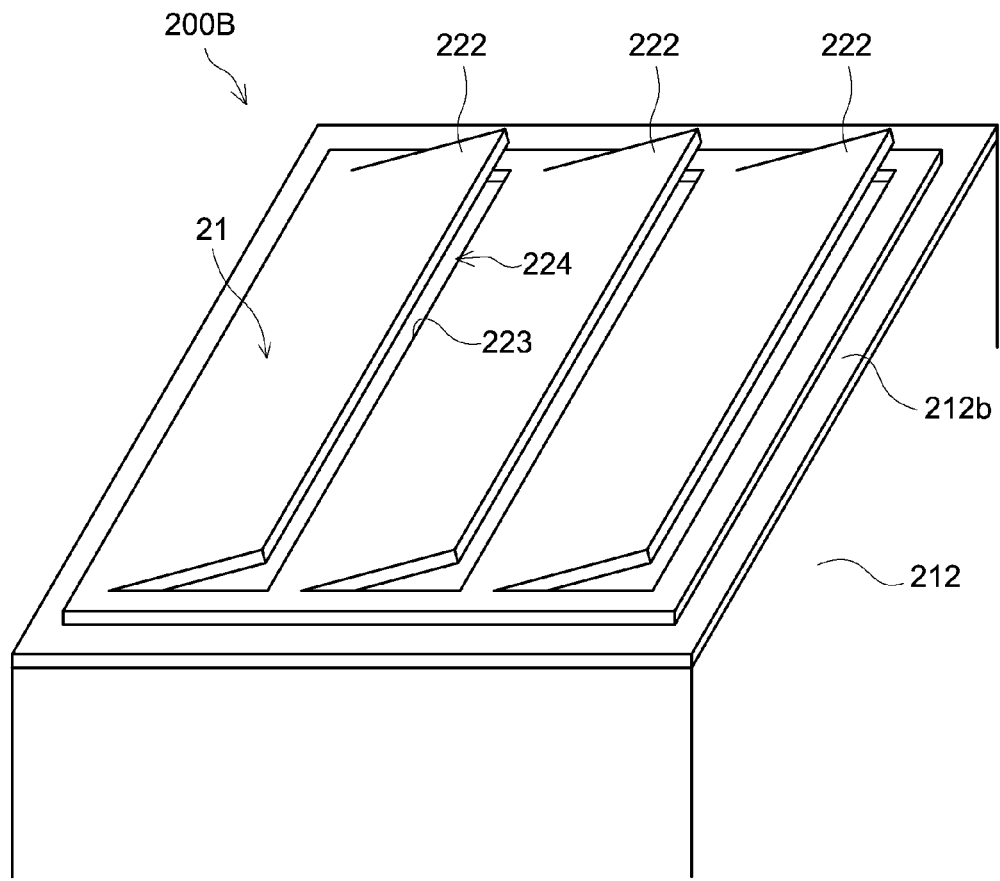
FIG. 27 is a perspective view schematically illustrating a counter electrode 221 of an actuator 200B according to another embodiment of the disclosure.
Figure 28:
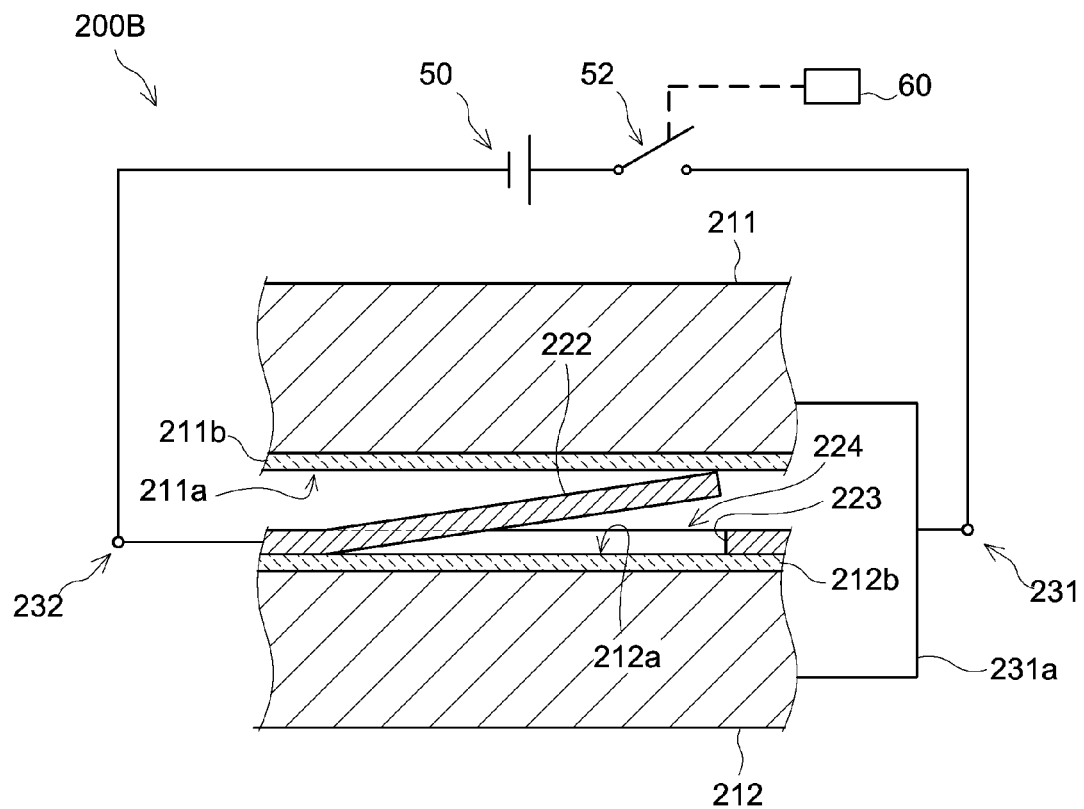
FIG. 28 is a cross-sectional view schematically illustrating a flip-up portion 222 of the counter electrode 221 of the actuator 200B according to another embodiment of the disclosure.
Figure 29:
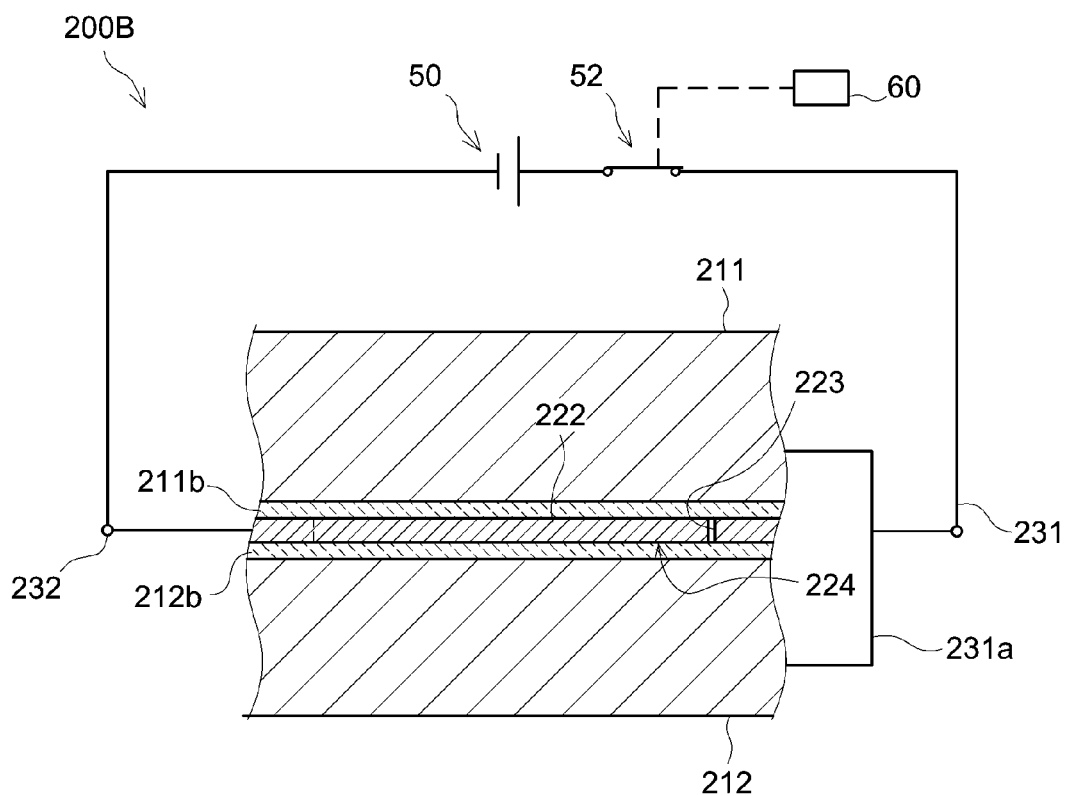
FIG. 29 is a cross-sectional view schematically illustrating a flip-up portion 222 of the counter electrode 221 of the actuator 200B according to another embodiment of the disclosure.

FIG. 27 is a perspective view illustrating a counter electrode 221 of an actuator 200B according to another embodiment. FIG. 27 shows the actuator 200B from which the first base electrode 211 (see FIG. 28) has been removed. FIGS. 28 and 29 each show a cross-sectional view illustrating a flip-up portion 222 of the counter electrode 221 of the actuator 200B according to another embodiment. FIG. 28 shows a state in which the switch is OFF. FIG. 29 shows a state in which the switch is ON.

As illustrated in FIG. 27, the counter electrode 221 of the actuator 200B is a substantially plate-shaped member disposed on the second base electrode 212. The counter electrode 221 includes a plurality of flip-up portions 222 each flipped upwardly toward the first base electrode 211. In this embodiment, the flip-up portion 222 is in a substantially rectangular shape. The flip-up portion 222 is separated from the rest of the portion by a slit 223 except for one side of the substantially rectangular shape. The flip-up portion 222 is bent along the connected one side of the substantially rectangular shape, and the flip-up portion 222 is flipped upward as a whole toward the first base electrode 211. The flip-up portions 222 may be disposed so as to be distributed over the counter electrode 221. The actuator 200B has the same configuration as the actuator 200 shown in FIGS. 23 and 24, except for the structure of the counter electrode 221.

As illustrated in FIG. 28, the first base electrode 211 is detached from the second base electrode 212 by the flip-up portions 222 flipped upward toward the first base electrode 211. The actuator 200B is such that, when the switch 52 is turned ON, Coulomb forces occurs, causing the counter electrode 221 to stick to the first base electrode 211 and the second base electrode 212. In this case, as illustrated in FIG. 29, the flip-up portions 222 fit into respective recesses 224, which are formed by slits 223. Due to such deformation of the counter electrode 221, the gap between the first base electrode 211 and the second base electrode 212 narrows. When the switch 52 is turned OFF, the Coulomb force disappears, so that the counter electrode 221 returns to the original shape. As the counter electrode 221 returns to the original shape, the flip-up portions 222 are returned to the original shape and flipped upward, as illustrated in FIG. 28, so that the gap between the first base electrode 211 and the second base electrode 212 widens.

As described above, the counter electrode 221 is disposed on one of the opposing base electrodes, the first base electrode 211 and the second base electrode 212 (the second base electrode 212 in the embodiment shown in FIG. 28). The counter electrode 221 may include a flip-up portion 222 that is separated by the slit 223 with a portion left unseparated, and is flipped upward toward the other one of the base electrodes (toward the first base electrode 211 in the embodiment shown in FIG. 28). In this case, when the switch 52 is turned ON, the flip-up portion 222 fits into the recess 224 that is formed by the slit 223. Therefore, the flip-up portion 222 smoothly deforms. In the embodiment shown in FIGS. 27 to 29, each of the flip-up portions 222 has a substantially rectangular shape. However, the size and shape of each of the flip-up portions 222 are not limited to any particular size or shape, unless specifically stated otherwise.

Actuator 200C

Figure 30:
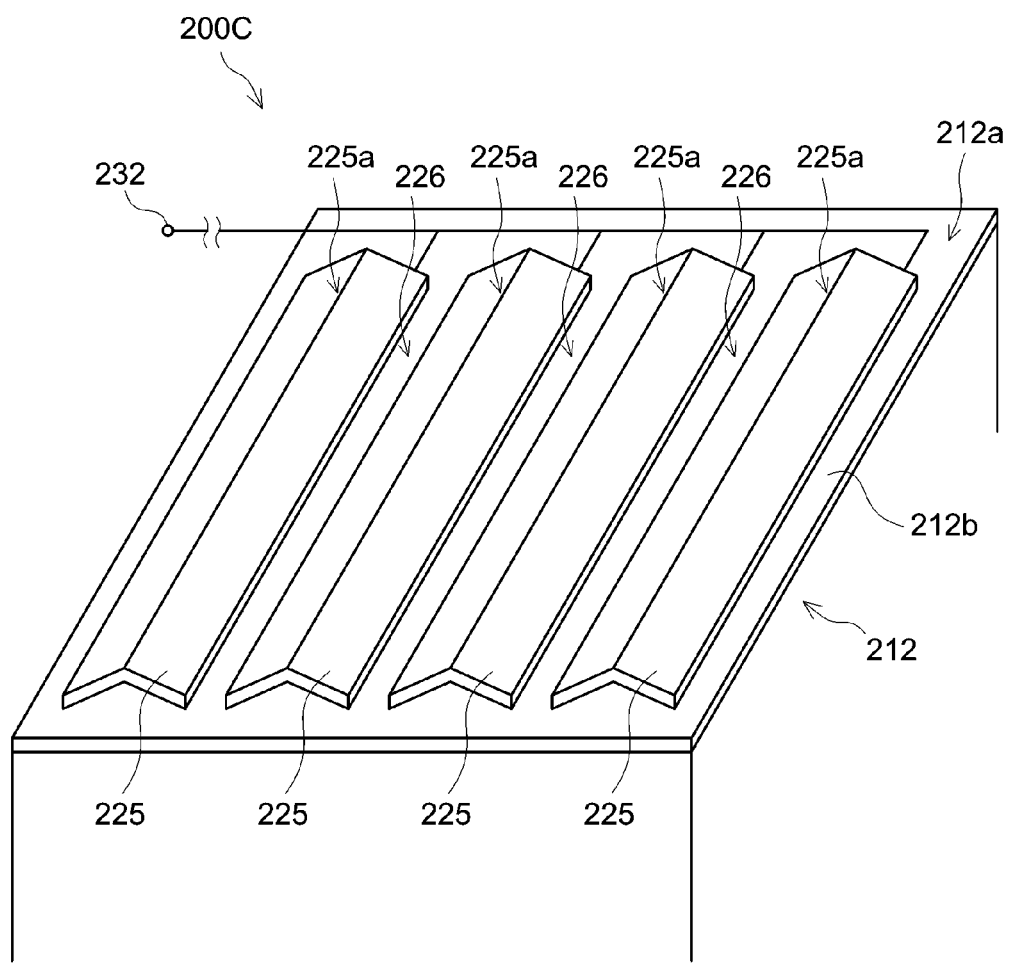
FIG. 30 is a perspective view schematically illustrating counter electrodes 225 of an actuator 200C according to another embodiment of the disclosure.
Figure 31:
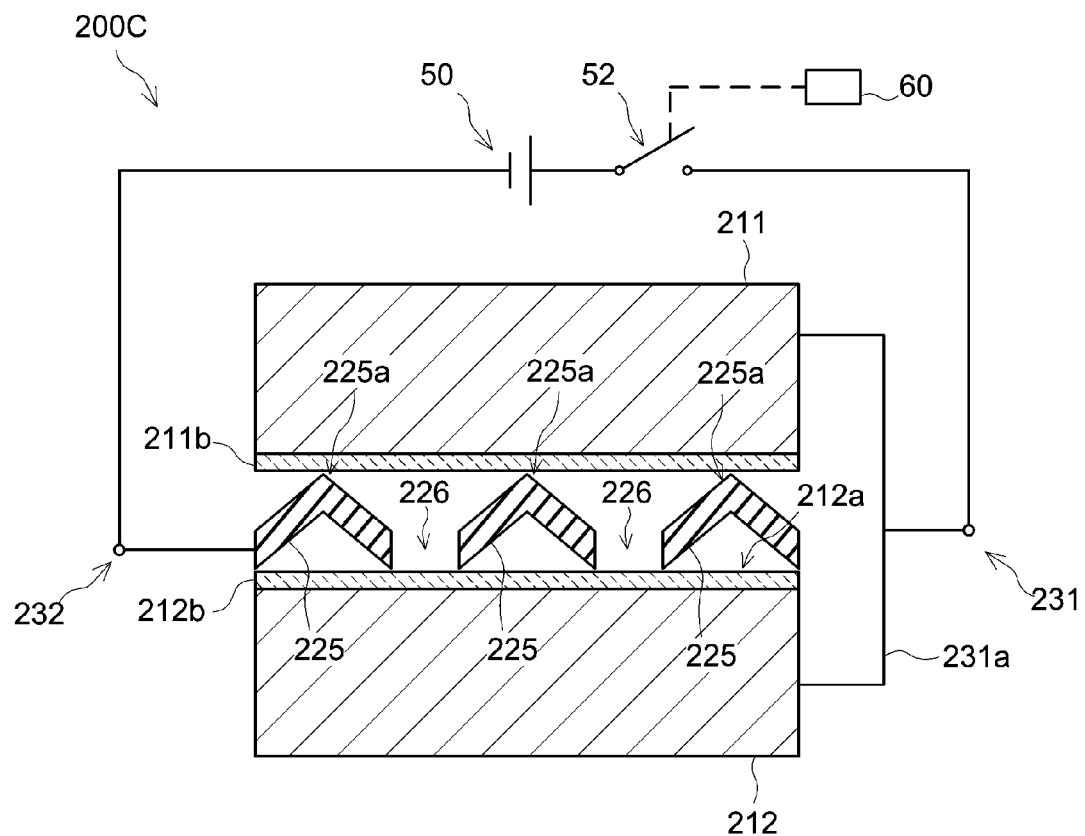
FIG. 31 is a cross-sectional view schematically illustrating the actuator 200C.

FIG. 30 is a perspective view illustrating a counter electrode 221 of an actuator 200C according to another embodiment. FIG. 30 shows the actuator 200C from which a first base electrode 211 (not shown) has been removed. FIG. 31 is a cross-sectional view schematically illustrating an actuator 200C. FIG. 31 shows a state in which the switch 52 is OFF. As illustrated in FIGS. 30 and 31, the actuator 200C includes a plurality of counter electrodes 225 arranged spaced apart from each other on the second base electrode 212. In this embodiment, each of the counter electrodes 225 is a strip-shaped sheet having a uniform width and extending in one direction. The widthwise central portion of the counter electrode 225 bulges in a ridge shape. The plurality of counter electrodes 225 are arranged spaced apart from each other on the second base electrode 212. The counter electrodes 225 are connected in parallel to the second terminal 232.

Although not shown in the drawings, the actuator 200C is such that, when the switch 52 is turned ON, Coulomb forces occurs, causing the counter electrodes 225 to stick to the first base electrode 211 and the second base electrode 212. Each of the counter electrodes 225 includes a ridge-shaped bulging portion 225a provided at the widthwise central portion and extending flatly. The plurality of counter electrodes 225 are arranged spaced apart from each other. The counter electrodes 221 are able to deform while filling gaps 226. Due to such deformation of the counter electrodes 221, the gap between the first base electrode 211 and the second base electrode 212 narrows. When the switch 52 is turned OFF, the Coulomb forces disappear, so that the counter electrodes 221 return to the original shape. As the counter electrodes 221 return to the original shape, the widthwise central portion of each of the counter electrodes 221 bulges upward in a ridge shape, as illustrated in FIG. 30. Then, as illustrated in FIG. 31, the gap between the first base electrode 211 and the second base electrode 212 widens. As described above, the plurality of counter electrodes 225 may be disposed spaced at gaps 226 between a pair of base electrodes (the first base electrode 211 and the second base electrode 212 in this embodiment). When the counter electrodes 225 undergo deformation, the counter electrodes 225 are able to deform in such a manner as to fill the gaps 226. Therefore, when the switch 52 is turned ON, the counter electrodes 225 are able to deform smoothly without interfering with each other. The foregoing has described an example in which each of the counter electrodes 221 is a strip-shaped member in which the widthwise central portion bulges upward. The embodiment of the counter electrode 225 is not limited to such an embodiment.

Although the foregoing has described embodiments of the actuator 200, it is possible that a counter electrode 221 may be interposed between a pair of base electrodes 211 and 212 in the actuator 200, as illustrated in FIGS. 23 and 24. In such an embodiment, the amount of displacement of the actuator 200 is represented by a difference (d3−d4), where d3 is the distance between the first base electrode 211 and the second base electrode 212 when they are detached from each other (see FIG. 23) and d4 is the distance between the first base electrode 211 and the second base electrode 212 when they are brought close to each other (see FIG. 24). To increase the amount of displacement of the actuator 200, it is possible to increase the number of the base electrodes 211 and 212, arranged so as to oppose each other, and the number of the counter electrodes 221, each disposed between a pair of the base electrodes 211 and 212.

Actuator 200D

Figure 32:
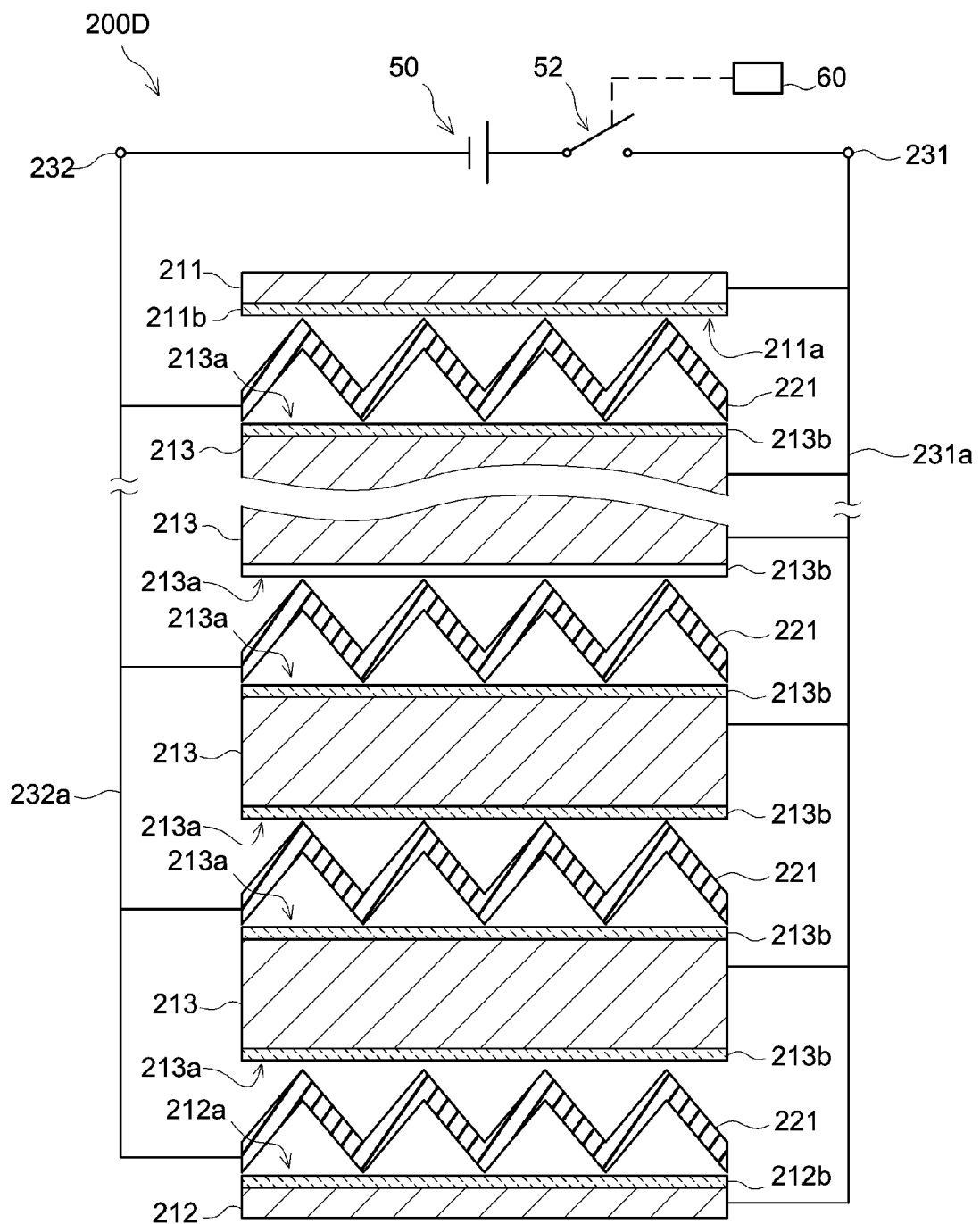
FIG. 32 is a cross-sectional view schematically illustrating an actuator 200D.

FIG. 32 is a cross-sectional view illustrating an actuator 200D. FIG. 32 shows a state in which the switch 52 is OFF. The actuator 200D shown in FIG. 32 includes a first base electrode 211, a second base electrode 212, a plurality of intermediate base electrodes 213, and a plurality of counter electrodes 221.

The first base electrode 211 and the second base electrode 212 are disposed spaced apart from each other. The plurality of intermediate base electrodes 213 are arranged so as to be spaced apart and oppose each other in sequence between the first base electrode 211 and the second base electrode 212. Each one of the counter electrodes 221 is disposed between adjacent ones of the plurality of base electrodes 211, 212, and 213 arranged in sequence. Each of the counter electrodes 221 is a flat spring that is deformable in a direction in which adjacent ones of the base electrodes face each other. In this embodiment, each of the counter electrodes 221 is in a corrugated shape. As described above in various examples, each of the counter electrodes 221 is not limited to having a corrugated shape.

One of the intermediate base electrodes 213 opposes another of the base electrodes across one of the counter electrodes 221. The first base electrode 211, the second base electrode 212, and the intermediate base electrodes 213 include respective opposing surfaces 211a, 212a, and 213a that oppose at least one of the counter electrodes 221. The opposing surfaces 211a, 212a, and 213a are respectively covered by insulating layers 211b, 212b, and 213b. Each of the intermediate base electrodes 213 includes both side surfaces 213a that oppose the respective counter electrodes 221, and each is covered by an insulating layer 213b.

The first terminal 231 is connected to each of the first base electrode 211, the second base electrode 212, and the intermediate base electrodes 213. The second terminal 232 is connected to each of the counter electrodes 221. In this embodiment, the first base electrode 211, the second base electrode 212, and the intermediate base electrodes 213 are connected in parallel by a wire 231a. The wire 231a is connected to the first terminal 231. The first terminal 231 is connected to the positive electrode of the power supply 50. The counter electrodes 221 are connected in parallel by a wire 232a. The wire 232a is connected to the second terminal 232. The second terminal 232 is connected to the negative electrode of the power supply 50.

When the switch 52 is turned ON, the first base electrode 211, the second base electrode 212, and the intermediate base electrodes 213 are connected to the positive electrode of the power supply 50 and charged with a positive charge. Each of the counter electrodes 221 is connected to the negative electrode of the power supply 50 and charged with a negative charge. Then, Coulomb forces occur between the first base electrode 211 and one of the counter electrodes 221, between the second base electrode 213 and one of the counter electrodes 221, and between the intermediate base electrodes 213 and the counter electrodes 221. Such Coulomb forces attract the first base electrode 211 to the one of the counter electrodes 221, the second base electrode 213 to one of the counter electrodes 221, and the intermediate base electrodes 213 and the counter electrodes 221. Each of the counter electrodes 221 has flexibility such as to be deformable by the Coulomb forces as described above.

As a result, although not shown in the drawings, the Coulomb forces acting between the base electrodes 211, 212, and 213 and the respective counter electrodes 221 cause the respective counter electrodes 221 to stick to the base electrodes 211, 212, and 213. Each of the counter electrodes 221 has flexibility such as to be deformable by the Coulomb forces that act between the base electrodes 211, 212, and 213. As illustrated in FIG. 32, each of the counter electrodes 221 deforms between a pair of the base electrodes. As the counter electrodes 221 deform, the area in which the counter electrodes 221 stick to the base electrodes 211, 212, and 213 widens. Then, as the counter electrodes 221 deform, the gap between the base electrodes 211, 212, and 213 accordingly narrows.

The actuator 200D shown in FIG. 32 includes a relatively large number of the base electrodes 211, 212, and 213 that oppose each other, and a relatively large number of the counter electrodes 221 each disposed between the base electrodes 211, 212, and 213. The amount of displacement of the actuator 200D is equal to the difference between the distance between the first base electrode 211 and the second base electrode 212, which are at the opposite ends, when the switch 52 is OFF and the distance between the first base electrode 211 and the second base electrode 212, which are at the opposite ends, when the switch 52 is ON. This actuator 200D includes a relatively large number of the base electrodes 211, 212, and 213 that oppose each other and a relatively large number of the counter electrodes 221 each disposed between the base electrodes 211, 212, and 213. Therefore, the actuator 200D is able to obtain a correspondingly large amount of displacement. With the structure of the base electrodes 211, 212, and 213 and the structure of the counter electrodes 221 being equal, the amount of displacement of the actuator 200D is greater when the number of the intermediate base electrodes 213 and the number of the counter electrodes 221 are larger.

Further embodiments of the actuator disclosed herein will be described below. For example, the actuator 10H shown in FIG. 19 and the actuator 200D shown in FIG. 32 each include a plurality of counter electrodes respectively disposed between a plurality of base electrodes arranged in sequence so as to oppose each other.

When this is the case, it is possible to provide a mode in which all the plurality of counter electrodes deform and a mode in which only a selected number of the plurality of counter electrodes deform. In the mode in which only a selected number of the plurality of counter electrodes deform, the switch may be configured so that only a selected number of the plurality of counter electrodes are connected to the power supply while the rest of the counter electrodes are not connected to the power supply, for example. Alternatively, in the mode in which only a selected number of the plurality of counter electrodes deform, the switch may be configured so that only a selected number of the plurality of base electrodes are connected to the power supply while the rest of the base electrodes are not connected to the power supply. In the mode in which all the plurality of counter electrodes deform, the actuator 10H is able to obtain a greater amount of displacement because all the counter electrodes 21 deform, as shown in FIG. 20, for example. In the mode in which only a selected number of the plurality of counter electrodes move, the actuator 10H yields a smaller amount of displacement because only a selected number of counter electrodes 21 deform.

Actuator 10J

Figure 33:
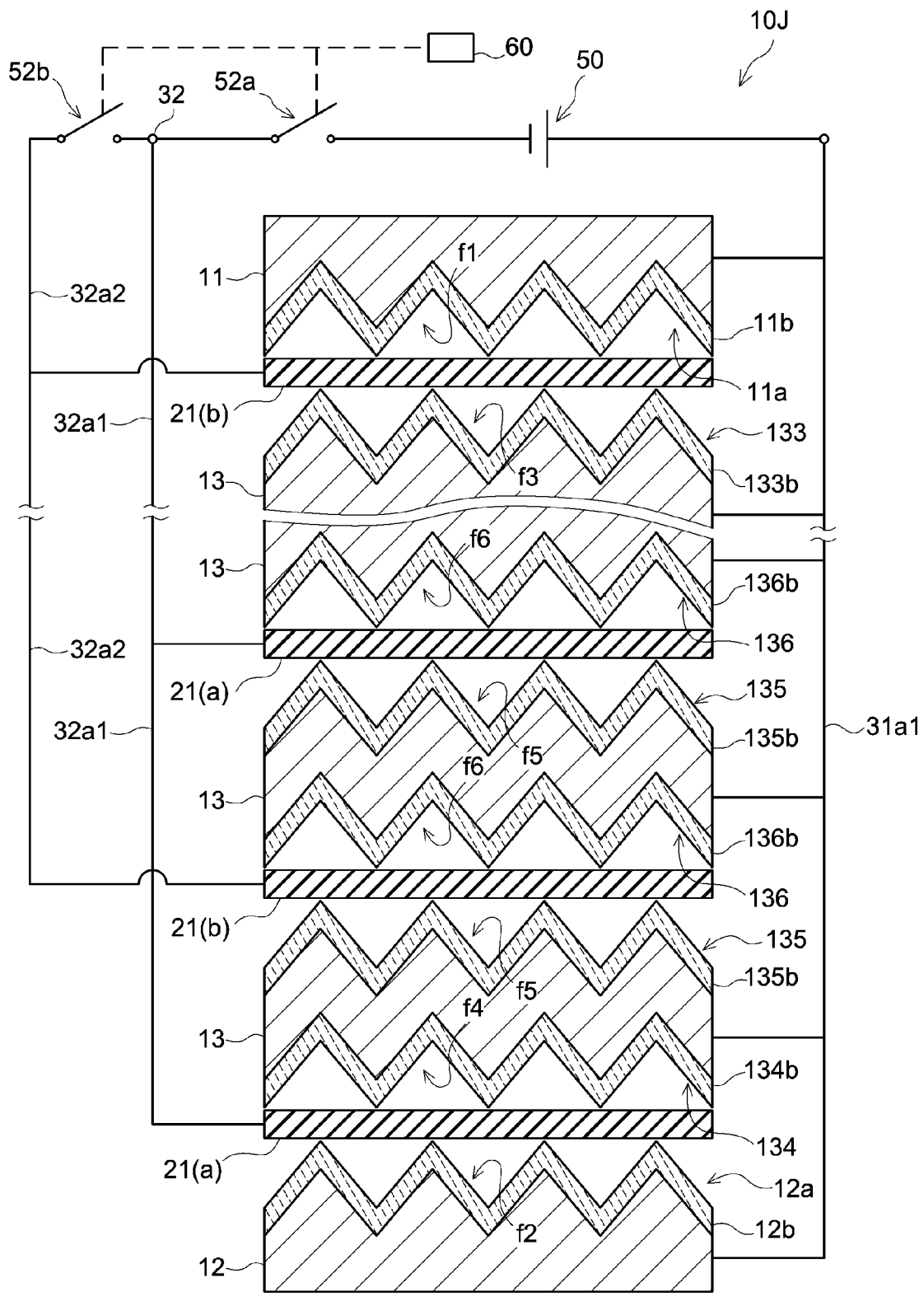
FIG. 33 is a cross-sectional view schematically illustrating an actuator 10J according to another embodiment of the disclosure.

FIG. 33 is a cross-sectional view illustrating an actuator 10J according to another embodiment. FIG. 33 shows a state in both switches 52a and 52b are OFF. The actuator 10J is configured so that only a selected number of the plurality of counter electrodes 21 each disposed between the first base electrode 11, the intermediate base electrodes 13, and the second base electrode 12.

For example, the actuator 10J shown in FIG. 33 includes a wire 32a1 that connects only a selected number of the plurality of counter electrodes 21 in parallel, and a wire 32a2 that connects the rest of the counter electrodes 21 that are not connected to the wire 32a1. In the actuator 10J shown in FIG. 33, each of the wire 32a1 and the wire 32a2 is connected to every other one of the counter electrodes 21.

In FIG. 33, the counter electrodes 21 that are connected to the wire 32a1 are denoted as counter electrodes 21(a). The counter electrodes 21 that are connected to the wire 32a2 are denoted as counter electrodes 21(b). Each of the wire 32a1 and the wire 32a2 is connected to the second terminal 32. A switch 52a is a switch that connects the counter electrodes 21(a), which are connected to the wire 32a1, to the power supply 50. A switch 52b is a switch that connects the counter electrodes 21(b), which are connected to the wire 32a2, to the power supply 50. In this embodiment, the wire 32a1 is connected to the second terminal 32. The switch 52a is provided on the wire that connects the second terminal 32 to the power supply 50. The switch 52b is provided on the wire that connects the wire 32a2 to the second terminal 32. Each of the switches 52a and 52b is switched between ON and OFF by the controller 60. When the switch 52a is turned ON, the counter electrodes 21(a), which are connected to the wire 32a1, are connected to the power supply 50. When the switch 52b is turned ON with the switch 52a being ON, the counter electrodes 21(b), which are connected to the wire 32a2, are connected to the power supply 50. Even when the switch 52b is ON, all the counter electrodes 21 are cut off from the power supply 50 if the switch 52a is OFF.

Except for the just-described configuration, the actuator 10J has the same configuration as the actuator 10H shown in FIG. 19. The detailed description thereof will not be repeated herein.

For example, when both the switches 52a and 52b are turned ON, the actuator 10J applies a voltage to the counter electrodes 21(a) and the counter electrodes 21(b) as well as the opposing base electrodes 11, 12, and 13. In this case, all the counter electrodes 21(a) and 21(b) undergo deformation. At this time, the gap between the first base electrode 11 and the second base electrode 12 becomes the narrowest.

For example, when the switch 52b is turned OFF and the switch 52a is turned ON, the actuator 10J applies a voltage to the counter electrodes 21(a), which are connected to the wire 32a1, and the base electrodes 11, 12, and 13, which sandwich the counter electrodes 21(a). On the other hand, no voltage is applied to the counter electrodes 21(b), which are connected to the wire 32a2. As a result, only the counter electrodes 21(a) deform among the plurality of counter electrodes 21. The counter electrodes 21(b) do not deform. Accordingly, the actuator 10J produces a smaller amount of displacement. In this embodiment, the amount of displacement obtained by the actuator 10J becomes approximately half because every other one of the plurality of counter electrodes 21 is connected to the wire 32a2. Thus, it is possible to employ a configuration in which only a selected number of the plurality of counter electrodes 21 are allowed to deform. As a result, the amount of displacement obtained by the actuator 10J can be controlled. It is also possible to arrange switches 52 such as to finely control which ones of the counter electrodes 21 a voltage is applied to, among the plurality of counter electrodes 21. For example, every one of the counter electrodes 21 may be provided with a switch 52 for selecting connection and disconnection to the power supply 50.

Actuator 10K

Figure 34:
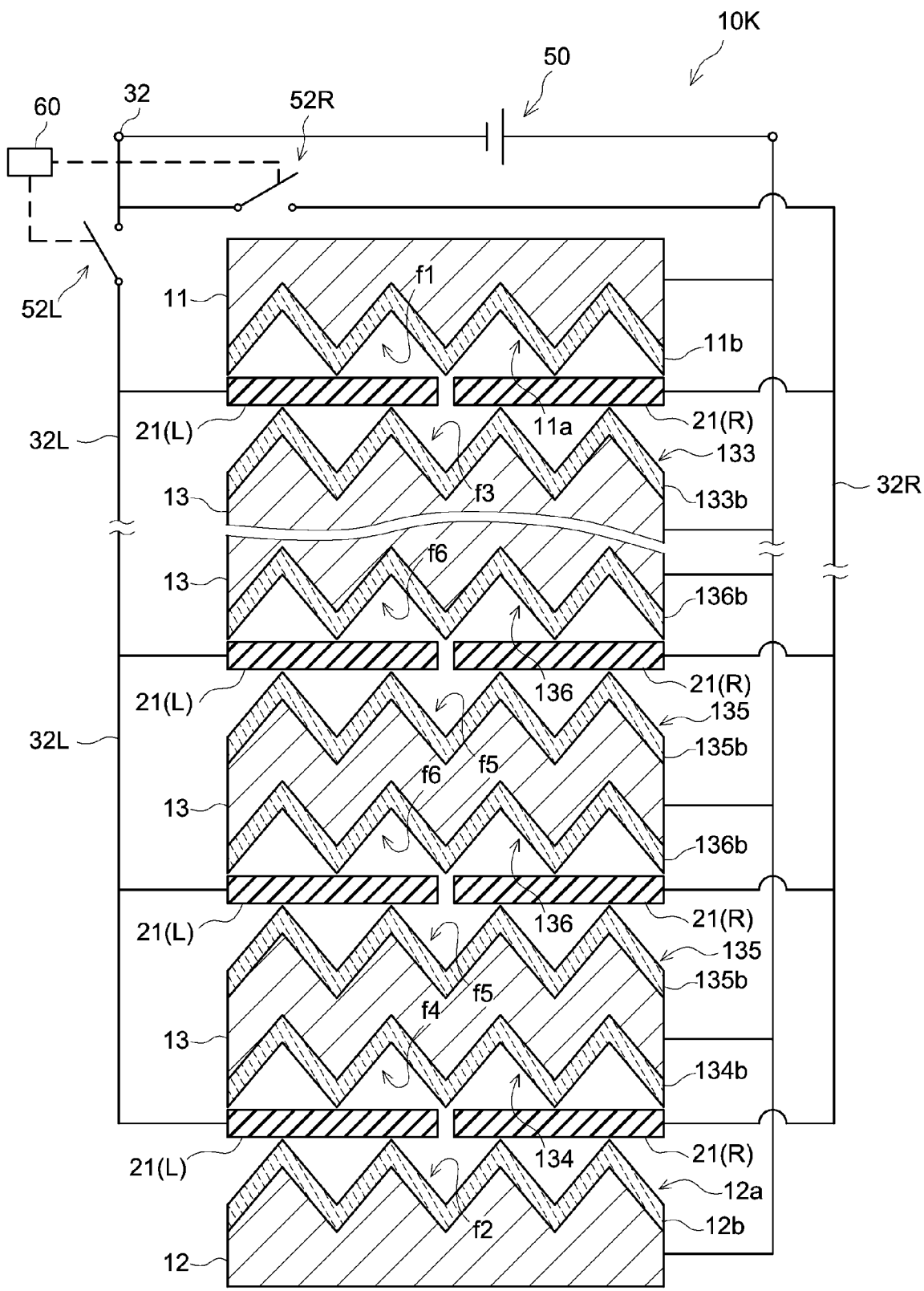
FIG. 34 is a cross-sectional view schematically illustrating an actuator 10K according to another embodiment of the disclosure.

FIG. 34 is a cross-sectional view illustrating an actuator 10K according to another embodiment. FIG. 34 shows a state in both switches 52L and 52R are OFF. The actuator 10K includes counter electrodes 21 each disposed between the first base electrode 11 and the intermediate base electrodes 13 and the second base electrode 12. Each of the counter electrodes 21 is divided at a widthwise middle point. In FIG. 34, ones of the counter electrodes 21 on the left of the figure are denoted as counter electrodes 21(L). Ones of the counter electrodes 21 on the right of the figure are denoted as counter electrodes 21(R). The left-side counter electrodes 21(L) are connected in parallel by a wire 32L. The right-side counter electrodes 21(R) are connected in parallel by a wire 32R. Each of the wire 32L and the wire 32R is connected to the second terminal 32. A switch 52L is attached to a connection point between the second terminal 32 and the wire 32L. A switch 52R is attached to a connection point between the second terminal 32 and the wire 32R. Each of the switches 52L and 52R is controlled to turn ON and OFF by the controller 60.

Except for the just-described configuration, the actuator 10K has the same configuration as the actuator 10H shown in FIG. 19. The detailed description thereof will not be repeated herein.

When both the switches 52L and 52R are turned ON, the actuator 10K applies a voltage to each of the left-side and right-side counter electrodes 21(L) and 21(R). This causes both the left-side and right-side counter electrodes 21(L) and 21(R) to deform. As a result, the entirety of the actuator 10K deforms.

When the switch 52L is turned ON and the switch 52R is turned OFF, a voltage is applied to the left-side counter electrodes 21(L) but no voltage is applied to the right-side counter electrodes 21(R). As a result, only the left-side counter electrodes 21(L) deform. In the actuator 10K in this case, the first base electrode 11 and the second base electrode 12 approach each other on the left side, but the first base electrode 11 and the second base electrode 12 remain detached on the right side. Thus, on the left side of the actuator 10K, the first base electrode 11 is displaced such as to approach the second base electrode 12.

When the switch 52R is turned ON and the switch 52L is turned OFF, a voltage is applied to the right-side counter electrodes 21(R), but no voltage is applied to the left-side counter electrodes 21(L). As a result, only the right-side counter electrodes 21(R) deform. In the actuator 10K in this case, the first base electrode 11 and the second base electrode 12 approach each other on the right side, but the first base electrode 11 and the second base electrode 12 remain detached on the left side. Thus, on the right side of the actuator 10K, the first base electrode 11 is displaced such as to approach the second base electrode 12.

As described above, it is possible that the counter electrodes 21 disposed between the first base electrode 11 and the intermediate base electrodes 13 and the second base electrode 12 may be divided into a plurality of parts when viewed in plan view. The divided parts may be configured to be connected in parallel to the power supply 50. In this case, the counter electrodes 21 deform in the parts that are connected to the power supply 50. As a result, the actuator 10K may be configured so that the first base electrode 11 approaches the second base electrode 12 in a selected portion of the actuator 10K. In other words, the actuator 10K may be configured so that the first base electrode 11 can be inclined with respect to the second base electrode 12.

In various embodiments disclosed herein, such as the actuators 10 and 200, the counter electrode(s) may be deformed by operating the switch(es) 52. As the counter electrode(s) deforms, the distance between the first base electrode and the second base electrode changes. Such an actuator may be mounted on an inside of a vehicle interior surface material, for example. In this case, the shape or texture of the surface may be changed, for example, surface unevenness may be formed on the surface of the vehicle interior, by actuating the actuator. The actuator may also be mounted on an inside of a vehicle exterior surface material, for example. In this case, it is possible to cause protrusions and recesses to appear or disappear on the surface of an exterior material of the vehicle by actuating the actuator, for example. This makes it possible to change the aerodynamic characteristics of the vehicle.

As described above, an embodiment of the actuator disclosed herein includes at least one base electrode, at least one counter electrode opposed to the base electrode, a first terminal connected to the base electrode, and a second terminal connected to the counter electrode. The at least one base electrode includes an opposing surface opposing the at least one counter electrode, and at least the opposing surface is covered by an insulating layer. The at least one counter electrode includes a flexible electrical conductor being deformable by a Coulomb force acting between the at least one base electrode and the at least one counter electrode when a voltage is applied between the first terminal and the second terminal. In the foregoing embodiments, the base electrode may include an opposing surface opposing the counter electrode and having a protrusion-and-recess shape, and the counter electrode is caused to stick to the opposing surface having the protrusion-and-recess shape of the base electrode by the Coulomb force. In another embodiment, the counter electrode is in a corrugated shape, and the counter electrode is deformed by the Coulomb force and caused to stick to the base electrode.

The actuator disclosed herein is not limited to such disclosed embodiments. For example, all the opposing surfaces of the counter electrode(s) and the base electrode(s) in the actuator may be flat. In such cases as well, when a voltage is applied between the base electrode(s) and the counter electrode(s) to produce a Coulomb force therebetween, the actuator is able to cause the counter electrode(s) to stick to the base electrode(s) due to the Coulomb force. The actuator may be configured such that all the opposing surfaces of the counter electrode(s) and the base electrode(s) are flat and that the actuator switches between a state in which the counter electrode(s) is attached to the base electrode(s) and a state in which the counter electrode(s) is not attached to the base electrode(s) by removing the applied voltage and the Coulomb force.

As described hereinabove, in the actuator disclosed herein, when the switch 52 is in the ON state, the counter electrode 4 is attracted to the base electrode 2 by the Coulomb force that acts between the base electrode 2 and the counter electrode 4, so that the counter electrode 4 deforms such as to fit the opposing surface 2c of the base electrode 2 and sticks to the base electrode 2 (see FIG. 2). When the Coulomb force disappears with the switch 52 being in the OFF state, the counter electrode 4 returns to the original shape, causing the counter electrode 4 to be detached from the base electrode 2 (see FIG. 1). If the Coulomb force quickly disappears when the switch 52 is turned from the ON state to the OFF state, the counter electrode 4 quickly returns to the original shape. This allows the counter electrode 4 to be quickly detached from the base electrode 2, improving the response speed.

Actuator 10L

Figure 35:
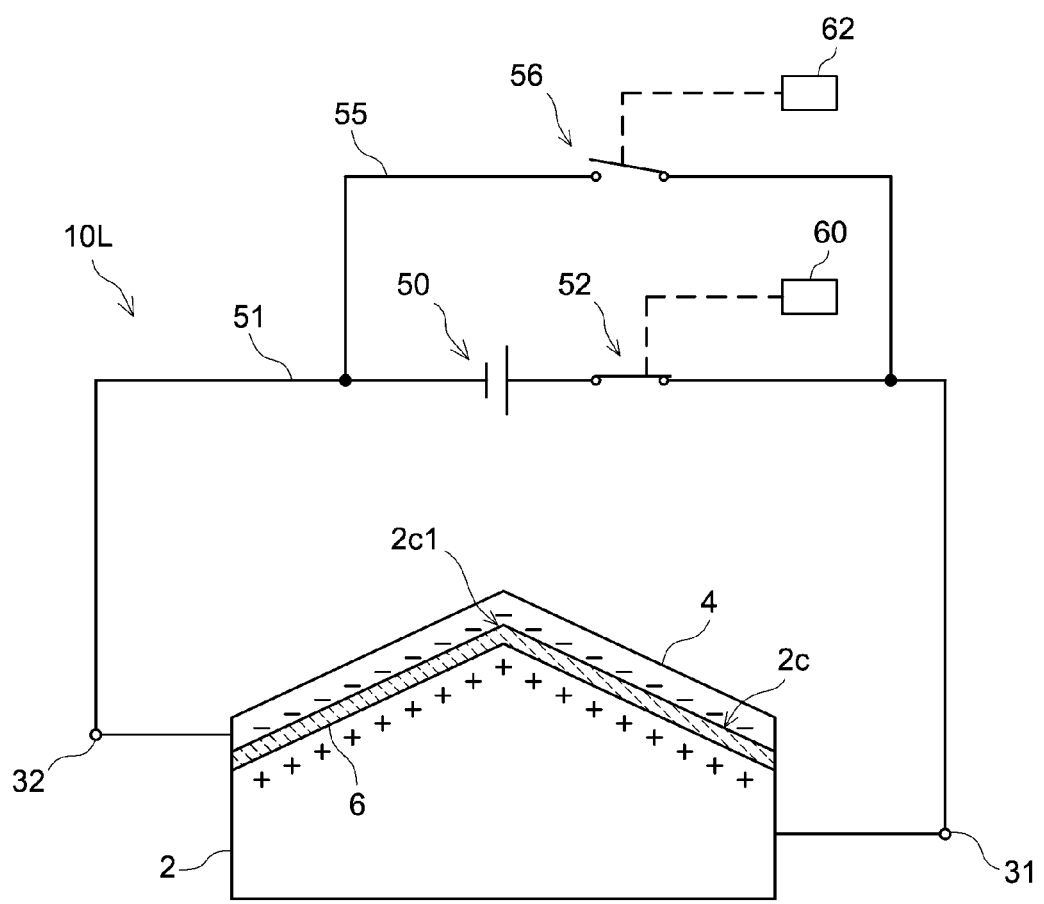
FIG. 35 is a cross-sectional view schematically illustrating an actuator 10L according to another embodiment of the disclosure.
Figure 36:
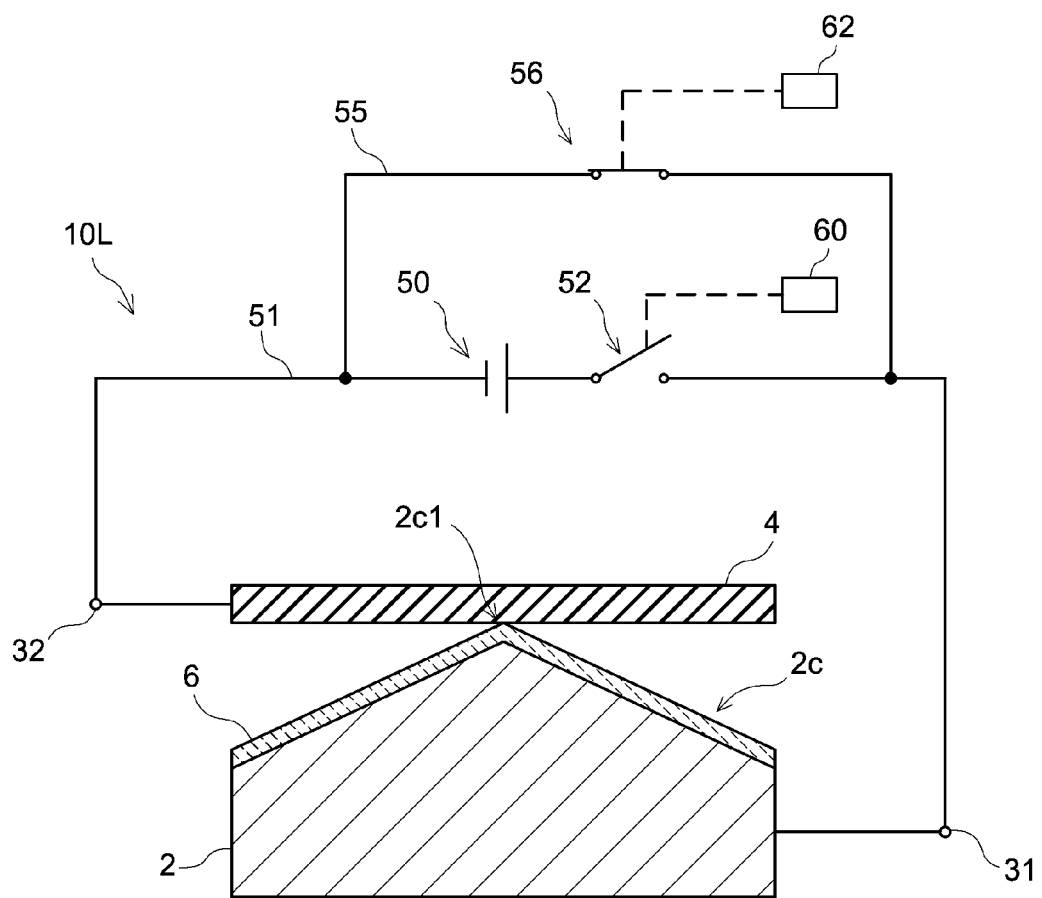
FIG. 36 is a cross-sectional view schematically illustrating the actuator 10L according to another embodiment of the disclosure.

From the viewpoint of improving the response speed, it is desirable that the Coulomb force disappear quickly when the switch 52 is turned from the ON state to the OFF state. Hereinbelow, further modified examples will be described with reference to the embodiment shown in FIGS. 1 and 2 as an example. The embodiments of the actuator illustrated in such modified examples are not limited to the one shown in FIGS. 1 and 2, but may be applied to various other embodiments. FIGS. 35 and 36 are cross-sectional views schematically illustrating an actuator 10L according to another embodiment. In the actuator 10L shown in FIGS. 35 and 36, the parts and components that perform the same functions as the actuator 10 shown in FIG. 1 are designated by the same reference symbols, and the description thereof will not be repeated as appropriate. FIG. 35 shows the actuator 10L in which a first switch 52 is in the ON state, in other words, in the state in which the base electrode 2 and the counter electrode 4 are attached to each other. FIG. 36 shows the actuator 10L in which a first switch 52 is in the OFF state, in other words, in the state in which the base electrode 2 and the counter electrode 4 are detached from each other.

The actuator 10L shown in FIGS. 35 and 36 includes a base electrode 2, a counter electrode 4, a power supply 50, a first switch 52, a connecting wire 55, a second switch 56, a first controller 60, and a second controller 62.

The power supply 50 applies a voltage between the base electrode 2 and the counter electrode 4. The first switch 52 is a switch that turns on and off the voltage applied by the power supply 50 between the base electrode 2 and the counter electrode 4. In this embodiment, the power supply 50 and the first switch 52 are provided on the wire 51. The wire 51 is a wire that connects the first terminal 31, which is connected to the base electrode 2, and the second terminal 32, which is connected to the counter electrode 4, to the power supply 50. The first controller 60 is a controller that turns on and off the first switch 52.

The connecting wire 55 is a wire that electrically connects the base electrode 2 and the counter electrode 4 to each other without the power supply 50 interposed therebetween. In this embodiment, as illustrated in FIGS. 35 and 36, the connecting wire 55 is provided so that the power supply 50 is bypassed by the wire 51, which connects the power supply 50 to the first terminal 31, which is connected to the base electrode 2, and the second terminal 32, which is connected to the counter electrode 4. The connecting wire 55 may also be provided separately from the wire 51 so that the power supply 50 is connected to the first terminal 31, which is connected to the base electrode 2, and to the second terminal 32, which is connected to the counter electrode 4.

The second switch 56 is provided on the connecting wire 55. The second switch 56 switches between a state in which the base electrode 2 and the counter electrode 4 are electrically connected to each other by the connecting wire 55 and a state in which the connecting wire 55 is electrically disconnected. The second controller 62 is a controller that turns on and off the second switch 56.

As illustrated in FIG. 35, the first controller 60 and the second controller 62 may be configured so that the second switch 56 is turned off when the first switch 52 is turned on. In addition, as illustrated in FIG. 36, the first controller 60 and the second controller 62 may be configured so that the second switch 56 is turned on when the first switch 52 is turned off.

The actuator 10L is such that, when the first switch 52 is turned on, a voltage is applied between the base electrode 2 and the counter electrode 4, causing the first base electrode 2 and the counter electrode 4 to stick to each other. When the first switch 52 is turned off, the voltage applied to the base electrode 2 and the counter electrode 4 is removed, and when the Coulomb force is removed consequently, the base electrode 2 and the counter electrode 4 are detached from each other.

In this actuator 10L, when the first switch 52 is in the ON state, each of the base electrode 2 and the counter electrode 4 is electrically charged, and a Coulomb force is produced between the base electrode 2 and the counter electrode 4, as illustrated in FIG. 35. Then, when the first switch 52 is turned from a closed state (i.e., the ON state) to an open state (i.e., the OFF state), the second switch 56 may be turned on so that the base electrode 2 and the counter electrode 4 are electrically connected to each other, as illustrated in FIG. 36. When the base electrode 2 and the counter electrode 4 are electrically connected to each other, the charge of the base electrode 2 and the charge of the counter electrode 4 are quickly removed. This removes the Coulomb force acting between the base electrode 2 and the counter electrode 4 quickly, causing the counter electrode 4 to return to the original shape quickly. As a result, the counter electrode 4 is quickly detached from the base electrode 2. Thus, because the second switch 56 is provided, the response speed for detaching the base electrode 2 and the counter electrode 4 from each other is higher when the first switch 52 is turned from the closed state (i.e., the ON state) to the open state (i.e., the OFF state).

The actuator 10L includes controllers 60 and 62 configured to turn off the second switch 56 when the first switch 52 is turned on and turn on the second switch 56 when the first switch 52 is turned off. In the embodiment shown in FIGS. 35 and 36, the actuator 10L is configured so that the first controller 60 electrically operates the first switch 52. The actuator 10L is also configured so that the second controller 62 electrically operates the second switch 56. This allows the first switch 52 and the second switch 56 to be electrically operated quickly and to match their timings. Here, the first controller 60 and the second controller 62 may be implemented by respective separate controllers or by a single controller. For example, the first controller 60 and the second controller 62 may be implemented by a single microcomputer.

Herein, the controller(s) may be a device that performs various types of electrical processes of various types of devices including this actuator. The controller may be implemented by a computer that is operated according to a predetermined program. Specifically, various functions of the controller may be processed by an arithmetic unit [also referred to as a processor, CPU (central processing unit), or MPU (micro-processing unit)] and a memory storage device (such as a memory and a hard disk) of each computer that constitutes the controller. For example, the configurations of the controller may be embodied as a database that stores various data embodied by a computer, a data structure, or a processing module that performs predetermined computing processes according to a predetermined program, or as part of the database, the data structure, or the processing module. Although not shown in the drawings, the controller may be such that a plurality of controllers cooperate with each other. The controller may be data-communicably connected to other computers via, for example, LAN cables, wireless communication lines, or the Internet. The processes of the controller may be performed in cooperation with such other computers. For example, the information that is to be stored in the controller, or part of the information, may be stored in an external computer. The process to be executed by the controller, or a portion of the process, may be executed by an external computer.

Actuator 10M

Figure 37:
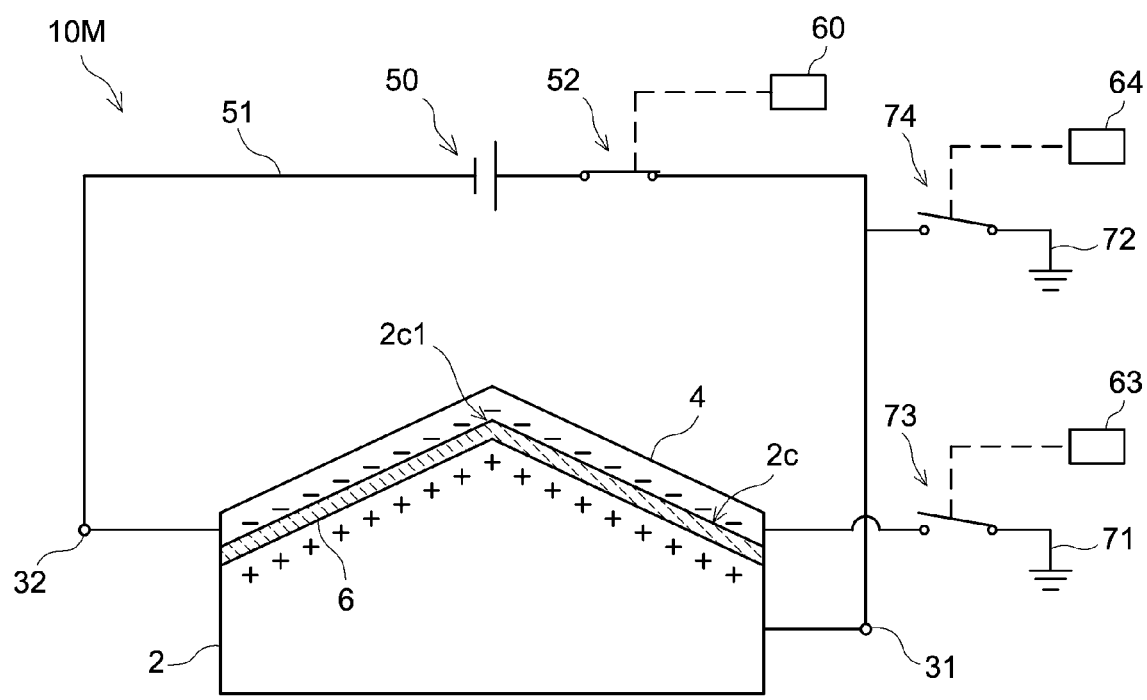
FIG. 37 is a cross-sectional view schematically illustrating an actuator 10M according to another embodiment of the disclosure.
Figure 38:
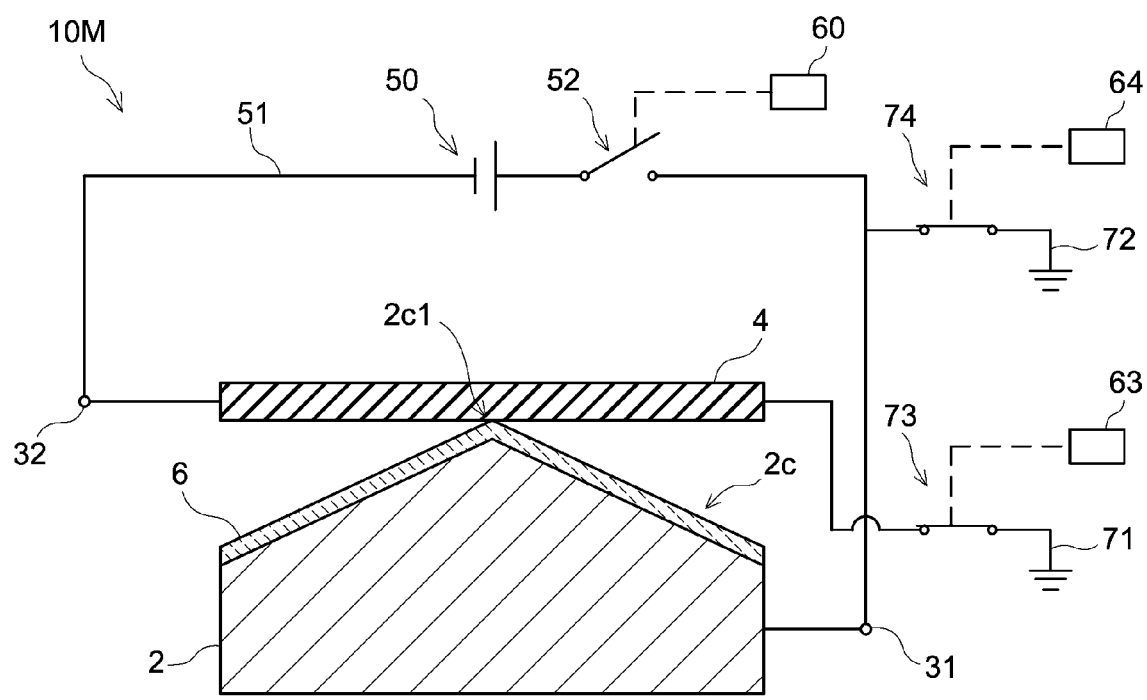
FIG. 38 is a cross-sectional view schematically illustrating the actuator 10M according to another embodiment of the disclosure.

FIGS. 37 and 38 are cross-sectional views schematically illustrating an actuator 10M according to another embodiment. In the actuator 10M shown in FIGS. 37 and 38, the parts and components that perform the same functions as the actuator 10 shown in FIG. 1 are designated by the same reference symbols, and the description thereof will not be repeated as appropriate. FIG. 37 shows the actuator 10M in which a switch is in the ON state. FIG. 38 shows the actuator 10M in which a switch is in the OFF state.

The actuator 10M shown in FIGS. 37 and 38 includes a third controller 63, a fourth controller 64, a first ground wire 71, a second ground wire 72, a third switch 73, and a fourth switch 74. The actuator 10M also includes the first switch 52 and the first controller 60 that are described above.

The first ground wire 71 is an electrical wire that connects the counter electrode 4 to ground. The third switch 73 is provided on the first ground wire 71. The third switch 73 is a switch that selectively connects and disconnects the first ground wire 71 to and from ground. The third controller 63 is a controller that operates the third switch 73 to control grounding of the counter electrode 4.

The second ground wire 72 is an electrical wire that connects the base electrode 2 to ground. The fourth switch 74 is provided on the second ground wire 72. The fourth switch 74 is a switch that selectively connects and disconnects the second ground wire 72 to and from ground. The fourth controller 64 is a controller that operates the fourth switch 74 to control grounding of the base electrode 2.

The first controller 60, the third controller 63, and the fourth controller 64 are configured so that each of the third switch 73 and the fourth switch 74 is turned off when the first switch 52 is turned on. The first controller 60, the third controller 63, and the fourth controller 64 are also configured so that each of the third switch 73 and the fourth switch 74 is turned on when the first switch 52 is turned off As illustrated in FIG. 37, the actuator 10M is such that, when the first switch 52 is turned on, a voltage is applied between the base electrode 2 and the counter electrode 4, causing the base electrode 2 and the counter electrode 4 to stick to each other. When the first switch 52 is in the ON state in such an actuator 10M, each of the base electrode 2 and the counter electrode 4 is electrically charged, so a Coulomb force is produced in the base electrode 2 and the counter electrode 4. When the first switch 52 is turned off, the voltage applied to the base electrode 2 and the counter electrode 4 is removed, and when the Coulomb force is removed consequently, the base electrode 2 and the counter electrode 4 are detached from each other.

In the actuator 10M, when the first switch 52 is turned from the closed state (i.e., the ON state) to the open state (i.e., the OFF state), the third switch 73 and the fourth switch 74 are turned on so that the base electrode 2 and the counter electrode 4 are electrically connected to each other, as illustrated in FIG. 38. When the base electrode 2 and the counter electrode 4 are connected to ground, the charge of the base electrode 2 and the charge of the counter electrode 4 are quickly removed. This removes the Coulomb force acting between the base electrode 2 and the counter electrode 4 quickly, causing the counter electrode 4 to return to the original shape quickly. As a result, the counter electrode 4 is quickly detached from the base electrode 2. Thus, because the third switch 73 and the fourth switch 74 are provided, the response speed for detaching the base electrode 2 and the counter electrode 4 from each other is higher when the first switch 52 is turned from the closed state (i.e., the ON state) to the open state (i.e., the OFF state).

As described above, the actuator 10M includes the controllers 60, 63, and 64 configured to turn off the third switch 73 and the fourth switch 74 when the first switch 52 is turned on and turn on the third switch 73 and the fourth switch 74 when the first switch 52 is turned off. In the embodiment shown in FIGS. 37 and 38, the actuator 10M is configured so that the first controller 60 electrically operates the first switch 52. The actuator 10M is also configured so that the third controller 63 electrically operates the third switch 73. The actuator 10M is also configured so that the fourth controller 64 electrically operates the fourth switch 74. This allows the first switch 52, the third switch 73, and the fourth switch 74 to be electrically operated quickly and to appropriately adjust the operation timings for the respective switches. Here, the first controller 60, the third controller 63, and the fourth controller 64 may be implemented by respective separate controllers, or by a single controller, or by two controllers. For example, the first controller 60, the third controller 63, and the fourth controller 64 may be implemented by a single microcomputer or two microcomputers. As illustrated herein, the actuator may have a further complicated structure. The actuator is able to perform more complicated operations when it is operated by a controller based on a predetermined program.

Various embodiments of the actuator have been described hereinabove according to the present disclosure. Unless specifically stated otherwise, the embodiments of the actuator described herein do not limit the scope of the present invention.

This application claims the benefit of priority from Japanese Patent Application No. 2019-134838 filed on Jul. 22, 2019, which is incorporated by reference herein in its entirety.

REFERENCE SIGNS LIST

2 Base electrode
2c Surface opposing counter electrode 4
2c1 Protruding part
2c2 Protuberance
4 Counter electrode
6 Insulating layer
10, 10A, 10B, 10C, 10D, 10E, 10F, 10G, 10H, 10I, 10J, 10K, 10L, 10M Actuator
11 First base electrode (base electrode)
11b Insulating layer
12 Second base electrode (base electrode)
12b Insulating layer
13 Intermediate base electrode (base electrode)
21 Counter electrode
31 First terminal
31a First wire
32 Second terminal
32a Second wire
50 Power supply
52 Switch (first switch)
55 Connecting wire
56 Second switch
60 Controller (first controller)
62 to 64 Controller (second controller to fourth controller)
71 First ground wire
72 Second ground wire 73 Third switch
74 Fourth switch
133 Third surface of intermediate base electrode 13 that faces first base electrode 11
133b Third insulating layer
134 Fourth surface of intermediate base electrode 13 that faces second base electrode 12
134b Fourth insulating layer
135 Fifth surface of intermediate base electrode 13 that faces toward first base electrode 11
135b Fifth insulating layer
136 Sixth surface of intermediate base electrode 13 that faces toward second base electrode 12
136b Sixth insulating layer
200, 200A, 200B, 200C, 200D Actuator
211 First base electrode
211a Surface of first base electrode 211 that opposes counter electrode 221
211b Insulating layer
212 Second base electrode
212a Surface of second base electrode 212 that opposes counter electrode 221
212b Insulating layer
213 Intermediate base electrode
212a Surface of intermediate base electrode that opposes counter electrode 221
213b Insulating layer
221 Counter electrode
221a Ridge
221b Valley
222 Flip-up portion
223 Slit
224 Recess
225 Counter electrode
225a Portion bulging in a mound shape
226 Gap
231 First terminal
231a First wire
232 Second terminal
232a Second wire

The invention claimed is:

1. An actuator comprising:
a plurality of base electrodes arranged in sequence;
one or more counter electrodes, opposing the one or more base electrodes, each disposed between adjacent ones of the plurality of base electrodes, and;
a first terminal connected the at least one base electrode; and
a second terminal connected to the at least one counter electrode, wherein:
the at least one base electrode includes an opposing surface opposing the at least one counter electrode, at least the opposing surface being covered by an insulating layer, the insulating layer comprising a ceramic including a perovskite structure; and
the at least one counter electrode comprises a flexible electrical conductor being deformable by a Coulomb force acting between the at least one base electrode and the at least one counter electrode when a voltage is applied between the first terminal and the second terminal; wherein
the first terminal is connected to the plurality of base electrodes;
the second terminal is connected to the one or more counter electrodes;
the adjacent ones of the base electrodes include opposing surfaces opposing each other across the one or more counter electrodes, the opposing surfaces having protrusion-and-recess shapes engageable with each other and each being covered by an insulating layer.

2. The actuator according to claim 1, wherein:
at least one base electrode comprises a first base electrode and a second base electrode disposed spaced apart from the first base electrode;
the one or more counter electrodes are disposed between the first base electrode and the second base electrode;
the first base electrode includes an opposing surface opposing the at least one counter electrode, the opposing surface having a first protrusion-and-recess shape and being covered by a first insulating layer; and
the second base electrode includes a second surface opposing the counter electrode, the second surface having a second protrusion-and-recess shape engageable into the first protrusion-and-recess shape and being covered by a second insulating layer.

3. The actuator according to claim 1, wherein:
at least one base electrode comprises:
a first base electrode;
a second base electrode disposed spaced apart from the first base electrode; and
an intermediate base electrode disposed between the first base electrode and the second base electrode, wherein:
the one or more counter electrodes include a plurality of counter electrodes respectively disposed between the first base electrode and the intermediate base electrode and between the second base electrode and the intermediate base electrode;
the first base electrode includes a first surface facing the intermediate base electrode, the first surface having a first protrusion-and-recess shape and being covered by a first insulating layer;
the second base electrode includes a second surface facing the intermediate base electrode, the second surface having a second protrusion-and-recess shape and being covered by a second insulating layer;
the intermediate base electrode includes a third surface facing toward the first base electrode, the third surface having a third protrusion-and-recess shape engageable with the first protrusion-and-recess shape and being covered by a third insulating layer; and
the intermediate base electrode further includes a fourth surface facing toward the second base electrode, the fourth surface having a fourth protrusion-and-recess shape engageable with the second protrusion-and-recess shape and being covered by a fourth insulating layer.

4. The actuator according to claim 1, wherein:
the plurality of base electrodes comprise:
a first base electrode;
a second base electrode disposed spaced apart from the first base electrode; and
a plurality of intermediate base electrodes arranged in sequence between the first base electrode and the second base electrode;
the one or more counter electrodes include a plurality of counter electrodes, the plurality of counter electrodes respectively disposed between the first base electrode and one of the intermediate base electrodes, between one of the intermediate base electrodes and another of the intermediate base electrodes, and between the second base electrode and one of the intermediate base electrodes;

the first base electrode includes a first surface facing the intermediate base electrode, the first surface having a first protrusion-and-recess shape and being covered by a first insulating layer;

the second base electrode includes a second surface facing the intermediate base electrode, the second surface having a second protrusion-and-recess shape and being covered by a second insulating layer;

the intermediate base electrode includes a third surface facing toward the first base electrode, the third surface having a third protrusion-and-recess shape engageable with the first protrusion-and-recess shape and being covered by a third insulating layer;

the intermediate base electrode further includes a fourth surface facing toward the second base electrode, the fourth surface having a fourth protrusion-and-recess shape engageable with the second protrusion-and-recess shape and being covered by a fourth insulating layer;

each one of the intermediate base electrodes that is disposed between adjacent ones of the intermediate base electrodes includes a fifth surface facing toward the first base electrode, the fifth surface having a fifth protrusion-and-recess shape and being covered by a fifth insulating layer; and each one of the intermediate base electrodes that is disposed between adjacent ones of the intermediate base electrodes includes a sixth surface facing toward the second base electrode, the sixth surface having a sixth protrusion-and-recess shape and being covered by a sixth insulating layer.

5. The actuator according to claim 1, further comprising a first wire connecting the plurality of base electrodes in parallel.

6. The actuator according to claim 1, further comprising a second wire connecting a plurality of the counter electrodes in parallel.

7. The actuator according to claim 1, wherein the at least one counter electrode comprises a flat spring.

8. The actuator according to claim 1, wherein:
each of the one or more counter electrodes is a flat spring that is deformable in a direction in which the adjacent ones of the base electrodes face each other.

9. The actuator according to claim 8, wherein each of the one or more counter electrodes is in a corrugated shape.

10. The actuator according to claim 8, further comprising a first wire connecting the plurality of base electrodes in parallel.

11. The actuator according to claim 8, wherein the one or more counter electrodes comprise a plurality of counter electrodes; and further comprising a second wire connecting the plurality of counter electrodes in parallel.

12. The actuator according to claim 1, wherein the one or more counter electrodes comprise an elastomer containing an electrically conductive agent.

13. The actuator according to claim 1, further comprising:
a power supply applying a voltage between the base electrode and the counter electrode; and
a first switch selectively turning on and off the voltage applied by the power supply between the base electrode and the counter electrode.

14. The actuator according to claim 13, further comprising a controller operating the first switch.

15. The actuator according to claim 13, further comprising:
a connecting wire electrically connecting the base electrode and the counter electrode to each other without interposing the power supply therebetween; and
a second switch provided on the connecting wire, the second switch switching between a state in which the base electrode and the counter electrode are electrically connected to each other by the connecting wire and a state in which the connecting wire is electrically disconnected.

16. The actuator according to claim 15, further comprising a controller configured to turn off the second switch when the first switch is turned on and to turn on the second switch when the first switch is turned off.

17. The actuator according to claim 13, further comprising:
a first ground wire connecting the counter electrode to ground;
a second ground wire connecting the base electrode to ground;
a third switch provided on the first ground wire, the third switch selectively connecting and disconnecting the first ground wire to and from ground; and
a fourth switch provided on the second ground wire, the fourth switch selectively connecting and disconnecting the second ground wire to and from ground.

18. The actuator according to claim 17, further comprising a controller configured to turn off the third switch and the fourth switch when the first switch is turned on, and to turn on the third switch and the fourth switch when the first switch is turned off.

* * * * *